US011229954B2

(12) United States Patent
Hall

(10) Patent No.: US 11,229,954 B2
(45) Date of Patent: *Jan. 25, 2022

(54) ADDITIVE MANUFACTURING APPARATUS AND METHOD

(71) Applicant: RENISHAW PLC, Wotton-Under-Edge (GB)

(72) Inventor: Liam David Hall, East Lothian (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/928,593

(22) Filed: Jul. 14, 2020

(65) Prior Publication Data

US 2020/0368850 A1 Nov. 26, 2020

Related U.S. Application Data

(63) Continuation of application No. 15/576,035, filed as application No. PCT/GB2016/051720 on Jun. 10, 2016, now Pat. No. 10,744,598.

(30) Foreign Application Priority Data

Jun. 11, 2015 (GB) .................................... 1510220

(51) Int. Cl.
*B22F 10/20* (2021.01)
*B33Y 30/00* (2015.01)
(Continued)

(52) U.S. Cl.
CPC .............. *B22F 10/20* (2021.01); *B23K 26/03* (2013.01); *B23K 26/034* (2013.01);
(Continued)

(58) Field of Classification Search
CPC ...................................................... B22F 10/20
(Continued)

(56) References Cited

U.S. PATENT DOCUMENTS 5,150,714 A 9/1992 Green
5,753,274 A 5/1998 Wilkening et al.
(Continued)

FOREIGN PATENT DOCUMENTS

CN 103171150 A 6/2013
CN 104363856 A 2/2015
(Continued)

OTHER PUBLICATIONS

Kanji Ono, "Acoustic Emission in Materials Research—A Review", Department of Materials Science and Engineering, University of California, pp. 284-308.
(Continued)

*Primary Examiner* — Lori L Baker
(74) *Attorney, Agent, or Firm* — Oliff PLC

(57) ABSTRACT

An additive manufacturing apparatus and corresponding method for building an object by layerwise consolidation of material, where the apparatus includes a build enclosure containing a build support for supporting the object during the build, a material source for providing material to selected locations for consolidation, a radiation device for generating and directing radiation to consolidate the material at the selected locations and an acoustic sensing system. The acoustic sensing system may be arranged to detect acoustic signals generated in the build enclosure by consolidation of the material with the radiation. The acoustic sensing system may be a passive acoustic sensing system arranged to detect acoustic signals generated in the build enclosure that are indicative of at least one condition of the building process and/or the object.

28 Claims, 31 Drawing Sheets

(51) Int. Cl.

| | | |
|---|---|---|
| *B33Y 50/02* | (2015.01) | |
| *B33Y 10/00* | (2015.01) | |
| *B29C 64/153* | (2017.01) | |
| *B29C 64/386* | (2017.01) | |
| *B23K 26/082* | (2014.01) | |
| *B23K 26/342* | (2014.01) | |
| *B23K 26/03* | (2006.01) | |
| *B23K 26/06* | (2014.01) | |
| *B23K 26/12* | (2014.01) | |
| *B22F 10/30* | (2021.01) | |

(52) U.S. Cl.
CPC ........ *B23K 26/0604* (2013.01); *B23K 26/082* (2015.10); *B23K 26/12* (2013.01); *B23K 26/342* (2015.10); *B29C 64/153* (2017.08); *B29C 64/386* (2017.08); *B33Y 10/00* (2014.12); *B33Y 30/00* (2014.12); *B33Y 50/02* (2014.12); *B22F 10/30* (2021.01); *B22F 2999/00* (2013.01); *Y02P 10/25* (2015.11)

(58) Field of Classification Search
USPC .................................................. 219/71–107
See application file for complete search history.

(56) References Cited

U.S. PATENT DOCUMENTS

| | | |
|---|---|---|
| 6,553,275 B1 | 4/2003 | Mazumder |
| 9,918,811 B2 | 3/2018 | Beeby et al. |
| 2007/0176312 A1 | 8/2007 | Clark et al. |
| 2009/0041825 A1 | 2/2009 | Kotov et al. |
| 2009/0152771 A1 | 6/2009 | Philippi et al. |
| 2015/0115490 A1 | 4/2015 | Reinarz |
| 2015/0177158 A1 | 6/2015 | Cheverton |
| 2015/0314373 A1 | 11/2015 | Mironets et al. |
| 2017/0146488 A1 | 5/2017 | Gold et al. |
| 2017/0146489 A1 | 5/2017 | Redding et al. |
| 2018/0154484 A1 | 6/2018 | Hall |

FOREIGN PATENT DOCUMENTS

| | | |
|---|---|---|
| CN | 107042628 A | 8/2017 |
| DE | 10 2011 008774 A1 | 7/2012 |
| GB | 2283113 A | 4/1995 |
| WO | 95/11100 A1 | 4/1995 |
| WO | 2004/024447 A2 | 3/2004 |
| WO | 2007/147221 A1 | 12/2007 |
| WO | 2009/112799 A2 | 9/2009 |
| WO | 2010/007394 A1 | 1/2010 |
| WO | 2010/007396 A1 | 1/2010 |
| WO | 2011/059621 A1 | 5/2011 |
| WO | 2015/092442 A1 | 6/2015 |
| WO | 2015/109096 A1 | 7/2015 |
| WO | 2016/081651 A1 | 5/2016 |
| WO | 2016/198885 A1 | 12/2016 |

OTHER PUBLICATIONS

Wadley Hng et al., "Acoustic Emission for Materials Processing: A Review", Materials Science & Engineering, vol. 65 (1984), pp. 245-263.
"An Acoustic Emission Study of Martensitic and Bainitic Transformations in Carbon Steel", Materials Science & Technology, Delft University of Technology, Rottersdamseweg 137, 2628 AL Delft, The Netherlands, pp. 1-157.
Sep. 13, 2016 Search Report issued in International Patent Application No. PCT/GB2016/051720.
Sep. 13, 2016 Written Opinion issued in International Patent Application No. PCT/GB2016/051720.
Sep. 16, 2019 Written Opinion issued in International Patent Application No. PCT/GB2019/051799.
Sep. 16, 2019 Search Report issued in International Patent Application No. PCT/GB2019/051799.
U.S. Appl. No. 16/973,333, filed Dec. 8, 2020 in the name of Northeast et al.
Babjak et al. "Analysis and Efficient Onset Time Detection of Acoustic Emission Signals with Power Constrained Sensor Platform".
Dec. 12, 2018 Extended Search Report issued in European Patent Application No. 18181186.0.
Sep. 16, 2019 Extended Search Report issued in European Patent Application No. 19182673.4.

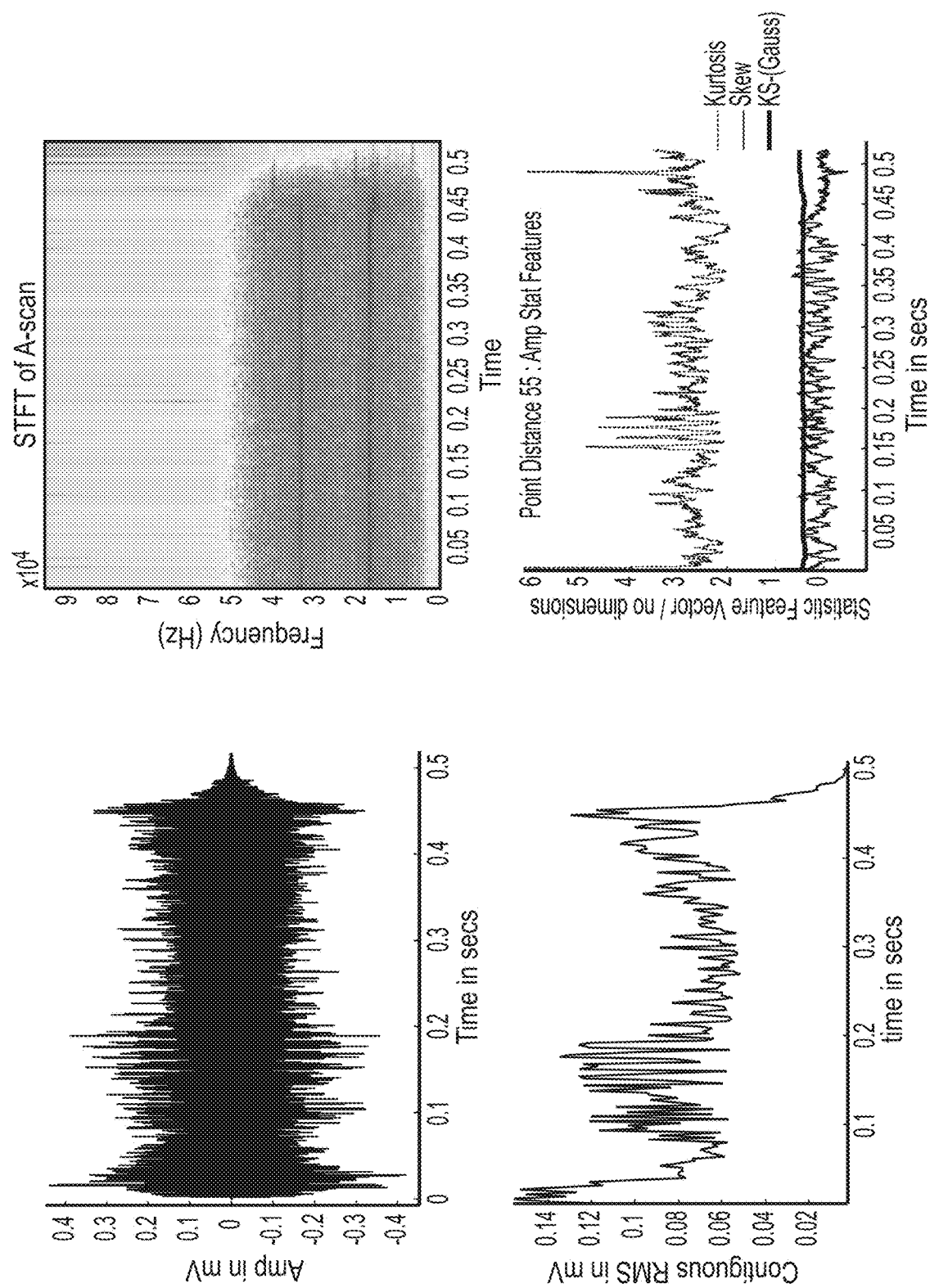
FIG. 10 (a) 55 micron Point Distance

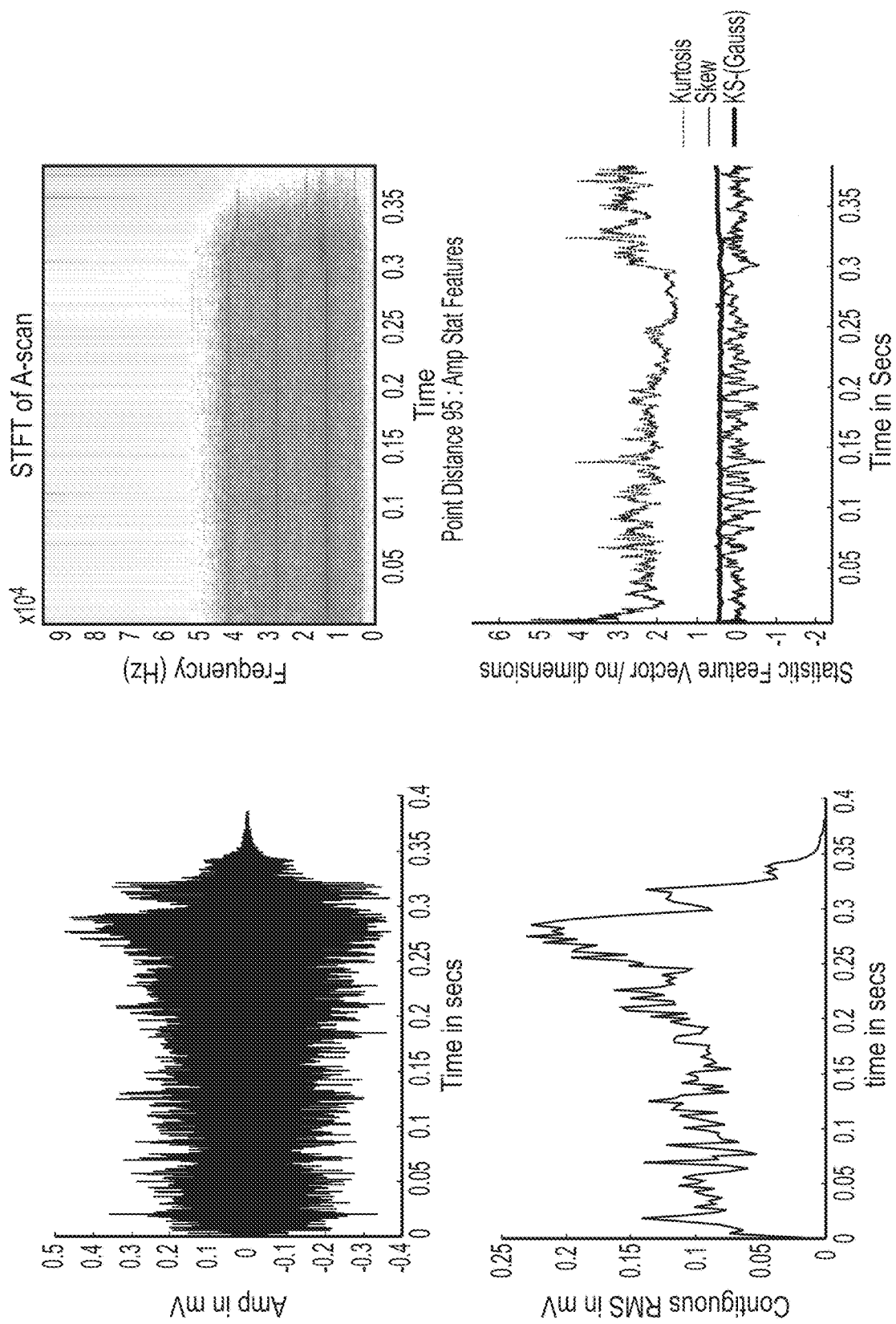
FIG. 10 (b) 95 micron Point Distance

| Block Number | POINT DISTANCE | EXPOSURE TIMEusecs | HATCH SPACE | POWER | FOCUS | Row | Column | X | Y |
|---|---|---|---|---|---|---|---|---|---|
| 1 | 75 | 50 | 75 | 150 | 0 | 1 | 1 | -60 | 20 |
| 2 | 75 | 40 | 75 | 200 | 0 | 1 | 1 | -60 | 12 |
| 3 | 75 | 60 | 75 | 200 | 0 | 1 | 1 | -60 | -12 |
| 4 | 75 | 30 | 75 | 200 | 0 | 1 | 1 | -60 | -20 |
| 5 | 75 | 70 | 75 | 200 | 0 | 1 | 1 | -52 | 36 |
| 6 | 55 | 50 | 75 | 200 | 0 | 1 | 1 | -52 | 28 |
| 7 | 95 | 50 | 75 | 200 | 0 | 1 | 1 | -52 | 20 |
| 8 | 75 | 50 | 75 | 200 | 0 | 1 | 1 | -52 | 12 |
| 9 | 75 | 50 | 75 | 200 | 2 | 1 | 1 | -52 | -12 |
| 10 | 75 | 50 | 75 | 200 | -2 | 1 | 1 | -52 | -20 |
| 11 | 75 | 50 | 75 | 200 | 4 | 1 | 1 | -52 | -28 |
| 12 | 75 | 50 | 75 | 200 | -4 | 1 | 1 | -52 | -36 |
| 13 | 75 | 50 | 75 | 200 | 6 | 1 | 1 | -44 | 44 |
| 14 | 75 | 50 | 75 | 200 | -6 | 1 | 1 | -44 | 36 |
| 15 | 75 | 50 | 75 | 200 | 8 | 1 | 1 | -44 | 28 |

ADDITIVE MANUFACTURING APPARATUS AND METHOD

This application is a continuation of application Ser. No. 15/576,035, filed Nov. 21, 2017, which is the national phase of international application PCT/GB2016/051720, filed Jun. 10, 2016, which claims priority to application no. 1510220.5, filed Jun. 11, 2015 in the United Kingdom, each of which is incorporated by reference in its entirety.

FIELD OF INVENTION

This invention concerns additive manufacturing apparatus and methods and has particular, but not exclusive application, to monitoring and in-process control of a selective solidification process, such as selective laser melting (SLM), selective laser sintering (SLS) or electron beam melting (EBM).

BACKGROUND

Additive manufacturing or rapid prototyping methods for producing objects comprise layer-by-layer solidification of a material, such as a metal powder material, using a high energy beam, such as a laser beam. A powder layer is deposited on a powder bed in a build chamber and a laser beam is scanned across portions of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required.

It is known to monitor and control the selective laser powder process in response to monitored parameters. For example, WO2007/147221 discloses apparatus for collecting laser light reflected from the powder bed using elements of the optical train that are used to deliver the laser beam. The laser is delivered to the powder bed and radiation reflected by the powder bed is collected by scanning optics comprising a pair of movable mirrors and an f-O lens. A semi-reflective mirror reflects the laser light towards the scanning optics but allows the reflected radiation to pass therethrough to a camera and photodetector. A similar system is disclosed in WO95/11100 but the beam splitter is provided between the scanning mirrors and a lens for focusing the laser light.

US2007/0176312A1 discloses the use of Raman spectroscopy in direct laser deposition, which allows analysis for organic and/or ceramic constituents. WO2009/112799A2 discloses a device for applying layers of a strong Raman scatterer product and a Raman spectrometer device for monitoring the frequency of light scattered from an area of the material whilst the laser used to melt the material is applied to that area.

It is also known to monitor additive manufacturing processes using IR cameras. For example, US2009/0152771 discloses detecting an IR-radiation image of an applied powder layer and determining defects and/or geometrical irregularities in the applied powder layer form the IR-radiation image.

A problem with such monitoring techniques, particularly when applied to selective laser melting of metals, is that the area being consolidated is obscured from the sensor, such as by plasma generated above a melt pool.

DESCRIPTION OF THE DRAWINGS

FIGS. 10(*a*)-10(*b*) are a comparison of spectral and amplitude statistical features for gas-borne acoustic signals detected when melting Ti6Al4V when forming the test cylinder for two point distances, (a) 55 microns and (b) 95 microns;

DESCRIPTION OF EMBODIMENTS

Figure 1:
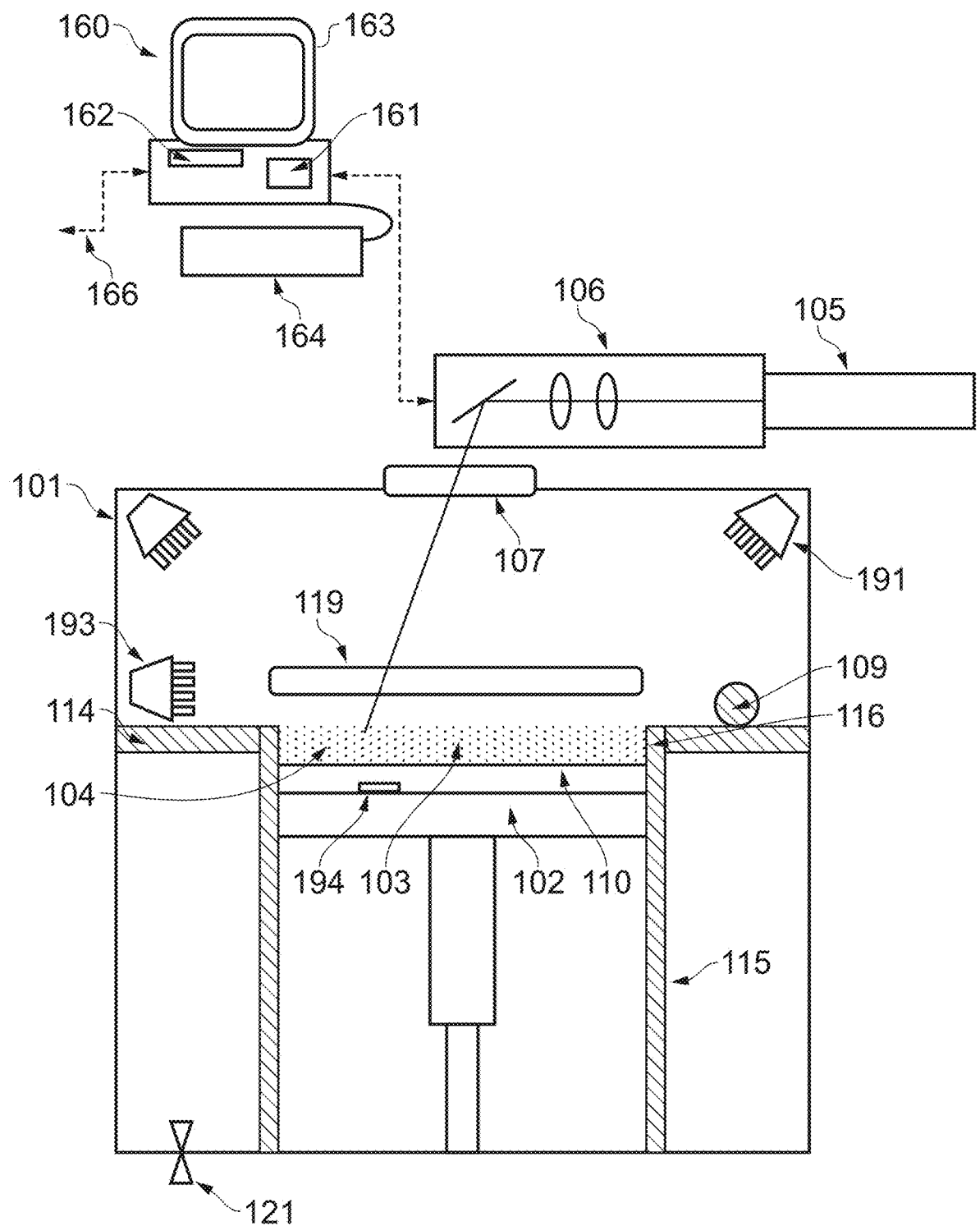
FIG. 1 is a schematic representation of a selective laser melting (SLM) apparatus according to an embodiment of the invention.
Figure 2:
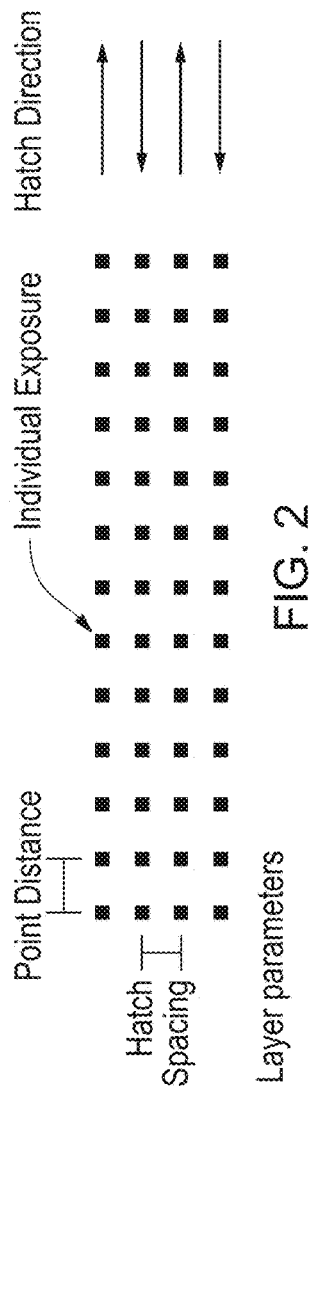
FIG. 2 illustrates scanning parameters used for defining a scan of the laser beam to consolidate material.

Referring to FIGS. 1 and 2, a selective laser melting (SLM) apparatus according to an embodiment of the invention comprises a build enclosure, in this embodiment a build chamber 101, having therein partitions 114, 115 that define a build volume 116 and a surface onto which powder can be deposited. A build platform 102 defines a working area within which an object 103 is built by selective laser melting powder 104. A build substrate 110 is removably attached to the build platform 102, the build substrate 110 made of a material to which the melted powder material adheres when consolidated. The platform 102 can be lowered within the build volume 116 using mechanism (not shown) as successive layers of the object 103 are formed. A build volume available is defined by the extent to which the build platform 102 can be lowered into the build volume 116.

A powder source comprising a dispenser (not shown) and a wiper 109 are arranged to form layers of powder 104 across the build volume 116 as the object 103. For example, the dispensing apparatus may be apparatus as described in WO2010/007396. A laser module 105 generates a laser for melting the powder 104, the laser directed onto the powder bed 104 as required by optical module 106 under the control of a computer 160. The laser enters the chamber 101 via a window 107.

The apparatus further comprises a gas circuit for generating gas flow across the powder bed 104 for carrying away gas borne debris generated during the additive manufacturing process. The gas flow is blown from an inlet nozzle 119 to an exhaust nozzle (not shown), which form part of a gas recirculation loop (now shown). The gas flow is generated by a pump (not shown) and debris is filtered from the gas flow by a filter (not shown) in the gas recirculation loop. A valve 121 connected to a vacuum pump is provided for creating a vacuum in the build chamber 101. The build chamber 101 can then be backfilled with an inert gas, such as argon or nitrogen. The gas circuit may be as described in WO 2010/007394, incorporated herein by reference.

Computer 160 comprises a processor unit 161, memory 162, display 163, user input device 164, such as a keyboard, touch screen, etc, a data connection to modules of the laser melting apparatus, such as optical module 106, laser module 105 and motors (not shown) that drive movement of the dispensing apparatus, wiper and build platform 102. An external data connection 166 provides for the uploading of scanning instructions to the computer 160. The laser unit 105, optical unit 106 and movement of build platform 102 are controlled by the computer 160 based upon the scanning instructions.

The laser unit 105 is driven by a modulated control signal such that laser pulses of a desired duration are generated. The laser beam is scanned across an area of a powder layer to be solidified to expose a series of discrete points within the area to the laser beam. The melt pools formed by the exposure of these points to the laser beam merge to form a uniform solidified area. A scan of an area is defined by a set of scanning parameters. Referring to FIG. 2, in this embodiment the scanning parameters comprise laser power, spot size/focal length, exposure time for each point, point distance, time between exposures and hatch distance.

The apparatus comprises of two different yet complementary passive acoustic sensing modalities. The first modality involves an array of one or more gas-borne microphones 191, 192, 193 that resides above the powder bed 104 within the controlled atmosphere of the build chamber 101. The microphones 191, 192, 193 are configured to measure and interpret various gas-borne acoustic responses within the audible and low ultrasonic band that are generated by the AM machine during its operation. The second modality involves one or more passive structure-borne Acoustic Emissions (AE) sensors 194 located remotely beneath the build-plate substrate 110 upon which powder layers are melted and/or beneath the build platform 102. These AE sensors 194 measure and interpret structure-borne transient elastic stress waves primarily within the low ultrasonic band that are also induced by source mechanisms within the machine's operation. In one embodiment, the AE sensor 194 is attached to the build substrate 110 to be removable therewith.

Each of the acoustic sensing modalities have more than one beneficial monitoring usage within the AM machine, as will be described.

For example, the microphone modality can be used specifically for:—
1. Direct calibrated monitoring/measurement of the Atmospheric Environment (e.g. O2 and/or Argon or Nitrogen % content within the build Chamber).
2. Long-term Health and Usage (HUMS) or Condition monitoring of all of the moving mechanical components within the AM machine (e.g. Vacuum Pump bearings, mirror Galvo-mechanism, wiper mechanism).
3. Acoustic recognition (i.e. finger-printing) of the incident laser interactions against the powder bed (i.e. defined by input laser parameters).
4. Direct measurement and assessment of molten micro-eruptions or sparks generated from the powder bed melt pool.

Similarly, the AE system can be used specifically for:—
1. Monitoring/assessment of the powder spreading process across each new layer within the AM machine's build;
2. Detection/assessment of unwanted residual stresses that can potentially accumulate within the AM part as it is being built.
3. Detection of any localized Phase changes within the part's molecular structure as it is built (e.g. Tin cry—Phase twinning in Ti6Al4V).

In addition to these single sensing modality usages, various critical in-process monitoring tasks can be addressed in a complementary fashion by both passive acoustic sensing modalities in parallel.

For example, both of the sensing modalities can be used to affect:—
1. Internal Defect Detection within the AM part under build (e.g. layer delamination, micro-cracks, porosity etc.)
2. In-process monitoring of the metallic powder melting and part solidification process.
3. In-process monitoring of any additional integrated Laser-based de-stressing or peening process applied across each layer.

Both passive acoustic sensing modalities provide a level of useful and complementary information about the melting condition and consequent layer fusing process that can be processed in near real-time. More specifically, the laser beam is selectively positioned across the powder bed on each layer so that the focused laser spot (typically 70 microns in diameter) melts the metallic powder locally forming a liquid melt pool (typically 120 microns in diameter). Thermal excitation within this melt pool is determined by a combination of basic input laser parameters (e.g. power, exposure time/duty cycle, focal length), the scan parameters (e.g. point distance, hatch distance, scan speed), the metallic powder (e.g. material, grain size distribution), the atmospheric conditions above the melt pool and the local geometry of the part (i.e. heat sinks). The thermal excitation activity induced within the dynamic melt pool during melting and the immediate heat dissipation during solidification are taken into account in determining the quality of the AM build process and the microstructure characteristics of the subsequent AM part (e.g. in terms of minimal porosity, absence of micro-cracks or delamination). The localized thermal activity around the excited melt pool cause both gas-borne and structure-borne acoustic emissions that can be measured. In essence, the gas-borne sensor array monitors the initial melting process by measuring the immediate physical effects from melt pool excitation that cause detectable gas-borne acoustic responses. These effects include both stable resonant vibration within the melt pool in sympathy with the laser frequency and transient acoustic waveforms induced by sparks and molten powder eruptions emanating more randomly from the melt pool. In addition, the AE sensors continue to measure the melt pool as re-solidification of the fused part occurs where a more significant ensemble of structure-borne AE burst or stress wave activity occurs that can readily propagate through the AM part and substrate to the remotely positioned AE sensors.

In one embodiment, the SLM machine incorporates a laser for delivering short-duration laser pulses (e.g. 20 nsecs) with an appropriately reduced pulse width, dwell time and/or power for in-process de-stressing or work hardening (e.g. Laser Peening) of each new additive layer within the AM build. Both acoustic sensing modalities described herein offer beneficial sensing methods for monitoring such within-build Laser Peening processes. More specifically, it is previously known that AE sensors can easily detect the internal structure-borne shock waves generated during a pulsed Laser Peening process. The train of repeated transient surface-generated shock waves induced by laser peening will generate a train of AE burst waveforms that can be detected by the AE sensors proposed by the invention in order to:— (1) assess the work hardening delivered by the laser during the AM process and (2) assess the integrity of the AM part itself. The AM part is inspected by detecting any unexpected waveform perturbations in the AE burst activity (e.g. secondary reflections from micro-cracking in the build) and/or sound speed profile measurement across layers from time-of-flight information that may be related linearly to the parts porosity. Equally, such Laser-based layer Peening will generated a strong train of gas-borne shock waves that can be detected and analyzed by the microphone array proposed within the invention. This is especially suited to Peening within an AM machine where no sacrificial layer is used against the part, suggesting that the gas-borne shock wave response will be clean and very sensitive/informative with regards to the quality of the work-hardening process.

Both continuous wave (CW) and modulated lasers (pulsed laser heating) are employed as the heating source within metallic powder selective laser melting machines. Although the current invention can be usefully applied to CW laser melting AM machines, it has some additional advantages when used with a pulsed laser heating source (e.g. as applied in the Renishaw AM250). Three benefits of acoustic monitoring of a pulsed laser heating with the invention are cited. Primarily, the acoustic system lends itself to low time-latency time and/or spectral processing of measured acoustic waveforms so as to be practical for reliable process control of the deterministic actions of the laser pulse that induces the heating across the powder bed. Secondly, the laser pulse frequency serves to modulate the measured acoustic waveform, acting as a natural carrier wave that encodes useful additional information concerning the more randomly occurring events associated with the melt pool thermal excitation (i.e. sparking or molten micro-eruptions). Thirdly, it is noted that the pulse frequency modulation can be further exploited within commercial AM machines employing more than one laser heating sources simultaneously. This is particularly relevant to the use of spectral processing with the measured gas-borne response to melting, where a priori known frequency modulation patterns (CW or FM) may be used for separate lasers during the build.

At the system level, it is further noted that for each of the within-build monitoring tasks conducted in which both acoustic sensing modalities offer useful sensing data or inferred information independently, there are several ways in which this useful sensor data or extracted information can be combined quantitatively in order to gain a more robust and/or more accurate assessment of the AM process condition or even to provide an accurate real-time sensory feedback control to the AM system. High-merit sensor data fusions may be conducted directly at the acoustic waveform or signal level within the monitoring system. For example, transient waveform features from time discrete events (e.g. a loud delamination event) may be reported by sensors across each modality—increasing the confidence in the diagnosis. Equally, the evolving condition or state within the melt pool may be continually estimated and updated in near-real time based upon raw or feature extracted measurements from both sensor modalities that can be combined within a Linear or Unscented Kalman filter, providing real-time unbiased state estimation. However, useful sensor data from each modality can also be combined at the track/location or decision level in order to improve confidence in defect or fault condition detection, recognition or location decisions.

The waveforms measured by both sensing modalities exhibit deterministic variations (e.g. in acoustic energy of melting responses) that can be attributed to specific physical phenomena and modelled over different time-scales. Very short term variability in the gas-borne acoustic response constitutes the variations in the measured acoustic signals across a single layer—that reveal immediate high-fidelity information about the melting process. However, longer-term variability is also measured by the invention and used for monitoring purposes. For example, the short-term layer to layer variability exhibited in the acoustic measurements can be observed and modelled using any time series modelling methods (e.g. AR, MA, ARMA models). Layer to layer variability in the raw acoustic data measured by the invention, in particular the gas-borne system, can be monitored/processed/modeled to detect out of specification conditions within the build process or longer-term degradations in the machine performance. The passive acoustic system can be used to detect and diagnose such deterministic and predictable variability in the passive acoustic data measured by the invention. For example, a database of acoustic fingerprints for AM build parts of known geometry and material type and induced porosity may be generated and acoustic data recorded in future builds can be compared to the acoustic fingerprints retained in the database to determine whether the build was completed/the machine is operating satisfactorily.

Acoustic data measured by the invention on any specific AM machine or AM process can be exploited more widely than for the in-process monitoring of that specific machine or process. Both microphone and AE sensing systems proposed within the invention can be permanently installed within any new or existing AM machine accommodating a range of design features (e.g. a machine accommodating more than one heating source laser operating concurrently). Equally, the system could be retro-fitted into any existing AM machine. However, the invention does not actually need to be deployed in all commercial production machines used to manufacture complex geometry metallic parts to be useful to the AM build process. That is, the invention may be deployed across a subset of development machine so as to provide critical process control or specific AM build information to optimize input build parameters (i.e. pulsed laser input parameters). That is to say, the invention can be used to optimize process parameters upon a development machine for any bespoke complex geometry part—for subsequent use across many production AM machines manufacturing that part. In this context, the invention may be used to develop an empirically-derived or physical acoustic waveform simulation model that provides a synthetic acoustic environment during builds.

Microphone Array Apparatus

The first of the passive acoustic sensing modalities is now described in detail. As stated, it involves one or more gas-borne microphones positioned advantageously above the powder bed within the build chamber so that the gas-borne acoustic responses incident at the microphone array during the machine's operation can be measured and analyzed to infer several aspects of the AM machine's operation.

A single microphone may be employed in isolation within the build chamber to monitor more than one of the critical operations within the AM machine based upon the solitary time-domain waveforms measured by the single device. However, it is advantageous to deploy several identical microphones in a known geometry array (i.e. matched in frequency and/or phase response), that is distributed around the extremities of the build chamber outside the raster-scanned laser beam's field-of-regard. Such microphone arrays can be purposely configured with known intra-array spacing and orientation relative to the powder bed in order to:— (1) Optimise the SNR of Acoustic waveform of interest within the reverberant convolutive build chamber environment through sophisticated filtering methods (e.g. Adaptive LMS filtering, Blind source separation (ICA), matched filtering) (2) Facilitate useful spatial filtering or dynamic sound source location. In-process spatial location estimation based upon direction of arrival (DOA) estimation, time-of-flight event location. Although the preferred embodiment of the gas-borne system described herein involves acoustic source location methods over relatively sparse arrays (e.g. 4-16 elements within the array), it is noted that a more sophisticated and higher cost embodiment of the invention would involve a larger planar array of closely spaced sensors employing phased array beamforming methods (e.g. as found in an acoustic camera or sonar system).

The specific acoustic sensor used within this embodiment of the invention is a high dynamic-range instrumentation microphone capable of high-fidelity wideband measurement of acoustic sound fields (e.g. an externally polarised 40BF from GRAS). However, any acoustic sensor that adequately measures the gas-borne acoustic response within the band of interest could be employed. This primary measurement band of interest for the gas-borne microphone array ranges from DC to 140 KHz, although the frequency range can extend further towards 1 MHz for some applications and conditions (e.g. measuring shock waves from laser Peening or more quantitative high-frequency melt pool spark measurement). Moreover, depending upon the Signal-to-Noise Ratio (SNR) exhibited within the build chamber of the AM machine, it may be possible to use low cost pre-polarized electret devices and/or even IC fabricated MEMS microphones (e.g. Knowles). The majority of such sensing elements that could be employed within the invention are either omni-direction or directional sensors that transduce sound pressure differences precisely in decibels (dB on a log scale) relative to a known calibrated reference pressure (e.g. typically microPascals). However, a further type of acoustic measurement device that could be employed measures acoustic particle velocity in a single vector direction from the powder bed (e.g. Microflown MEMS anemometer devices).

As with any precision sound measurement with high-fidelity instrumentation microphones, it may be advantageous to conduct sound pressure level (SPL) calibration on each array channel within the invention using a sinusoidal sound source of known SPL and frequency—as part of a built-in-test or re-calibration procedure conducted on from time to time. As such, the measured waveform voltage signal can be calibrated against a known sound pressure level incident at the microphone array.

However, as the microphone array can additionally by used to measure absolute air/gas pressure within the chamber during startup vacuum generation and argon atmosphere generation, it maybe be necessary/beneficial to conduct more regular calibration of the microphone array and acquisition system. As such, the apparatus could incorporate a tonal sound source actuator/loud speaker to automate such calibrations and/or be used as a sound source during microphone measurement of the atmosphere (as described later).

Figure 3:
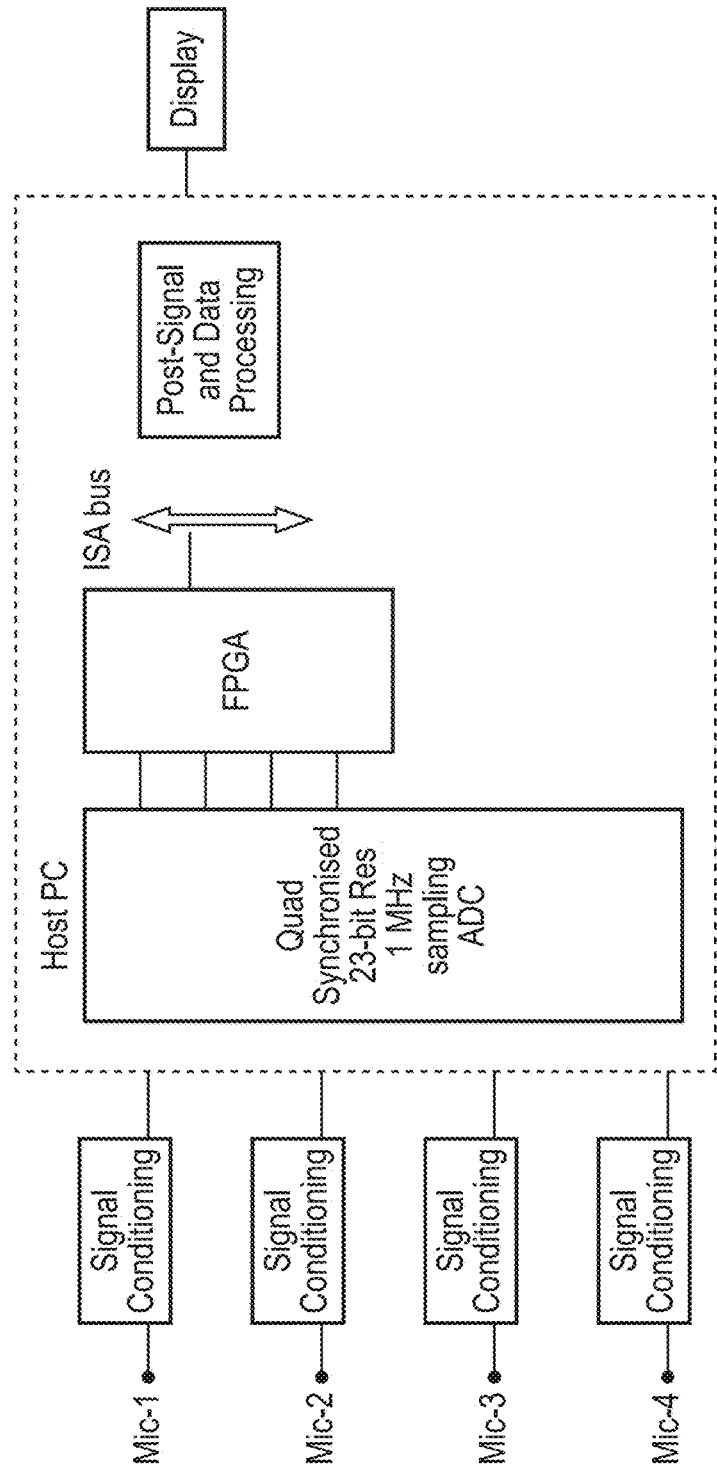
FIG. 3 is a schematic of an electronic system of a microphone array used in the apparatus for detecting gas-borne acoustic signals.

The acquisition system for the gas-borne system is now described, as shown schematically in FIG. 3. The sound pressure level incident at each microphone in the array is converted into a proportional electrical signal waveform that may then be amplified and filtered at source (i.e. a signal conditioning unit with pre-amplifier and analogue filter electronics) before being transmitted to a digital acquisition and processor unit for further signal processing and interpretation. As with any such digital acquisition hardware, the invention incorporates an analogue-to-digital converter (ADC) that converts the analogue measured waveforms into a sequence of digital samples at a sufficiently high sampling rate (i.e. usually over-sampling well above the Nyquist rate) and a bit resolution to accommodate the dynamic range of the measured waveforms. It is highlighted that for all arrays incorporating more than one sensing channel, the ADC is time-synchronized so that precise time-differences of arrival for both time discrete transient and spatially coherent pseudo-CW noises can be estimated between microphone pairs within the array using appropriate signal processing methods.

The ADC electronics may also incorporate a bandpass digital filter (e.g. a HP FIR) and potentially an analogue anti-aliasing filter (e.g. Butterworth, Chebychev) prior to the ADC. The acquisition hardware may also include a Voltage Gain Amplifier (VGA) for automatic gain control, as can be applied in many acoustic acquisition systems. The digitized and encoded waveform stream on each measurement channel can then be processed (e.g. using a micro-processor, DSP unit or FPGA) and stored digitally for further analysis in a database. The following section addresses how the gas-borne acoustic signals can be processed and useful information regarding the selective laser melting process extracted.

A simple, low cost and portable embodiment of the invention for use during any AM process (e.g. wire and arc deposition AM) or simply as a low cost tool to aid a human conducting Arc or MIG welding is described briefly. This would provide an operator with useful real-time audible information associated with the build quality. Unlike the digital system described for installation in AM machines, this low cost embodiment does not require any digital electronics. Instead, it would employ basic analogue heterodyning circuitry in order to shift or baseband the ultrasonic melting response information down to an audible band (i.e. via mixing with a known sinusoidal oscillator). As such, the purely audible response to the laser melting could then be played at any speed to the human operator using headphones or a loud speaker so that the operator can assess the quality of deposition, spot or Arc welding. Similarly, the audible waveform could be fed to simple threshold detector circuitry or bank of matched filters to affect automatic detection of significant variations in the quality of deposition.

Microphone Array Processing

Figure 4:
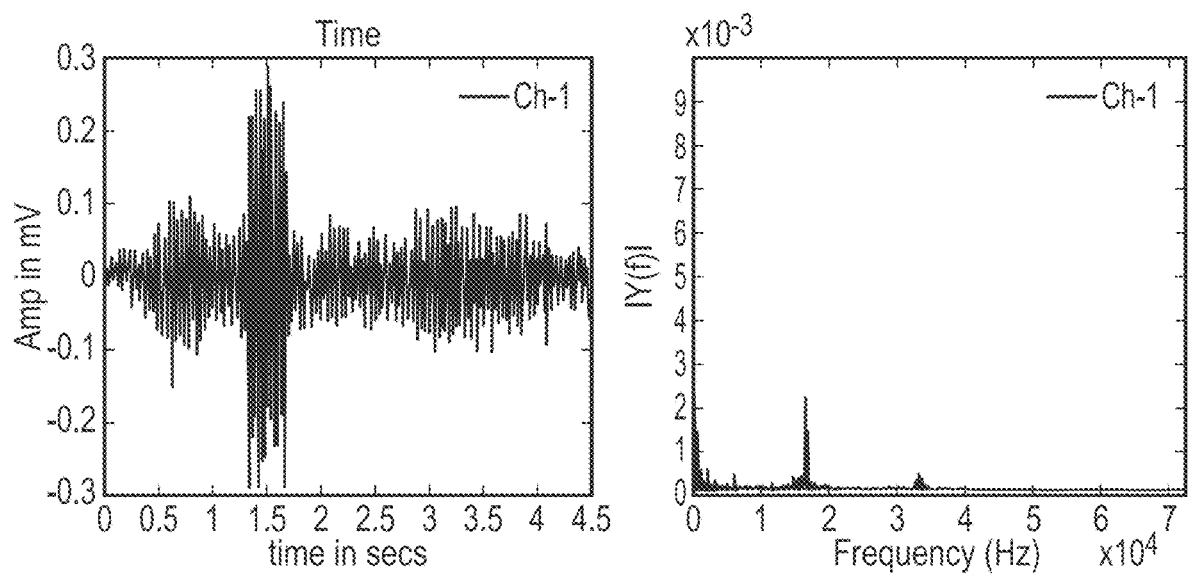
FIG. 4 shows gas-borne acoustic signals detected when melting a single layer of a 6 mm Ti6Al4V test cylinder plotted in both time and frequency domains.
Figure 5:
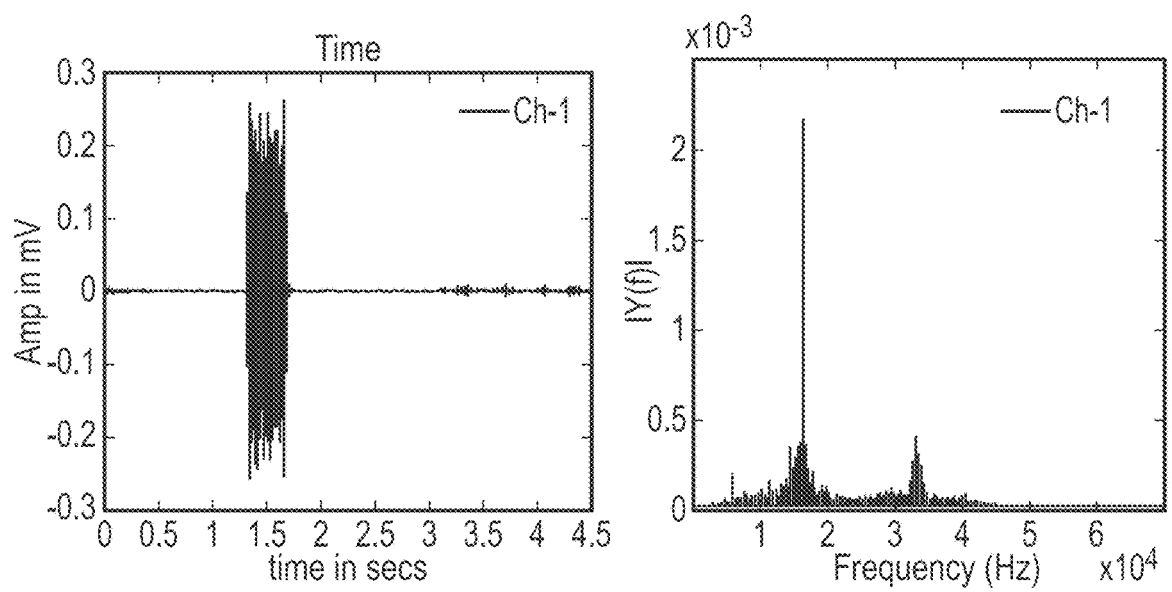
FIG. 5 shows the same response from FIG. 4 AFTER a highpass digital filter is applied to suppress all mechanical noise to leave the laser melting response only.

The gas-borne acoustic waveforms detected by the microphone array are initially processed to separate signal components of interest (i.e. in-process information related to the physical interaction between the laser beam and the powder bed/melt pool) from background noise sources (i.e. mechanical noises within the machine). FIG. 4 depicts time-domain and frequency domain plots for a single microphone response measurement across one layer of a simple geometry 6 mm diameter Ti6Al4V cylinder. As shown, the higher frequency signal components including the laser pulse frequency can be attributed to the melting response. However, this is modulated by significant low frequency noise from mechanical components within the build chamber (i.e. the circulation pump). Due to the spectral differences between these two signal components, the invention implements a high pass digital filter with cutoff at ~6-10 kHz to remove the low frequency mechanical noises, although the filter cutoff can be optimized for each type of bespoke AM machine. As shown in FIG. 5, the low order high-pass FIR filter (i.e. with linear phase) effectively removes all of the low frequency mechanical noise modulating the raw melting response of primary interest for in-process monitoring.

The low frequency audible noise components attributed to the moving mechanical assemblies within the AM machine (e.g. the gas flow pump, the powder wiper 109) can also be isolated using a simple low pass digital filter (e.g. FIR filter design) and exploited within the invention. Such mechanical noise signals can be usefully analyzed for long-term asset condition monitoring or built-in-test within the AM machine. The distinctive audible sound generated by the circulation pump, the powder wiper 109 and/or a Galvo mechanism of the optical module 106 may be recorded and stored as raw waveform data or extracted signal features that adequately characterize the working condition of the mechanism. Such waveform descriptors include spectral descriptors (e.g. FFT, AR, Cepstrum, Wavelet or STFT coefficient), signal amplitude/energy related descriptors (RMS, peak Voltage) and/or statistical descriptors (e.g kurtosis, KS statistic). The system may use condition monitoring methods based upon automated classification of the measured acoustic waveforms from mechanical components within the AM machine. These may be based upon simple decision rules (e.g. a hard threshold) or statistical or pattern recognition methods for automatic fault conditions diagnosis based upon comparison between the input waveform or extracted features derived from the input waveform and a database or model of a priori known measurements.

A primary benefit of the passive monitoring system is that it provides a clear, accurate and unambiguous record (i.e. a rolling temporal report) of the actual laser pulse interactions that occurs against the powder bed melt pool. The invention is particularly suited to AM machines employing pulsed laser heating, offering a range of fine-scale sensing and thus more subtle heating control capabilities surpassing those which can be easily achieved with any AM machine employing a Continuous Wave (CW) laser source. This is primarily because the pulsing laser induces a detectable signal modulation effect within the measured acoustic response that can be processed spectrally in real-time to extract:— (1) deterministic information feedback associated with the actual laser interactions against the powder bed (i.e. acoustically recognize complex laser pulsing profiles during AM builds) (2) stochastic information feedback regarding the ensuing melting condition (i.e. The heating state and consequential dynamics of the melt pool) that may be related to the subsequent AM build part. Within the context of the invention, it is argued that Pulsed Laser SLM AM machines offers more fine-scale control to heating process within a closed-loop system.

The invention can be used with a variety of Pulsed laser heating sources and associated mechanical 'raster' scanning systems found typically within SLM AM machines. These operate in different modes. In one embodiment, the laser pulsing is controlled to induce a variable frequency modulation within the acoustic response (e.g. a chirping or sweeping frequency response) that could also be advantageously exploited by the invention; Regardless of the type of laser and scanning Galvo-mirror system employed, the measured acoustic response (i.e. most notably the evolving frequency) reliably portrays the pulsing events of the laser. Moreover, the dynamic melt pool constitutes the main source of acoustic waves of interest that propagate to the microphones within the build chamber.

Figure 8:
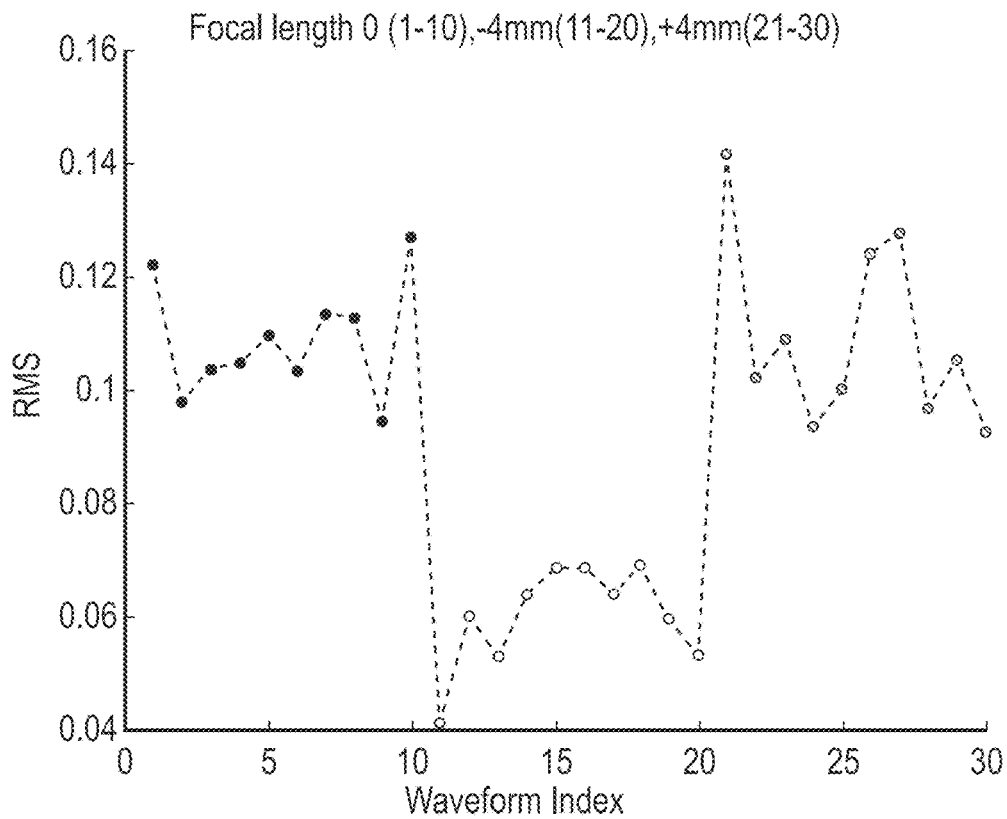
FIG. 8 shows a how the RMS of the gas-borne acoustic signal changes with changes of the Laser focal length from +4 mm above the powder bed to −4 mm below the powder bed.

Several uses of the invention with regards to detecting deterministic heating laser parameters are identified. One way of altering the heating source is to change the focusing optics and consequently the laser beam intensity profile. A useful monitoring function provided by the invention involves automatic detection of any unexpected or deliberate de-focusing of the laser beam by changing optical focal length during complex AM builds. Positive or negative displacement in the focal length (e.g. +/−4 mm) results in a less intense heating spot incident upon the powder bed. It is shown that the gas-borne acoustic response can detect significant change in the heating source focal length. To illustrate, acoustic response waveforms were measured with the focal length of a fiber laser within commercial SLM machine varied from an in-focus (0 mm) setting to positive 4 mm and negative 4 mm settings. The RMS signal level extracted from ten acoustic waveforms from successive layers of a 6 mm test cylinder with these three focal lengths settings is shown in FIG. 8. With the focus 4 mm above the powder bed, a measurable reduction in average acoustic signal energy is seen, suggesting that the de-focused beam diverges causing a less concentrated heating source. However, the focal point set 4 mm below the powder bed generated an acoustic response quite similar to the in-focus case. Therefore, a method for detecting when the heating laser beam focuses above the powder bed generating poorer energy is provided. The acoustic system may also discriminate between different beam shapes based upon similar acoustic signal processing. (e.g. Gaussian or Top-hat profiles).

Figure 6:
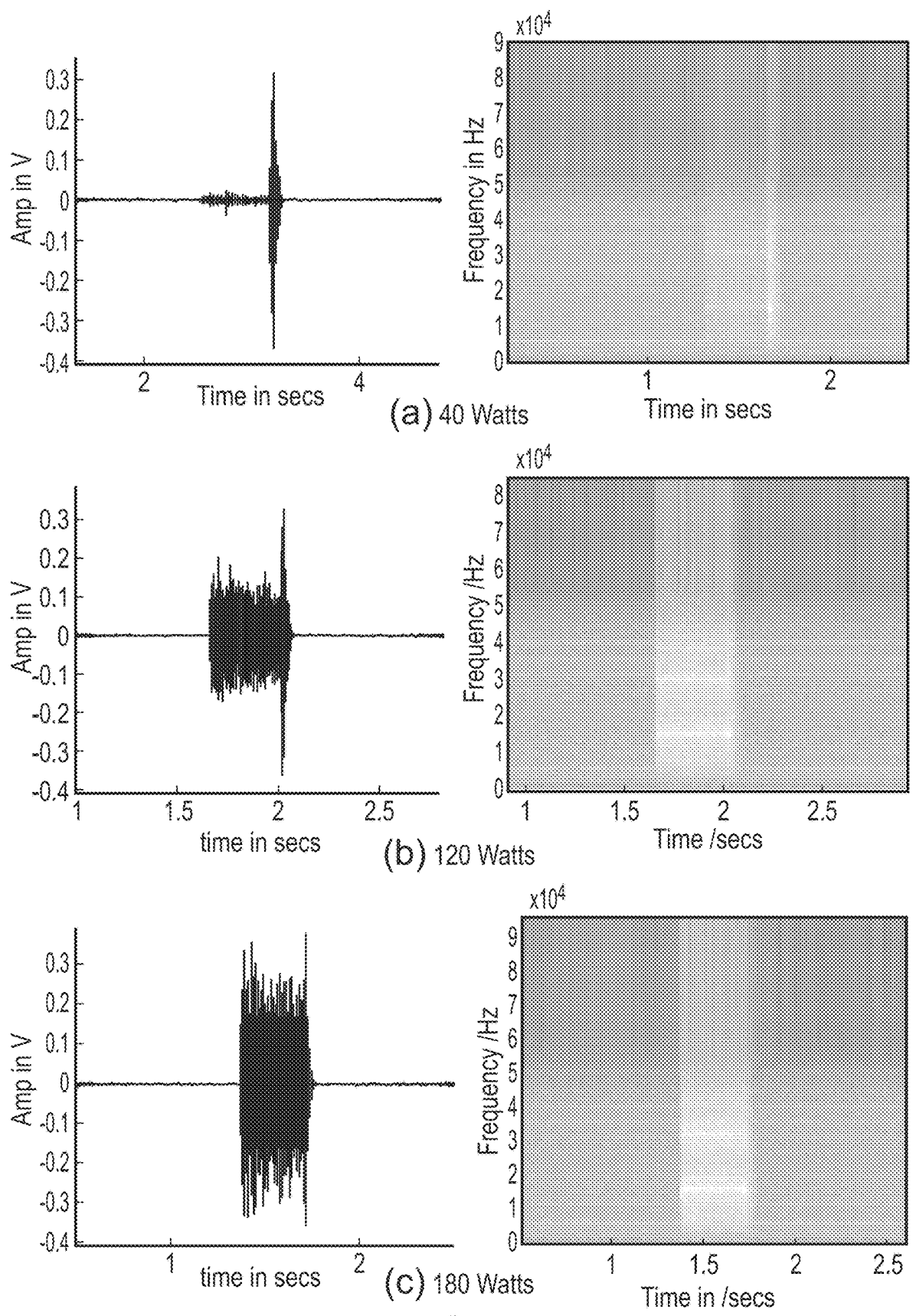
FIG. 6 shows gas-borne acoustic signals measured with the laser power set at 40, 120, 180 Watts.

Another approach to varying the heating energy delivered by the laser within an AM machine is to simply alter the source Laser Power (in Watts). The gas-borne response is sensitive to any such changes in laser power. As such, the invention provides at the very least, a useful approximate method for estimating Laser power, where other related input laser parameters are known or can be derived. However, it is noted that an array of several microphones measuring the same melting response will improve accuracy and confidence in the estimation of laser power by averaging methods and/or calibration tests and propagation loss (atmospheric attenuation modelling). FIG. 6 shows three examples of the gas-borne response measured by a single microphone for a Ti6Al4V cylinder build with the laser set at three increasing powers (40 watts, 120 and 180 watts). As illustrated in the time domain plot, the amplitude and energy in the signal clearly increases with input laser power. As shown by the STFT spectrogram, the broad band energy and narrow band tonal energy increases with laser power. With respect to this 40 watt low power case, it is noted that the invention does not necessarily require the powder to fully melt to induce a detectable acoustic response at the microphone array—and hence another benefit of the invention is to monitor laser to powder bed interactions within the thermo-elastic regime (i.e. below melting). Equally, it is also mentioned that much higher power laser induced ablative processes used within an AM machine could also be easily monitored by the invention.

Several signal processing methods for estimating the energy in the measured gas-borne signal response can therefore be used to infer Laser power directly. Descriptors of signal energy that could be employed include peak voltage, variance and RMS, calculated over any integration period in the time domain. Equally, acoustic energy can be processed as spectral energy densities in accordance with Parsavel's theorem (via FFT coefficients, STFT) or by any waveform enveloping method (e.g. Hilbert transforms coefficients). It is further noted that any type of band-limited estimation of acoustic signal power may equally be used to estimate laser power.

Figure 7:
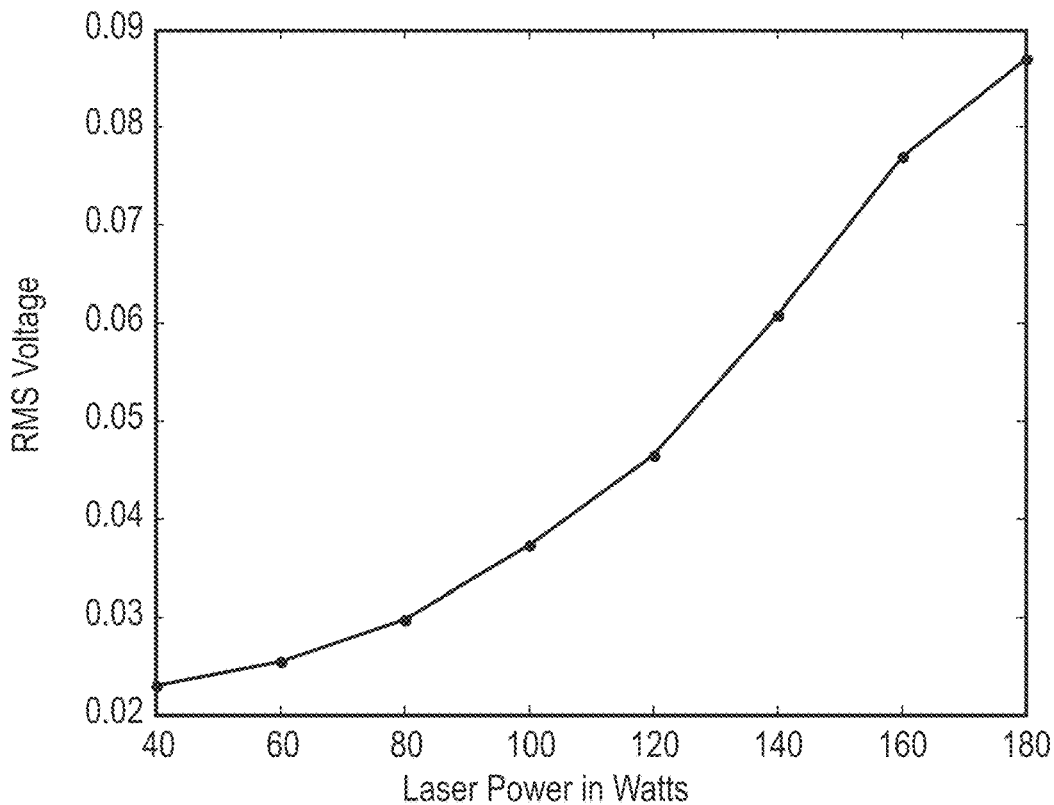
FIG. 7 shows a monotonically increasing relationship between laser power used in the selective laser melting apparatus (in Watts) and the RMS of detected gas-borne acoustic signals when melting layers of a 6 mm test cylinder.

FIG. 7 shows an empirically derived relationship between the input laser power ranging from 40 to 180 W and the RMS Voltage of the gas-borne response (taken as an average across 10 successive layers at each power) during the Ti6Al4V test cylinder AM build on a commercial SLM machine. As shown, the RMS Voltage increases monotonically with laser power. It is further noted in FIG. 6, that the larger more energetic transient signal seen at the end of each signal response corresponds to the transition between the laser conducting volumetric hatch melting across the cylinder layer and the subsequent part contour melting defining the cylinder's external surfaces. The contouring signals that exhibit a higher amplitude gas-borne acoustic response are attributed to the smaller point distance (i.e. the distance in microns between successive heating points along a hatch line). Such contour melting within any build that forms the surface of the resulting AM part is often selected to have a shorter point distance than the bulk volume hatch, resulting in increased heating effects within the perimeter melt pool as a consequence of closer heating points and poorer heat sinking into the fused AM part around the perimeter edges. Contour melting can involve inner and outer perimeter melting patterns with potentially different point distances and/or exposure times. The invention provides a useful method for monitoring the validity (i.e. direct measure of deterministic point pattern) and quality of the contouring (i.e. spectral spread cross referenced with amplitude information in the microphone response to ensure even heat distributions). It is also noted that prolonged contouring operations across confined areas of a layer can induce differences in acoustic amplitude that can be detected and interpreted by the inventions data processing scheme (i.e. auto classifier).

Figure 9:
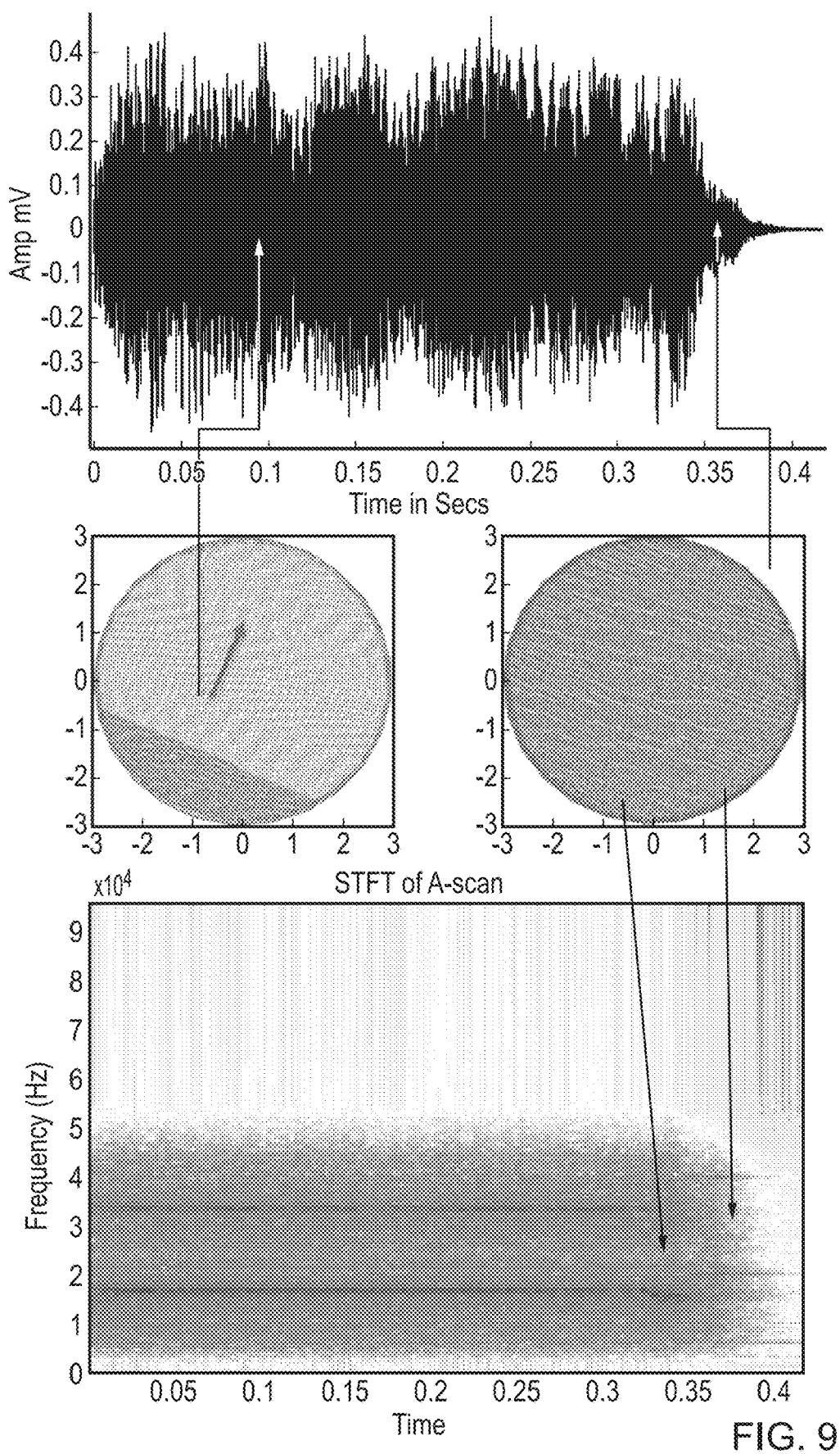
FIG. 9 are time domain and STFT plots for gas-borne acoustic signals detected when forming a layer of the Ti6Al4V test cylinder showing differences in the gas-borne acoustic signals for hatch and perimeter scanning.

To illustrate this, FIG. 9 shows the melting point pattern employed for a single layer of the 6 mm Ti6Al4V test cylinder built on a commercial SLM machine with standard input parameters (i.e. 200 Watts laser power, 50 microseconds exposure time, and 75 microns point distance). As indicated, the heating laser (i.e. spot shown in green) moves laterally along each adjacent hatch line with a set point distance with an orthogonal rotation vector changes after each row (e.g. 67°). After hatching is complete, the laser melts around the perimeter contour with a different combination of laser parameters to induce the required surface finish or surface porosity effect. The resulting gas-borne acoustic response measured by the invention for the test cylinder example is represented in both the time domain and the spectrogram domains. As indicated, there is a clear difference in the spectral content between the hatch and the contour melting regimes. In this case, the melting point pattern involves an inner circular contour at the same point distance as the volumetric hatch and an outer contour with a shorter point distance period. These different melting regimes are clearly visible in the STFT FIG. 9. In this case, the inner contour occurs first with the same hatch point distance, although it is noted that the movement is circular rather than linear. The outer circular contour induces a frequency shift upwards (~ from 16.8 kHz-α20 kHz) with respect to the hatch frequency across its melting operation attributed to the finer pitch point distance. As such, the invention offers a reliable real-time method of discriminating between bulk volume hatch melting operations and part contouring operations, based upon spectral analysis[1]. Also, the spectral boundary and spacing between hatch melting and contour melting points in an STFT may additionally be used as useful markers to automatically recognize and/or uniquely identify acoustic information from a specific AM part or specific area/section within the build.

[1] It may also be useful to employ high Q-factor resonant acoustic sensors matched to a certain point distance/exposure time combination.

The invention provides a robust method for estimating and/or tracking point distance patterns between heating points within a SLM machine based upon time evolving STFT spectral processing or any time-frequency transform. A further example comparing melt response waveforms from the Ti6Al4V test cylinder with different point distances is provided. FIG. 10(a) shows waveform information for the gas-borne responses generated for single layers of the Ti6Al4V test cylinder with two quite different point distance settings (55 and 95 microns). The STFT indicates the melt response with a short point distance set at 55 microns causing a high spectral peak (~16.5 kHz). In contrast, FIG. 10(b) for the melting response with the point distance extended to 95 microns reveals a lower frequency spectral peak (14.25 kHz)—again confirming spectral differences that can be used to discriminate. It is further noted that there are measurable differences in the fine-scale spectral widths or local spectral energy spread within the peaks for the differing point distances and radius of curvature geometries. High-resolution spectral analysis, as implemented within the invention, shows that the spectral content is less confined and spread over a wider local band for the 55 PD case. Thus, the invention can recognize and/or identify particular melting geometries (e.g. scan-point melting patterns) directly by fine-scale spectral analysis of the tonal energy swathes. Moreover, analysis of how the spectral peak or local shape distribution evolves may be related to both the scan-pattern and the ensuing exposure-time, as discussed later. The invention can implement any known signal processing algorithm for quantifying the distribution, summation or spread of tonal peak information across spectral noise via any appropriate high-resolution spectrum (e.g. all measures or Signal-to-noise ratio SNR in the frequency domain for measuring and/or classifying tonals, Spectral Flatness etc.).

It is highlighted that several known Time-Frequency transformation methods can be employed for spectral recognition within the invention—including the Spectrogram. Importantly, the higher FFT resolution (i.e. number of FFT coefficients calculated) required for such high-resolution spectral analysis must have an appropriate time window and overlap resolution, so as not to contravene Heisenberg's uncertainty principle (i.e. spectral leakage or blurring). Moreover, the temporal integration period (i.e. use of averaging across the time domain) may also be selected to optimize automatic tonal detection/recognition within the subsequent data processing—and/or provide an appropriate visual integration period for display to any human operator (i.e. human-in-the-loop recognition). It is further noted that, as well as any conventional spectral methods based upon correlation transforms across orthogonal basis functions (e.g. sinusoids for DFT, mother scale functions for wavelet decomposition), a class of further auto-correlation spectral methods may equally be applied within the invention for high-resolution spectral recognition—including the Wigner-Ville distribution taken across band limited portions of the measured melting response and using known methods for suppressing the inevitable cross-terms within such high-resolution auto-correlation time-frequency method.

The example shown in FIG. 10 also illustrates another important method within the invention. It pertains to the wide use of amplitude statistical descriptors that are routinely extracted from the gas-borne response measurements in order to be used as inputs, along with the extracted spectral features, into subsequent automatic detection algorithms (e.g. CFAR) and/or automatic classification engines (e.g. Linear Discrimination, ANN, Cluster algorithm, Baysian classifier). Several types of waveform descriptor can be extracted from the raw gas-borne melting response and the invention can fine-tune this vector for specific scenarios (e.g. part geometry, powder type). For example, as shown in FIG. 10, a contiguous or time-shifting buffer of RMS values extracted from the measured waveform stream can provide a useful rolling estimate of the signal energy (although any such amplitude related descriptor would suffice). Also shown are another important group of waveform descriptors employed within the invention that provide a concise low noise evolving estimate of amplitude distribution shape (e.g. histogram, PDF or CDF). Such waveform descriptors are dimensionless so can be less affected by some sources of variability in the absolute measured waveforms (e.g. frequency dependent attenuation). For example, Kurtosis (i.e. the 4th moment) portrays the general spikiness of the measured acoustic waveform (or an estimate of the extreme outliers in the distribution) over a suitable window size to be continuously estimated. Skewness (i.e. the 3rd Moment) indicates the waveform symmetry and the Kologormorov-Smirnov (KS) statistic is a goodness-of-fit measure quantifying the maximum distance between the waveform CDF and a suitable model (e.g. Gaussian). As shown in FIG. 10, both the RMS and Kurtosis features detect the amplitude modulation prevalent in the 55 micron point distance waveform. This illustrates a general observation made by the invention that AM builds with shorter point distances can often additionally be associated with a more pronounced Amplitude Modulation in the measured gas-borne response (observed over time using any signal processing method). Moreover, the modulation peaks often coincides precisely with the points at with which the laser spot reaches ends of hatch lines—which can be justified by an increase in heating effect—but it is emphasized that this represents another combined method for indicting point distance patterns. In fact, it is claimed[2] that the rolling spectral and amplitude statistics record of the measured gas-borne melting response can be used to identify/recognise the combination of point distance and exposure time.

[2] Although, the invention may include current point distance values within the signal feature vector input to automated classifier in-real-time. Although, the invention may store point distance profile patterns before use or synchronise with the laser control providing point distance information in real-time, it is highlighted that a priori knowledge is not required as spectral FFT processing implemented in parallel facilitates autonomous point distance estimations in real-time across complex geometry builds.

Figure 11:
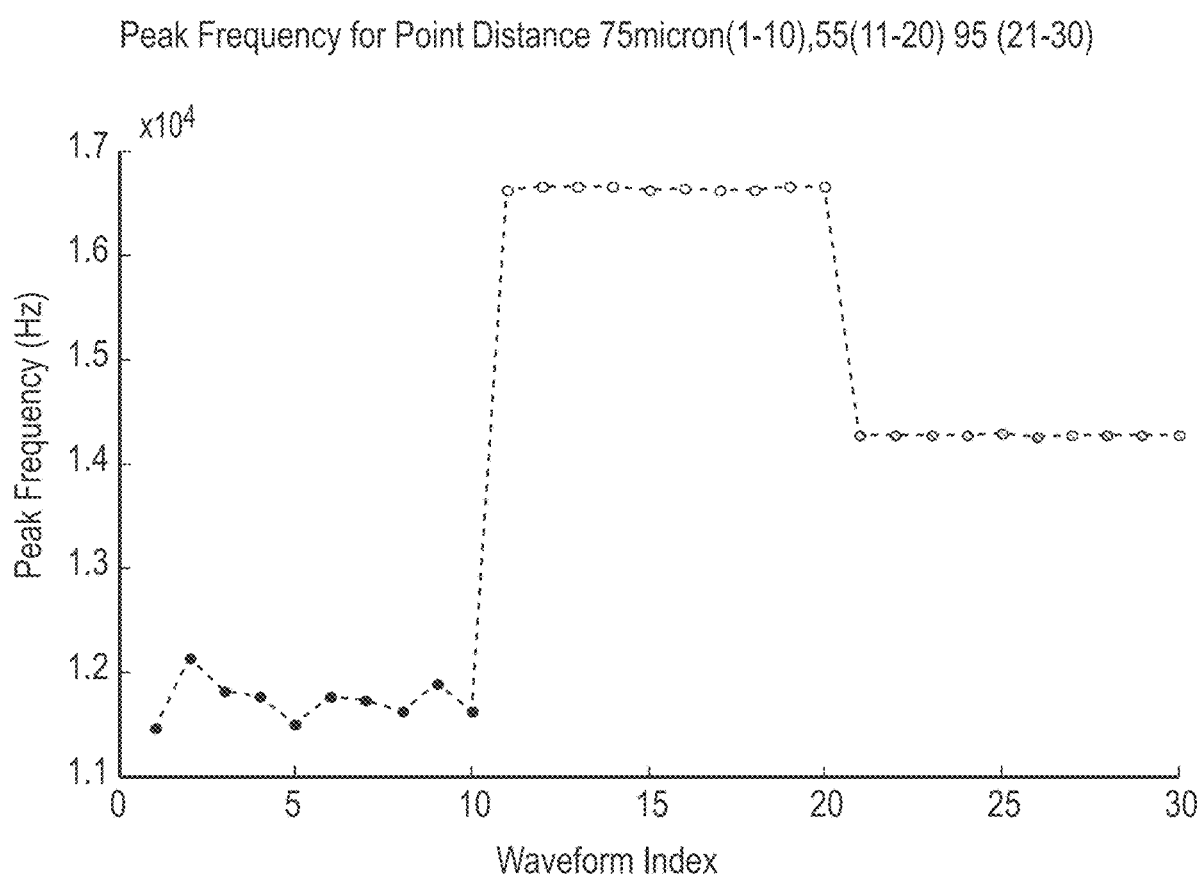
FIG. 11 shows peak spectral frequency in the gas-borne acoustic signals when melting Ti6Al4V when forming the test cylinder for three different point distances.

FIG. 11 shows the relationship between the dominating frequency peak from the FFTs across ten successive melting responses with three different point distance (PD) settings (i.e. 75, 55 and 95 microns). As shown, the spectral peaks are quite characteristic of the point distance, especially for the 55 and 95 PD cases with a standard deviation of <15 Hz (75PD was 190 Hz). Comparing the 55 and 95 micron waveforms, it follows that the frequency for the 55 PD should be higher because the time period between successive excitations of the melt pool is shorter i.e. it takes less time for the laser spot to reach the closer heating points than for the PD95 case. This argument holds because the exposure time for both (i.e. set at 50 microseconds). However, the 75 micron PD is considerably lower. This is because the exposure time (i.e. the dwell time at each point) for the 75 micron PD waveforms was selected to be longer at 70 microseconds. This example illustrates that the tonal peaks observed in the gas-borne microphone waveforms from melting are determined by a combination of point distance and exposure time (ET)—but these can be deduced directly from the time and frequency information within the gas-borne melting response.

Figure 12A:
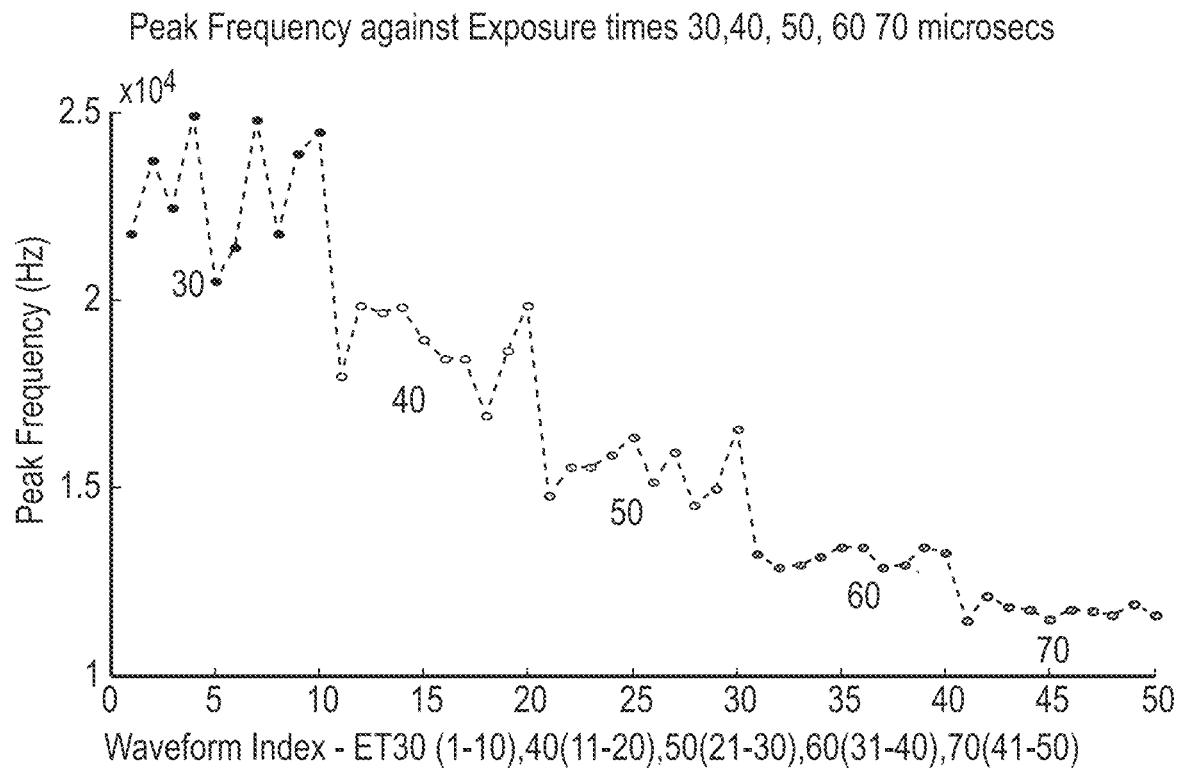
FIGS. 12(*a*)-12(*b*) shows peak FFT frequency for gas-borne acoustic signals detected for 50 points scanned with 30, 40, 50, 60 and 70 microsecond exposure times taken over (a) entire duration and (b) the first 52 msecs of each waveform.

For a constant point distance (PD) set at 75 microns and a laser power set at 200 Watts, the waveform characteristics of the gas-borne melting response is also considered for cases where the laser's exposure time (ET) on each scan point is altered, again using waveforms measured from the 6 mm test cylinder. FIG. 12(a) shows the relationship between Exposure Time and the maximum peak within the FFT of the measured gas-borne response over both the full duration of a layer and also the first 52 msecs of each layer (i.e. a constant time duration integration period). As shown, there is a clear inverse proportionality between the primary spectral peak frequency and the laser exposure time at each melting point. As the point distance was constant, this may be justified by the longer effective period between excitation pulses delivered to the melt pool for the longer exposure times. However, it is further noted that the variability in the peak dominant frequency is progressively reduced as the exposure time is increased. This may be related to detectable physical differences in the melt pool excitation (i.e. shorter excitations cause measurable differences in the modes of vibration for the melt pool or its frequency response). FIG. 12(a) was taken over the entire melting response waveform whereas 12(b) was taken over a much shorter integration period so as to indicate that the peak is stable—proving invariance in the invention's ability to discriminate different laser exposure times from spectral information integrated very short time durations (i.e. almost instantaneous ID of exposure time could be possible).

Figure 12B:
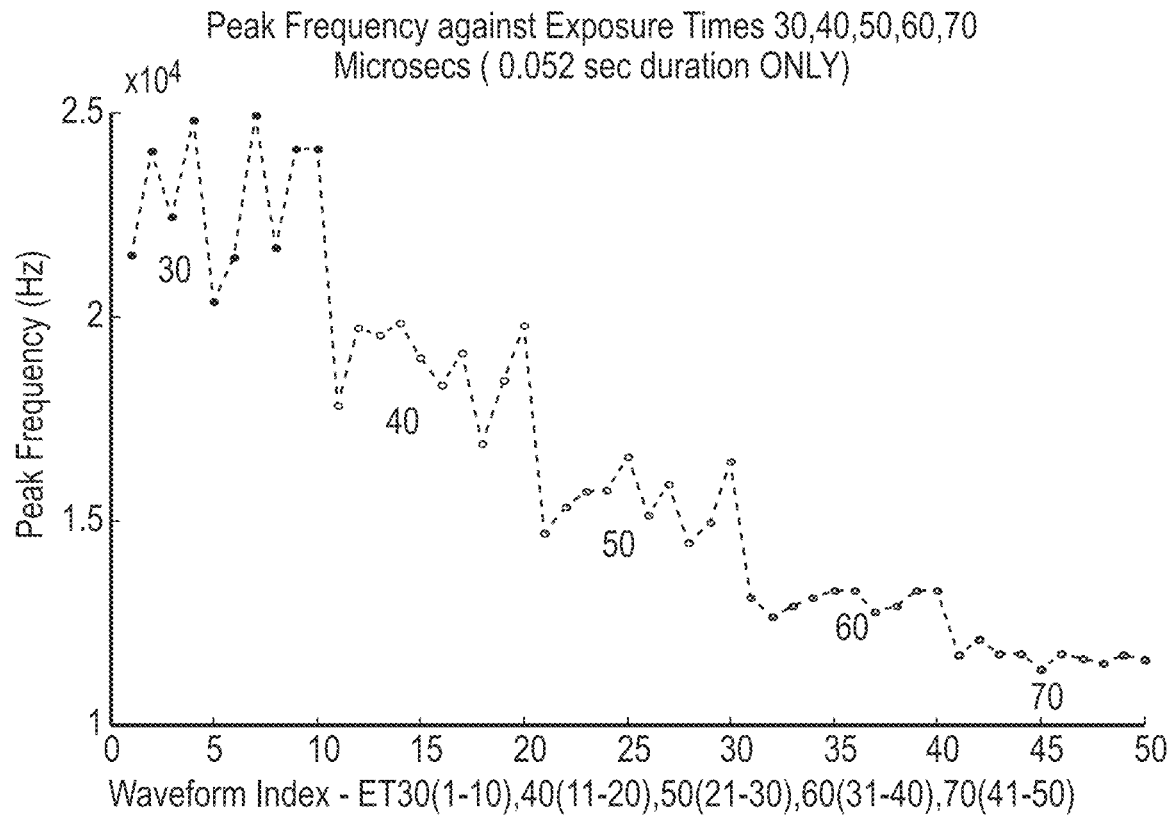
Figure 13:
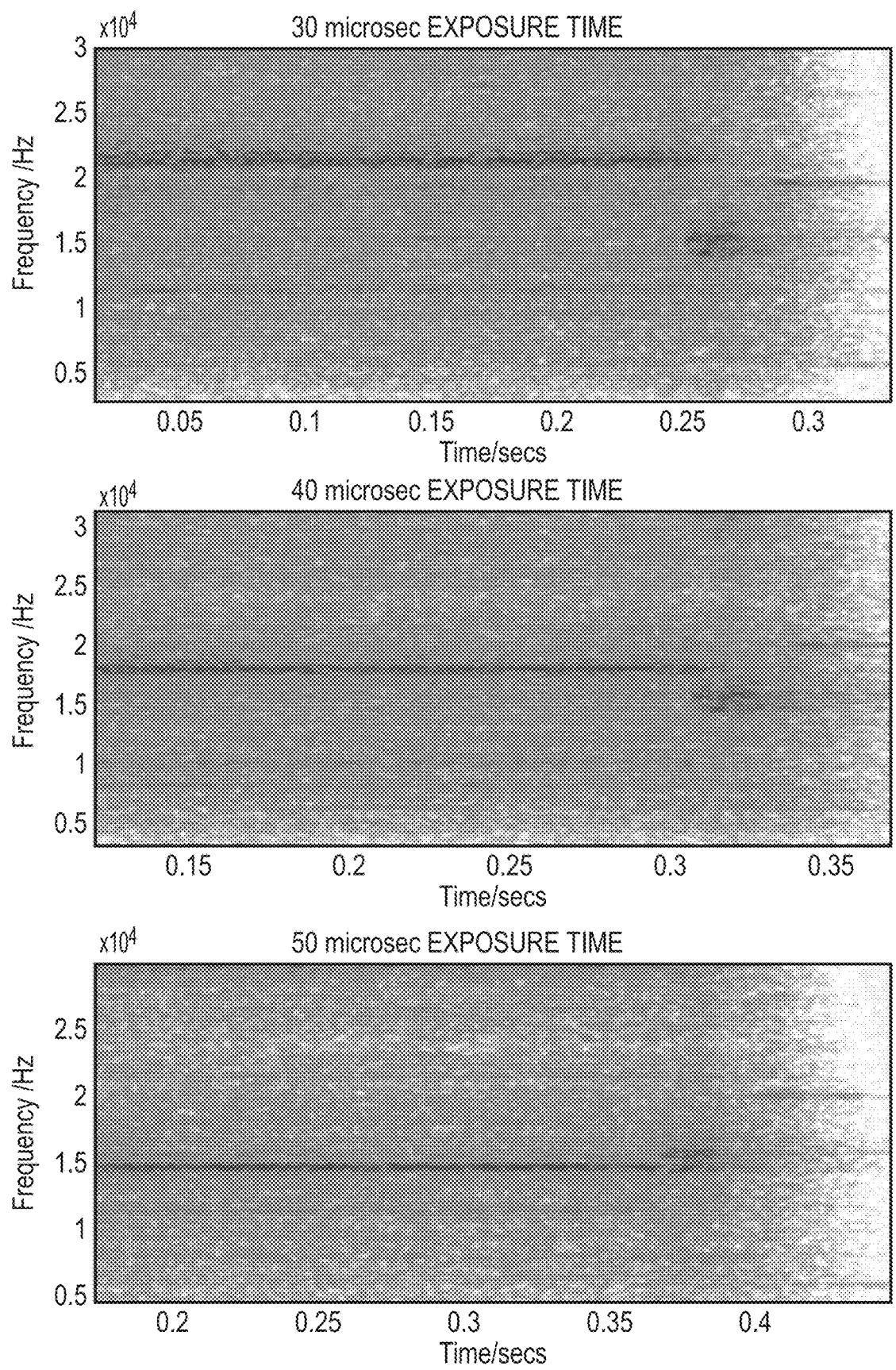
FIG. 13 are example of high-resolution STFTs showing a distribution of spectral energy for 30, 40, 50, 60 and 70 microsecond exposure times when melting Ti6Al4V of the test cylinder.
Figure 13:
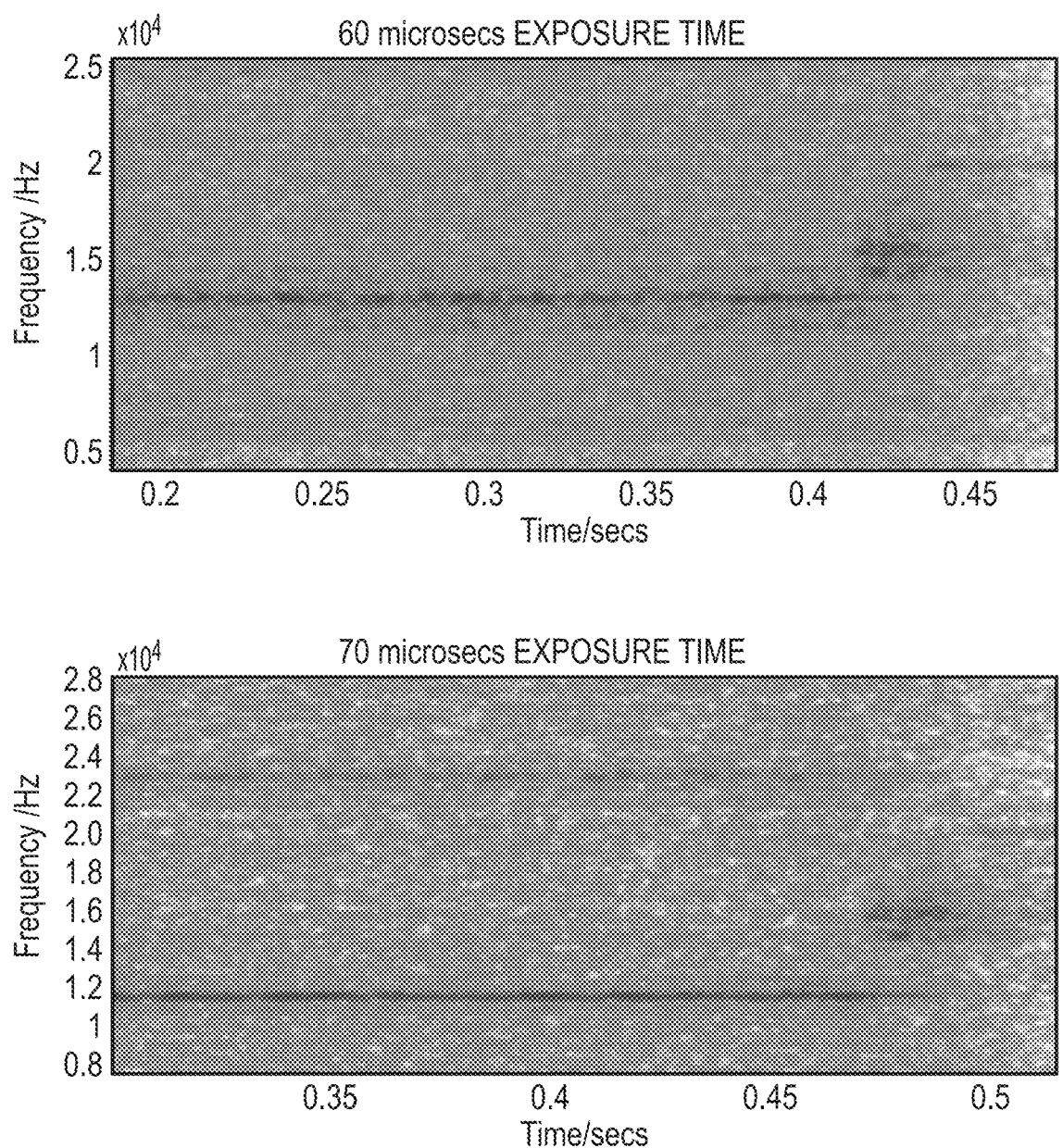
Figure 14A:
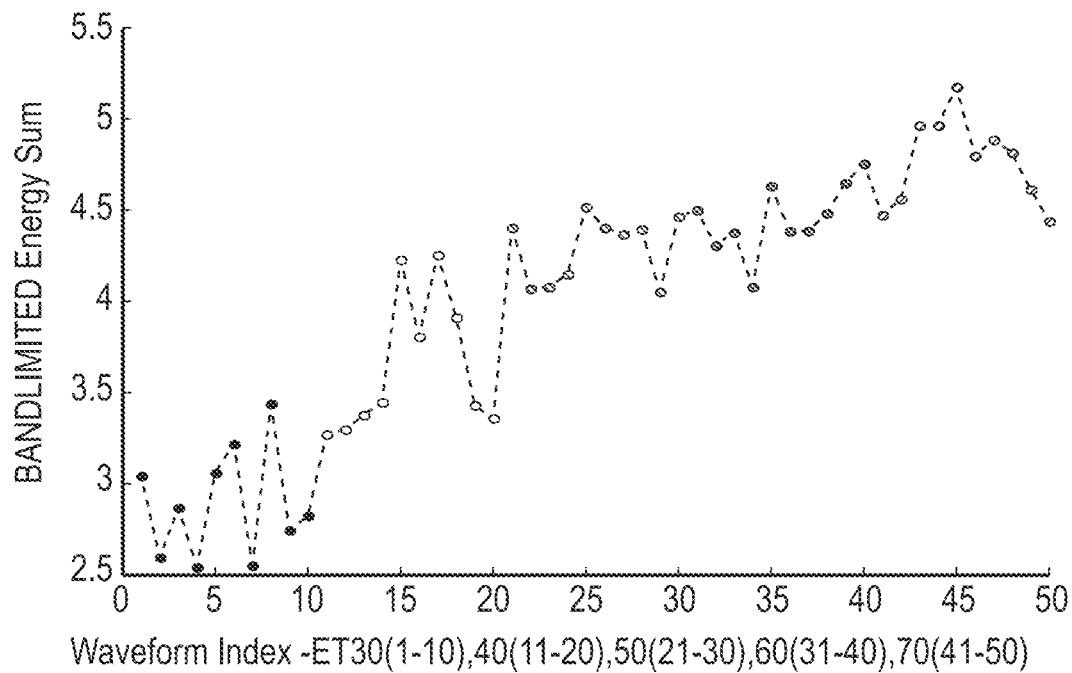
FIGS. 14(*a*)-14(*c*) shows bandlimited energy and integrated energy waveforms of the gas-borne acoustic signals with respect to exposure time.
Figure 14B:
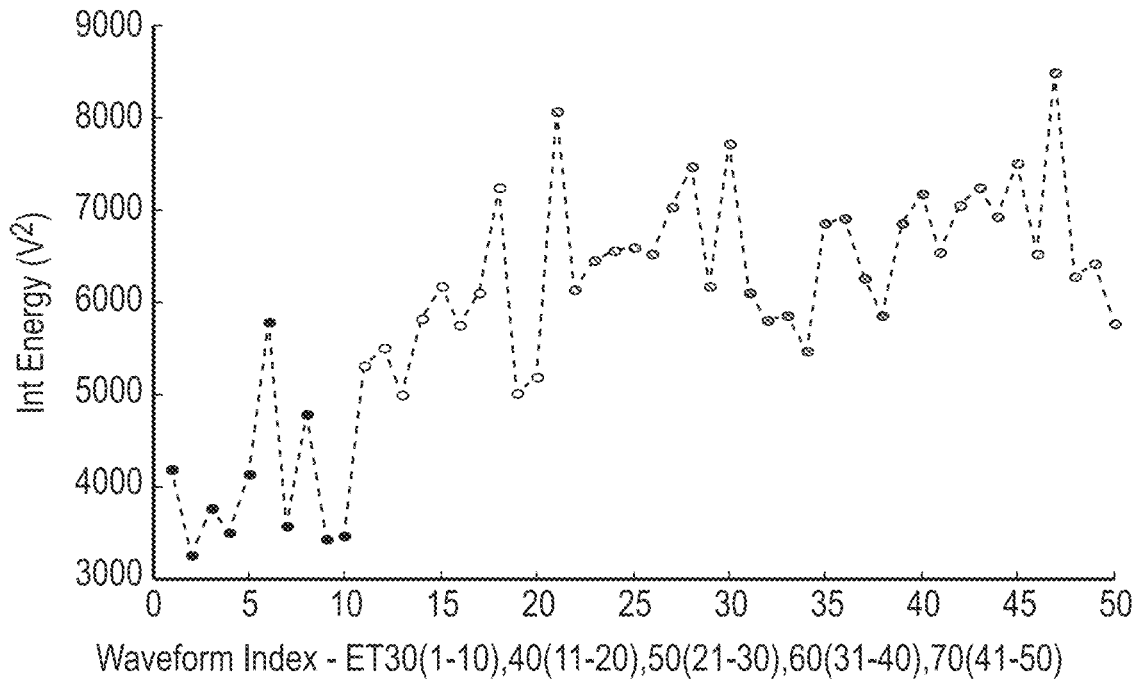

To illustrate the invention's ability to discriminate between different exposure time settings within selection laser melting AM machines based entirely upon fine-scale differences in the peak spectral distribution (via high-res frequency analysis), FIG. 13 shows the main spectral peak from waveforms measured across the range of exposure time settings used in FIG. 12 (i.e. 30, 40, 50, 60, 70 microseconds). The fine-resolution STFTs shown (i.e. 8192 pt FFT) attempt to show the differences that invariably exist within the spectral swathes from waveforms with different frequencies. Generally, it is argued that shorter exposure time pulses infer more transient melt pool excitation and hence a measurable broader band spectral peak distribution. Therefore, an important feature and benefit of the invention, especially within any embodiment incorporating extremely high-fidelity and high bandwidth instrumentation microphones (e.g. GRAS40BF), is its ability to measure and resolve extremely subtle differences in frequency content. FIG. 13 also shows the spectral characteristics of the contouring (i.e. which follows the same melting point pattern from each case) and its consistent frequency relative to the main spectral peak. Use of summation across the band-limited energy within the measured melting acoustic waveforms response is illustrated further in FIG. 14. By band-limiting the summation of spectral energy to near the laser frequency, a useful relationship between acoustic waveform energy and laser exposure time may be derived, although several ways of extracting energy related measures of the gas-borne melting response could equally by considered. For example, RMS or any measure of square-law integrated energy or signal envelope (e.g. as provided by the H-transform).

Figures 14C, 15:
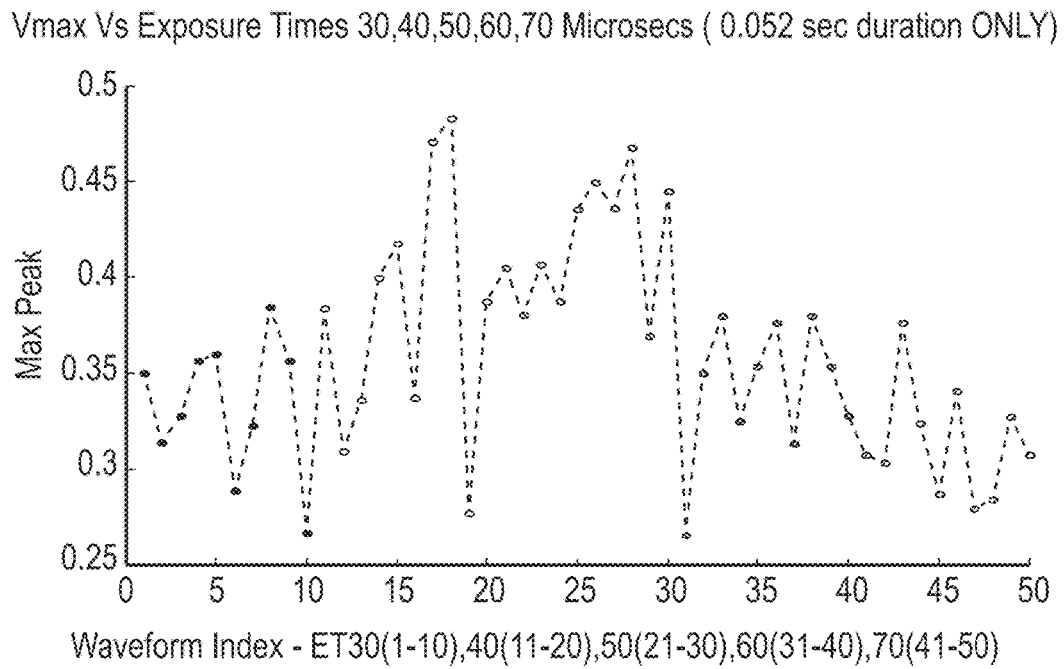
FIG. 15 is a table of input build parameters used for building test cubes repeated across the powder bed.
Figure 16:
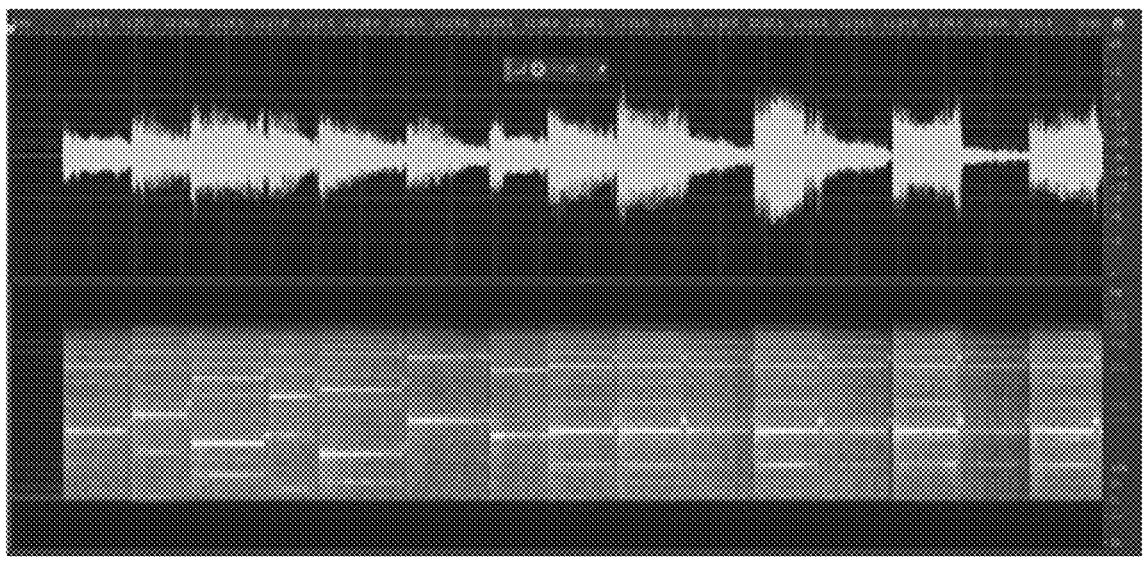
FIG. 16 shows time domain and spectrogram plots for gas-borne acoustic signals detected by a single wideband microphone during a build layer across 15 cubes built using the laser parameters shown in FIG. 15.
Figure 17:
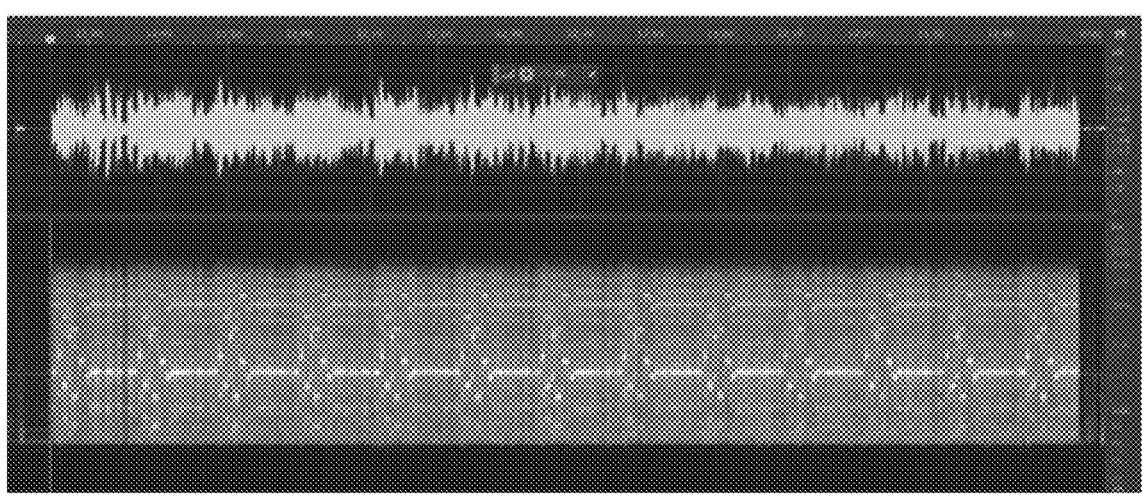
FIG. 17 shows time domain and spectrogram plots for gas-borne acoustic signals detected by a single wideband microphone during an entire build layer of 13 repeated sets of 15 test cubes built using the laser parameters shown in FIG. 15.
Figure 18:
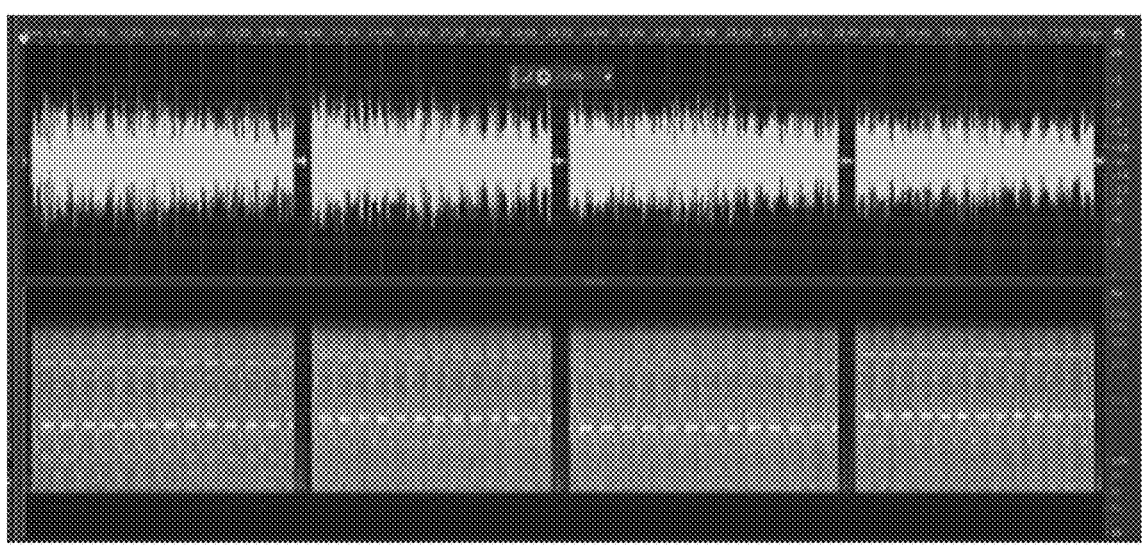
FIG. 18 shows time domain and spectrogram plots for gas-borne acoustic signals detected during four successive layers of the test cube build showing the frequency modulation.

To illustrate the invention further, the acoustic melting response measured during an AM build incorporating a large sample of 10 mm test cubes with a combination of input laser build parameters shown in FIG. 15 is considered. Here, the sets of fifteen combinations of input parameters cubes are repeated thirteen times across the powder bed substrate. The gas-borne response for the first fifteen cubes is shown in FIG. 16 plotted in both time and STFT domains. From this, it can be deduced that a unique combination of spectral information and amplitude distribution can be employed within the invention to identify laser interactions with the powder bed. It is also noted that the amplitude distribution of the acoustic response across each cube is not even, with a larger initial burst of energy compared to the following melting response across the hatch. This can be attributed directly to the realistic inertial response of the Galvo-mechanism suggesting that the effective laser spot dwell-time at the beginning of each volumetric hatch operation is not linear and the heating is increased at the beginning because a small number of successive laser pulses (e.g. 5 or 6) will be delivered to the powder bed at the same/a similar point before the Galvo begins to move. FIG. 17 shows the full acoustic response for the entire layer across the substrate spanning >16 cm by 16 cm, illustrating the response measured by a single microphone from all of the thirteen repeated sequences of 15 cube sets. This shows that the spectral sequence information for each set of 15 cubes is repeated across the substrate. Consequently, it is highlighted that such spectral identification can be effectively invariant to spatial location across the powder bed. Further, FIG. 18 extends the measurement time window to encompass the gas-borne response across the test cube build to four successive layers. Again, this confirms that the spectral pattern across the build is repeated on every layer. However, each layer in this build involves the hatch angle being rotated by some set angle (i.e. 67°) on every new layer. This accounts for the measurable shift in frequency that occurs in the narrow band spectral information of interest for every new layer and can be entirely consistent with a deterministic affect within the Galvo system hardware.

Although it might generally be expected that positive correlation should always exist between the energy or amplitude of the measured acoustic melting response signal and the laser parameters related to heating energy (i.e. Power, beam Intensity profile, Dwell or exposure time), this is not always the case for the invention. This may be because:—firstly, as it will be discussed, the gas-borne acoustic response signal has not only the deterministic components related to melt pool excitation and amplitude modulation from increased heating at hatch ends, but incorporates a significant stochastic component related primarily to melt ejection sparks (i.e. with some dependency on the other two more deterministic components but also with several other driver/causes such as powder grain, the atmospheric condition, re-circulation). Unlike the tonal information, the stochastic signal components can be extremely broadband. However, effective separation of tonal and broadband information within the measured signal can provide improved interpretation. It is also possible that time-synchronised measurement of the melt pool emissions across the array of several microphones could facilitate sophisticated de-convolution methods (e.g. ICA) for improved blind source separation. Moreover, as already mentioned, where absolute amplitude related signal descriptors prove ineffective in characterizing the melt pool response, descriptors based upon relative amplitude distribution can be employed for signal classification rather than those related directly to absolute SPLs (e.g. related to amplitude distribution statistics and the waveform histogram, PDF, CDF or extracted metrics such as Kurtosis, Skew, Kologormorov-Smirnov (KS) statistic modeled to any candidate distribution).

Secondly, it is highlighted that acoustic attenuation or propagation loss between the melt pool acoustic source and the microphone array influences the absolute amplitude of the acoustic response. Moreover, such attenuation within the build chamber has both a constant geometric spreading component (e.g. spherically spreading $1/r^2$, cylindrical spreading $1/r$ or somewhere in between etc) and a frequency dependent absorption component, where attenuation becomes more prevalent within the higher frequency band (e.g. low ultrasonic). Therefore, the relationship between the frequency content and absolute amplitude of the measured melting response may not always seem consistent. Frequency dependent empirical or physical models of the propagation loss exhibited within the build chamber atmosphere may also be included within the invention (i.e. via empirical derived propagation loss curves) to calibrate out or negate any colouring affects induced by frequency dependent attenuation on the absolute SPL measurement. It is also noted that ultrasonic waveforms can non-linearly demodulate in the near-field atmosphere (as described by the function of parametric loud-speakers).

In summary, the gas-borne response to melting measured by the invention is useful for monitoring the laser input parameters or for 'laser truth data validation'. This instantaneous record of what the laser is doing can then be used in combination with other extracted features from the signal that infer melt pool condition information (e.g. Amplitude modulation, energy distribution etc.). For any type of modulated heating source, a rolling record of exposure time, duty cycle, dwell time[3] and/or Point distance may be deduced from the time evolving spectral content of the measured microphone response with only a modest time lag latency to allow the acoustic wave sources to propagate to the microphone array and basic spectral processing of the measured waveform. Processing the melt response waveform across several microphones in the array may improve the estimation accuracy or the certainty in the estimation. As now discussed, this basic spectral processing to estimate or track laser interactions in time is supplemented by an appropriate acoustic signal feature vector that is also extracted by the invention from the raw measured melting response or multiple time-synchronized responses across the microphone array. Such signal feature vectors are generated in parallel to the aforementioned spectral coefficients (i.e. that are used primarily for the above laser interaction and melt pool location). This feature vector contains all signal descriptors used to recognize or classify melting response waveforms so as they can be suitably related to the condition of the melt pool—so that the invention can be used for high resolution closed-loop system control of the melting process. Prominent within the feature vector are descriptors that characterize amplitude distribution and envelope shape. However, it is further noted that the signal feature vector may actually include descriptors extracted directly from the spectral processing (e.g. time stamped spectral peaks or relative measures between peaks).

[3] Any variation in the input laser parameters (e.g. Exposure time or Point distance) can change the dwell time at each heating point and consequently affect the amount of heating energy absorbed at each location across the powder bed (E=P*t).

In addition to recognition of time-varying deterministic laser parameters during a steady optimal melting condition build, the invention will detect and automatically assess the randomly occurring by-products of laser induced metallic powder melting that can provide strong cause-effect evidence to sub-optimal melting conditions. It is emphasised that the invention can reveal significant departures from an optimal melting condition and can do so almost immediately. As such, critical information feedback can be provided so that the input laser parameters controlling the incident dynamic heating source can be adjusted in real-time in order to maintain a steady melting state. Such a closed-loop system is a primary use of the invention.

Perhaps the most undesirable melting condition occurs when a combination of input system parameters (including the laser parameters) and part geometry induces localized serious over-heating (bubbling or boiling) within the melt pool. This can occur at locations of intricate features or spurs within the AM parts and can be attributed to temporal or spatial concentrations in heating points and also the poor thermal conductivity into the part. Such transient increases in instantaneous melt pool heating energy can induce unstable thermal agitation resulting in more substantial molten powder particles being ejected from its surface—causing random intermittent transient acoustic emissions that are detected and classified automatically by the invention.

Increased occurrence of melt ejections constitute an unstable melting condition similar to sputtering in welding. However, a further undesirable consequence of an increase in melt ejection volumes within the SLM AM machine is that the molten particles are more likely to land back on to the powder bed at locations that have just been or are about to be melted into the AM part. This is detrimental to the subsequent build part (e.g. induced porosity). As described, melt ejections can be detected by the gas-borne acoustic monitoring proposed. It is noted that a distribution of melt ejection sparks are emitted from the melt pool. The physical characteristics of such sparks (i.e. mass, velocity and temperature profile) can have a direct causal affect upon the quality of the subsequent build and in particular its porosity. For example, fully dense AM parts with negligible porosity may be associated with high velocity low mass molten sparks projected in high trajectory tight plumes away from the melt pool. In contrast, high porosity AM builds may often be associated with a wider distribution of molten particle masses, many following low velocity low trajectories from the melt pool. The invention offers a useful method for automatically discriminating between these two sparking scenarios.

As described, steady and stable melting induces characteristic tonal ringing components within the gas-borne response that the invention detects and relates directly to the laser pulse frequency inducing resonance excitation modes in the melt-pool. As such, a narrow band detector and notch bandpass filter could be used to extract this component (e.g. band-limited square-law CFAR) from the broadband background. Generally, it is believed that low amplitude and evenly distributed energy within the acoustic response (in time or frequency), measured by one or all microphones within the build chamber, with an absence of larger amplitude randomly occurring transients within the waveform may be related to a more even and stable melting condition. However, in addition to laser induced tonal information incorporating amplitude modulation from hatch-end events, the invention also accommodates the automatic detection and classification of the ensemble of high-frequency broadband shock wave activity emitted by molten melt ejections emanating from the melt pool. That is, the invention does not only measure and classify the spectral distribution around/near the tonal peaks within the measured melting response (i.e. the basic acoustic finger-print info), but it measures and interpret wider band noise, including all frequencies present up to ~140 kHz (i.e. SWs transient rise-time N-waves).

Various spectral, energy and statistical methods can be employed within the invention to detect and/or classify broader band acoustic waveform components containing this ensemble of sparking waves that propagate to the microphone. It is noted that this broader band acoustic energy emitted from melt ejections and sparking can dominate the measured acoustic signal incident at the microphone array. Any form of broadband spectral processing can be employed within the invention to measure and assess sparking/melt ejection noise. This may filter out the high SNR tonal information from the surrounding broadband response (e.g. like reverberation in active sonar). One method of assessing and qualifying the broadband noise within the invention, beyond simple measurement of signal energy (e.g. RMS, Int energy) involves modelling the noise amplitude distribution against one or more candidate distributions. More specifically, the amplitude statistics of broadband noise emitted during excessive sparking has an amplitude distribution (PDF, CDF) that can be modeled (e.g. against a closed-form distribution) with a metric assessing the fit can be used to concisely characterise the noise—potentially even relating the modelled distribution to the physical sparking process. That is, although the primary tonal noise from the melt pool is likely to be non-Gaussian signal, the broadband noise from the temporally convolved ensemble of sparking is more likely to follow a Gaussian family of distributions—in accordance with the Central Limit Theorem (i.e. the summation of independent noise sources Sparks may tend towards a Gaussian distribution no matter what the amplitude distribution of each individual noise sources is). As such, any metric (e.g. KS, Kurtosis) that can assess the goodness of fit may be used to quantify the level of sparking from the measured acoustic response. It is emphasized that the broadband noise centred about the laser frequency (tonal) may actually be described more correctly by some other noise distribution (e.g. Rician distribution is a compound distribution having a sinusoidal and Gaussian noise component) but this can be efficiently characterised also within the invention.

Figure 19A:
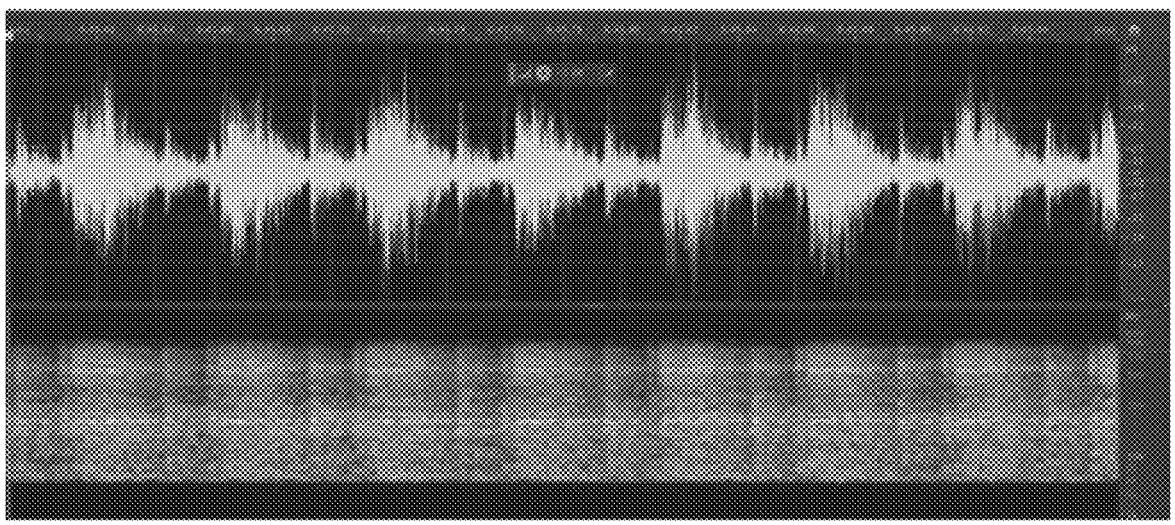
FIGS. 19(a)-19(b) shows two examples of transient gas-borne acoustic signals measured during hatching across a layer of an AM part, which can be auto-classified.
Figure 19B:
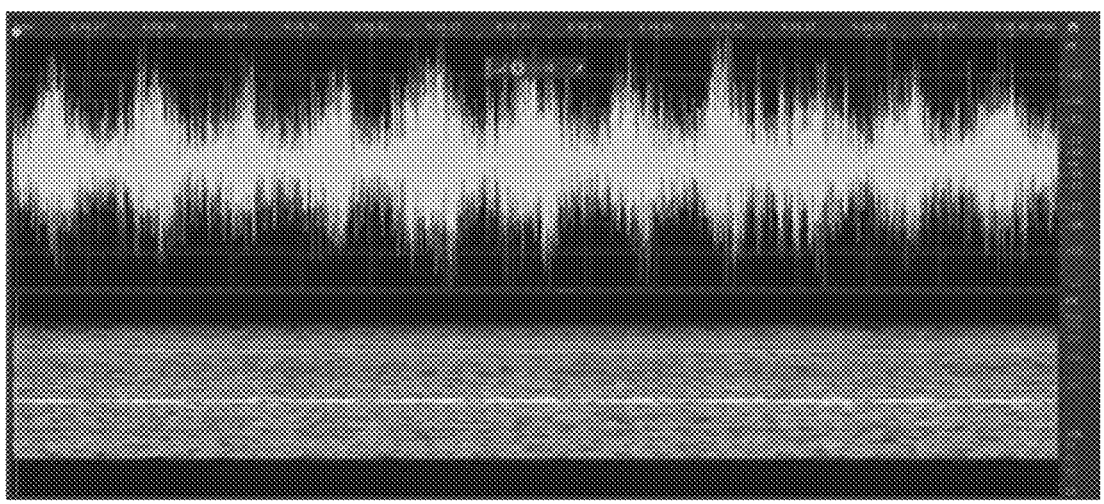

Further to this broadband or bandlimited noise distribution modelling method employed to quantify the ensemble of sparking or melt ejection noises in different build scenarios, it is noted that the invention also detects a variety of individual time-discrete transient waveforms across AM builds. These can be attributed to very short duration melting across intricate isolated sections of a complex build, where the laser jumps around melting only very local areas in a short time. FIGS. 19(a) and (b) shows two examples of the transient acoustic waveforms measured across such an intricate AM part. As shown, the periodicity of the signal detected by the invention may also serve as a method of assessing the build and/or the function/performance of the laser scanning system (e.g. Galvo).

Such transients could be isolated, normalised and analyzed offline within the invention. One powerful unsupervised classification method used within the invention to assess any large number of repeated transient acoustic waveforms across a build part incorporating repeated close-proximity structural features (e.g. a fine-scale honeycomb structure) involves hierarchical clustering. In this situation, an appropriately selected concise (i.e. in terms of curse of dimensionality) yet characteristic feature vector is extracted from each compiled waveform under examination and these are presented as the input data to any unsupervised clustering algorithm that automatically assesses the natural grouping similarity between these waveforms based upon some metric (e.g. Euclidean distance between vector pairs). As such, any waveforms that do not naturally group with the others may be diagnosed to be from a sub-optimal melting process, even though no prior knowledge of what an optimal melting process should sound like.

In addition to all such offline multivariate unsupervised classification methods, the invention also employs [4] practical in-process automated recognition methods for transient signals based upon supervised classification. Numerous such short-duration waveform pattern recognition or signal classification methods can be used with the invention for within-layer classification of individual transient. For example—the simplest form of automatic transient detection may involve a Constant False Alarm Rate (CFAR) square-law detector with a hard threshold set. Another approach that could be used to promote/aid automated detection of known transients (i.e. by inducing coherent processing SNR gain) would involve a replica correlator or an AR spectrally matched filter (IIR). Such a replica correlator is practical within the invention hardware as it performs the correlation by multiplication in the frequency domain (i.e. fast convolution)—exploiting the output from the spectral processor (i.e. FFTs). More conventional supervised signal classification methods for automated classification of known waveforms may employ simple linear discrimination rules in the feature vector space, based upon previous AM builds across a golden part. Equally, classification rules may be determined using an ANN or fuzzy-logic classifier (i.e. 'black-box' AI methods). As with any such automatic waveform classification method, the feature vector selected determines its ability to classify unknown signals. Waveform feature vectors used within the invention to characterize such transient features can be very dependent upon the AM part geometry, powder type etc. However, the data reduction signal descriptors selected within the feature vectors may include parametric:—e.g. Autoregressive Modeling coefficients (fine-scale shape), Prony's method coefficient (i.e. modeling waveform as a complex series of decaying exponential sinusoids), Wavelet coefficient (i.e. often useful for transient filtering) and/or amplitude statistical descriptors (e.g. Kurtosis, K S, Skew). Also well known Hidden-Markov model based or Mel-frequency cepstral coefficients (MFCCs) acoustic pattern recognition methods can also be applied to known waveforms or melting 'clips' (i.e. as in speech recognition algorithms).

[4] It is noted that the 'down-time' between layers may be used to process/automatically classify transients within the acoustic data for a layer.

In addition to such supervised and unsupervised automatic classification algorithms for short-duration waveforms associated with melting across individual repeated featured within layers, the invention is more widely used to classify and compare any entire AM builds or individual layers within AM builds. This may be based upon comparing the raw acoustic data, but more usually it involves comparing extracted spectral and statistical feature vectors defining the gas-borne acoustic melting response across the entire build. It is noted that in some cases, the multi-dimensional feature vector space may employ some further data reduction preprocessing to simplify/minimise variance within the feature vector (e.g. Principle Component Analysis PCA) that is propagated forward from the AM build of a 'golden part-X' (e.g. conducted on a development machine under controlled conditions) to automatically compare with part-X built on any other production machine. As such the invention installed on both machines acts as a useful monitoring system.

As described, the gas-borne acoustic response measured across each new layer within any complex geometry AM build can constitute a highly characteristic, and in some cases unique evolving acoustic fingerprint in time/duration, frequency content and amplitude distribution that can be used to automatically recognized or compare the input build parameters and/or classify current build layer quality. Within the invention, this can be accomplished using several different acoustic pattern recognition algorithms including those derived from the concepts employed by well-known prior-art audio matching spectrograms (STFT) techniques. Such methods can quickly ID any unknown music file by matching the relative positions/'constellation' pattern of local peaks within the STFT for the unknown audio with a large database of such spectral/time information patterns for known ID music files (e.g. commercial audio recognition software such as Shazam, Midomi or Echoprint). However, the pattern recognition employed within the invention extends these concepts requiring further statistical descriptor dimension defining the amplitude/energy or relative amplitude statistics between such extracted STFT peak locations defining the deterministic components of the AM build acoustic response.

However, many other methods not based upon the Fourier transform can be cited for uniquely characterizing or classifying the acoustic responses measured with the invention. For example, data reduction or signal classification methods based upon zero-crossing encoding (e.g. TESPAR is a time-domain digital language for coding band-limited signals using zero crossings and local extremes max/min features to classify complex waveforms). Such pattern recognition methods are suited for longer-term characterization and efficient characteristic storage of feature vectors from complex AM build parts.

The invention provides methods for automatic and sensitive detection of quite subtle perturbations in melting condition with an AM part, but with the wide scope of being able to compare entire large builds across machines. However, a further undesirable melting conditions that can occur as a direct result of an abnormally low volume of powder being supplied to the powder bed can also be detected by the gas-borne system. Such low powder dosing scenarios are detrimental to the AM build. Unlike the AE system described later, the gas-borne system cannot directly detect the acoustic response generated from moving metallic powders because detectable gas-borne noises do not propagate (as will be later identified—the structure-borne response to moving metallic powder is one of the main complementary benefits of the AE/stress wave system). However, if under-dosing of powder occurs, an uncovered previously solidified layer may be re-melted by the laser. It is identified that the gas-borne system can reliably and automatically detect this undesirable condition within the AM machine. A similar method may also be used to detect the warping of the object being built that results in projections of solid material above the uppermost powder layer.

The gas-borne system may also allow the human operator of the AM machine to view acoustic data in near real time or in post-analysis of a build in order to affect human-in-the-loop faults detection decisions or as an aid to assessing build part programs, although the primary purpose of the invention is fully automated monitoring detection and closed-loop feedback control. Various acoustic display methods for the measured melting response are covered within the invention. As used in passive sonar, Lofargrams are a spectral display collected over time, showing the temporal evolution of the spectral content of a signal (i.e. FFT based or otherwise). They typically employ high levels of temporal integration with large FFT sizes in order to extract accurate spectral content and low signal levels. These are typically displayed as waterfall spectrograms. Vernier spectrogram displays are for selected frequency bands so as to employ a much higher frequency resolution and are typically used for fine frequency measurement and to spectrally separate signals. Demon is a demodulation technique which is used on broadband signals in order to measure their amplitude fluctuation rates. In addition to visual display, the human operator may use the gas-borne system to hear the ultrasonic response of melting (i.e. base-banded play through ear-phones or speaker) in real-time or in post-analysis on a development AM machine. As such, it is noted that the human ear is an optimal detector of sinusoidal tonal waveforms so may provide useful confirmation of tonal information within the melting response—that may be played at any audible speed and possible time-synchronised with imagery recorded using a high-speed camera or thermal imaging sensor.

Figure 20:
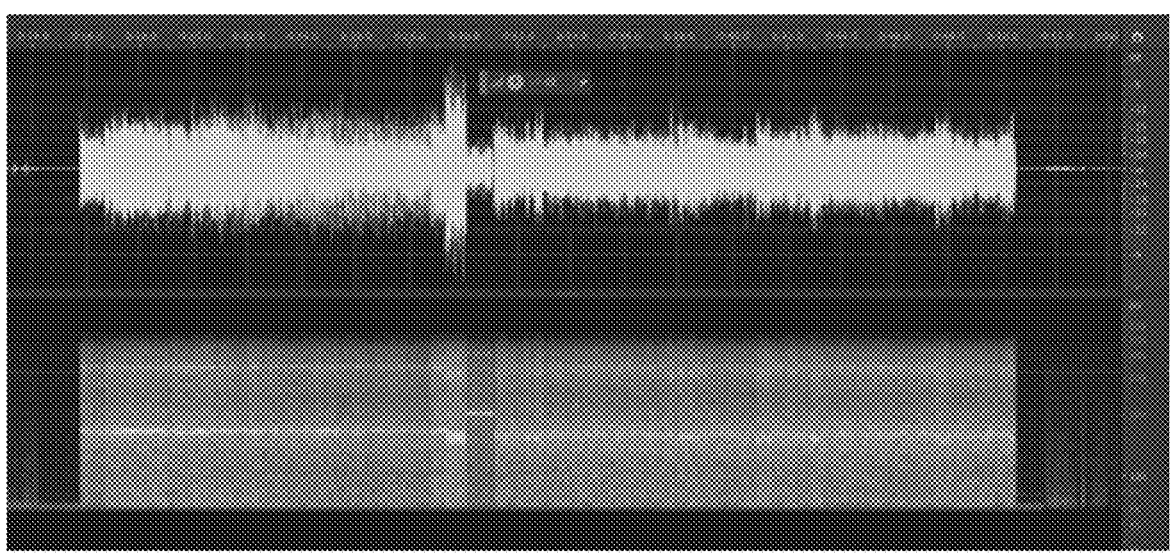
FIG. 20 shows time domain and spectrogram plots of gas-borne acoustic signals recorded during formation of a single layer of a part having a complex geometry.
Figure 21:
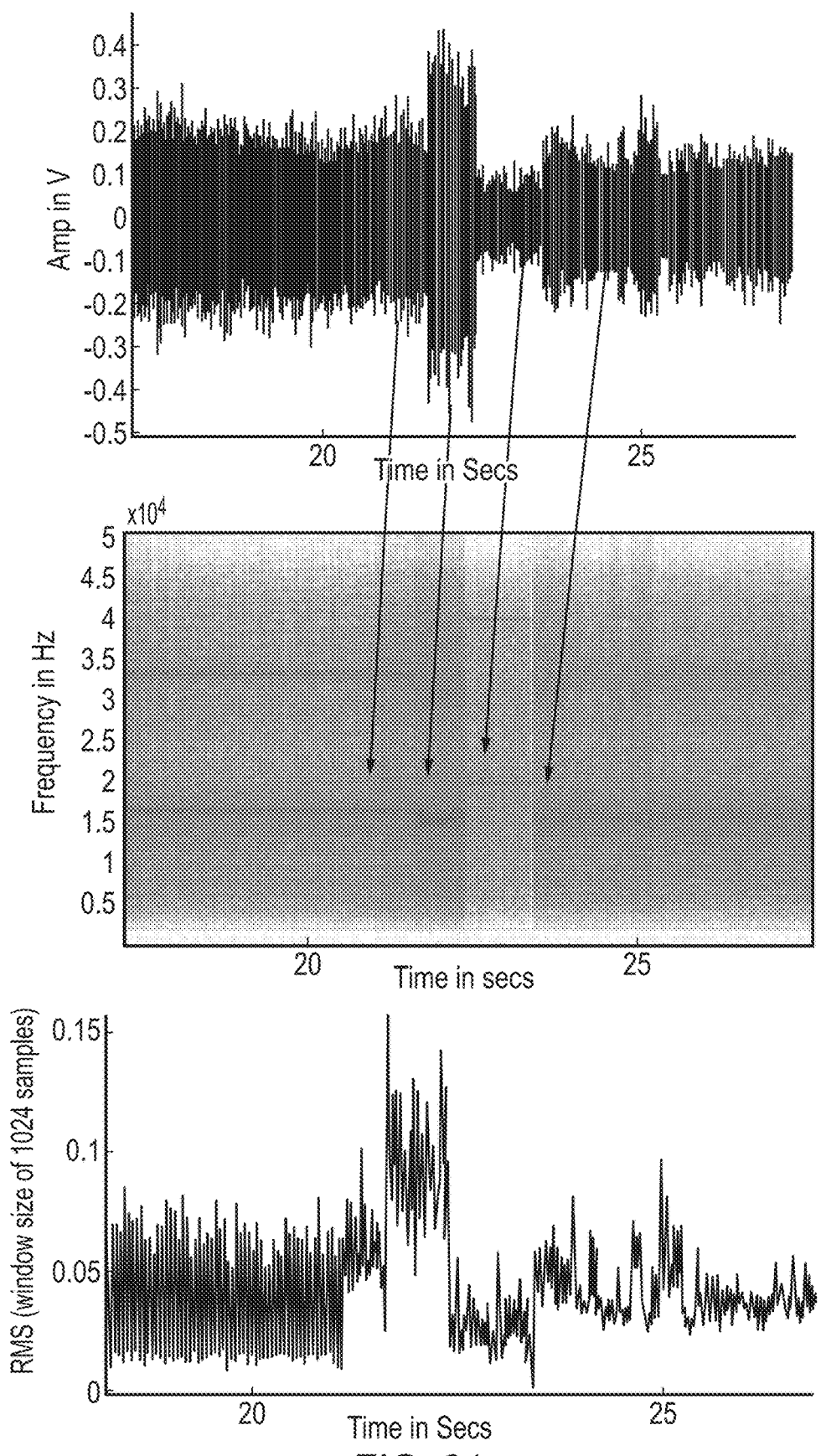
FIG. 21 shows STFT of gas-borne acoustic signals detected during formation of a complex build layer, indicating that different sections of the complex geometry can be identified from the gas-borne acoustic signals.

FIG. 20 illustrates a more complex AM build in Ti6Al4V using a commercial SLM machine where the melting of each layer lasts over 40 seconds and the part incorporates a number of different hatching patterns and contouring regimes. The gas-borne system offers a useful method for identifying the transition between different regimes and assessing them individually or as a whole. As mentioned, the sudden transient frequency content changes in the gas-borne acoustic response serve as useful markers by which the discrete sections between these markers within each build layer can be isolated for analysis or assessment (e.g. comparison across layers). To illustrate the capability of the invention to identify different melting regimes for such a complex build, FIG. 21 shows a time extract from the long duration layer shown in FIG. 20 across a time period where the melting transformed through several heating point patterns. The time domain plot and the spectrogram shown in FIG. 21 indicates the transitions between a wider hatching operation to two sequential contouring operations with differing point distances before a final transition to a further hatching operation whereby the laser was melting across extremely intricate small honey-comb features. These different melting regimes can be discriminated and assessed by the combination of spectral information and amplitude distribution. Moreover, the amplitude information, which can be noisy, can be appropriately smoothed in order to pass on more useful information from the signal processor to further data processing modules.

Figure 22:
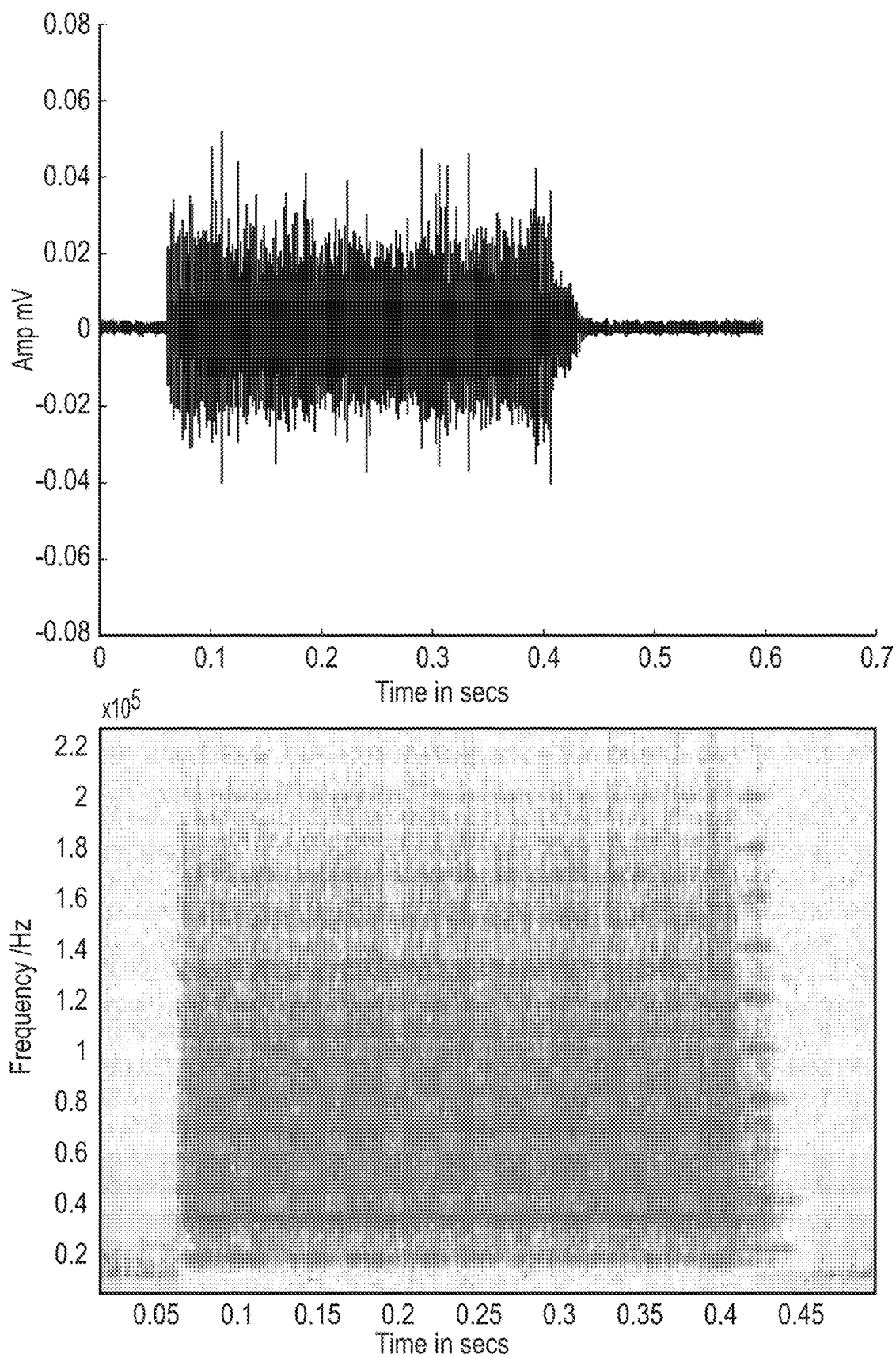
FIG. 22 shows an example illustrating a wider gas-borne acoustic spectrum (up to 200 kHz) that could be useful for SLM in time and STFT domains

As stated, the defined acoustic measurement band of interest for the gas-borne melting response can be extremely wideband and specific to the particular scenario (e.g. input laser heating source parameters of the SLM machine and the powder material type etc.). The invention may exploits acoustic energy that propagates from the powder bed to the microphone array from anywhere above the low frequency mechanical noise (e.g. 5-10 kHz) all the way up to frequencies which negate the propagation path due to attenuation and would result in a very low SNR that could not be used. In many respects, the specific bandwidth selected for the inventon for any specific AM machine is a function of the required performance specification and cost trade-off. FIG. 22 shows an example of a wider band width employed for a commercial SLM machine with microphones capable of measuring beyond 140 kHz, as shown by the Spectrogram for a Ti6Al4V test cylinder build.

Figure 23:
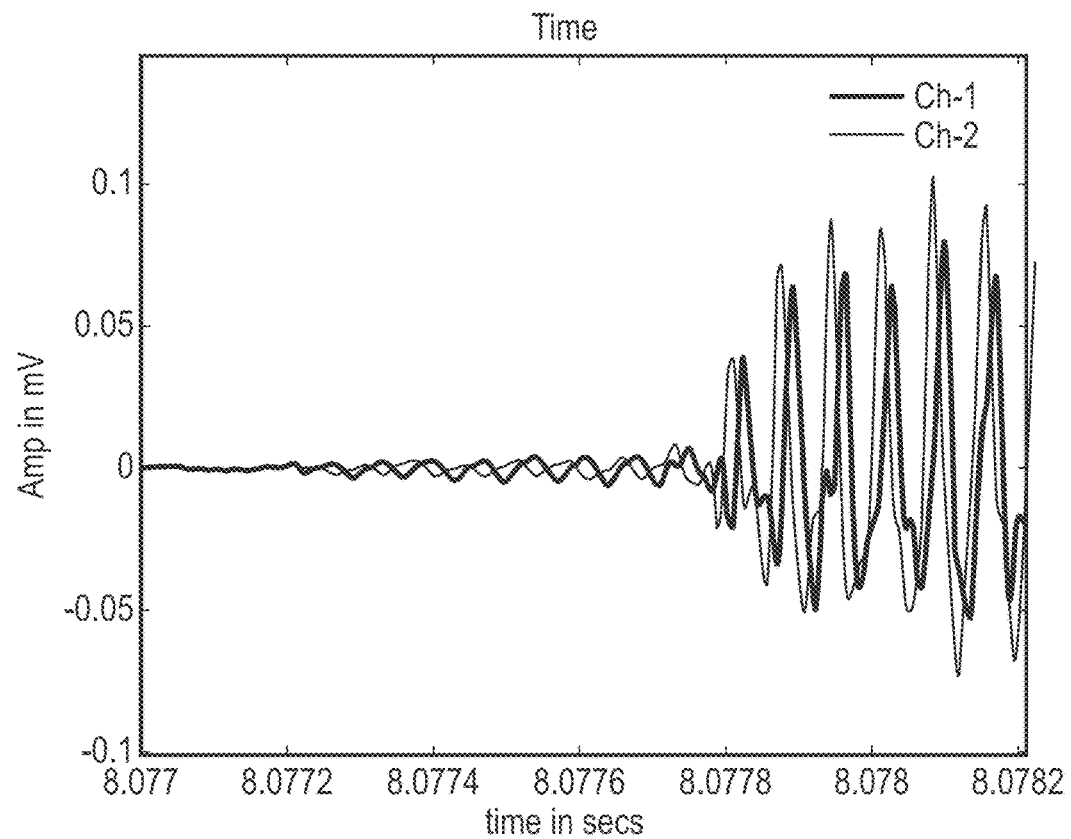
FIG. 23 shows a time or phase difference in the arrival of an acoustic signal at two microphones in the array 8 cm apart and within the spatial coherence width so as to allow direction of arrival (DOA) estimation within the build chamber.

There are several reasons for employing spatially separated microphones in a time-synchronised array within the gas-borne system. A central reason is to spatially separate, locate and track more than one melting responses induced concurrently across the powder bed by more than one heating laser source. However, such melt pool location may actually benefit an AM machine with only a single heating laser for improved monitoring of concurrent sparking/melt ejection events (i.e. it takes more than 0.5 msec for melt pool to cool but sparking can continue hence potential for between close-proximity melting points.) FIG. 23 shows the time-synchronised acoustic melting response from a pair of microphones within the invention separated by only 80 mm. As clearly shown, the beginning of the melting response when the melt pool was marginally closer to the ch-1 microphone indicates a clear phase difference or time difference of arrival (TDOA) between the two time-synchronised measurement signals. As the melt pool swathes over the 250 mm powder bed, the phase for TDOA between the two channels changes in proportion to the relative distance between the melt pool and the microphones. As such, the invention includes methods for estimated the location of the melt pool using TDOA between microphones, either between pairs or all at one (e.g. spectral correlation based TDOA in particular.) The time-synchronised array of microphones distributed in an appropriate configuration within the build chamber allows the gas-borne system to affect useful source location estimations in several different ways. Primarily, with a widely distributed array of four single microphones, 2D sound source location via conventional event time of arrival (TOA) estimation across the array employing basic or calibrated triangularisation algorithms is possible e.g. using a search for the most likely source location via LMS-optimisation. This approach may be used to estimate the location of any transient time-discrete acoustic events from the powder bed associated with defects within the AM build (e.g. a delamination, micro-cracking or Phase Twinning events). The time-stamped detection and location of any such unscheduled events on any specific build layer can be logged by the invention. Thus useful stored location information may be reported to any subsequent part inspection process, indicating specific areas or layers on individual AM parts with potential defects. Another low complexity and approximate wide-array location method simply involves calibrating the relative peak amplitudes across the array for calibration sources induced across the XY powder bed. Such TOA location algorithms based upon an optimisation search algorithm within the build chamber volume may be computationally expensive and not entirely suited to real-time event locations, although the search can be confined to a single XY plane. Moreover, in cases where several events occur simultaneously (e.g. source location across several lasers) and/or secondary spurious events appear from reflections within the build chamber, such location algorithms based solely upon TOA information can become less reliable (i.e. It is difficult to associate numerous time-delayed transient waveforms across the array to the correct combination of events/sources). TOA estimation errors can also occur in low SNR regimes as the intra-array spacing is beyond the spatial coherence length of the acoustic source signals of interest (e.g. melting responses).

Therefore, a further beneficial source location strategy employed within the invention incorporates one or more spatially separate compact arrays of wideband microphones. Each compact array will affect its own Direction of arrival (DOA) bearing estimation based upon real-time TDOA estimations across each combination pair of sensors. In this case, accurate robust real-time TDOA estimation across each microphone pair spaced within the known spatial coherence/correlation length of the acoustic sources of interest is based upon spectral cross correlation processing and specifically known forms of the well-known generalised cross correlation algorithm (Knapp and Carter 1976) incorporating pre-whitening weighting functions to increase TDOA accuracy and reduce computation time. It is highlighted that more than one compact array for tracking the DOA/bearing of the melting response (or multiple responses) provides a robust and practical real-time location solution for general spatial location and temporal tracking of the dynamically moving melt pool (i.e. the primary sound source of interest).

Any DOA algorithm can be applied to track the moving melt pool across the powder bed within the invention (e.g. spectral based DOA algorithms). For N-microphones placed within the spatial coherence/correlation length of the melt pool response, a system of N−1 equations relating the velocity of sound (Vs) and TDOA across pairs (ΔT) may be solved so as to find the required DOA vector (u v w):—

$$\begin{bmatrix} (x_2-x_1) & (y_2-y_1) & (z_2-z_1) \\ (x_3-x_1) & (y_3-y_1) & (z_3-z_1) \\ \vdots & \vdots & \vdots \\ (x_N-x_1) & (y_N-y_1) & (z_N-z_1) \end{bmatrix} \begin{bmatrix} u \\ v \\ w \end{bmatrix} = \begin{bmatrix} V_s\Delta T_{12} \\ V_s\Delta T_{13} \\ V_s\Delta T_{1N} \end{bmatrix}$$

With more than four sensors within the build chamber, this system is over-constrained and the solution can be found using a pseudo-inverse calculation. However, a non-linear least-square LS plane-wave of incidence algorithm can also be used to estimate DOA (e.g. [5]Levenberg-Marquardt (LM) algorithm). Such processing for a compact single-location array incurs negligible errors from sensor location inaccuracy. Consideration of more sensor pairs within the array allows the consistently suggested dominant DOA to be deduced. Time synchronised TDOA across sensor pairs is accomplished using spectral domain cross-correlation processing (e.g. Generalised cross correlation with Phase transform GCC-PHAT). Cross Correlations via multiplication in the frequency domain (i.e. Fast convolution) with the inclusion of pre-whitening is justified based upon computational efficiency and TDOA accuracy within the reverberant build chamber environment.

[5] This is an iterative technique that finds a local minimum of a function that is expressed as the sum of squares of nonlinear functions. It has become a standard technique for nonlinear least-squares problems and can be thought of as a combination of steepest descent and the Gauss-Newton method. When the current solution is far from the correct one, the algorithm behaves like a steepest descent method: slow, but guaranteed to converge. When the current solution is close to the correct solution, it becomes a Gauss-Newton method.

A further narrowband DOA estimation technique suited to efficient estimation and tracking of multiple concurrent gas-borne sources is the MUSIC Algorithm. This provides multiple concurrent bearing estimations from responses detected by the array of microphones. The narrowband method again requires a level of spatial coherence between microphones in the array. MUSIC models the vector of recordings from each channel as:— $y(t)=A(\theta)s(t)+n(t)$; where $s(t)$ is the vector of narrowband source signals, $n(t)$ is a vector of white Gaussian noise, and $A(\theta)$ is the array response matrix where $\theta$ is a DOA vector of wavefronts from each source. The array response matrix characterizes the way in which the signals from the distributed sources are combined. The nth column of $A(\theta)$ is given by:—

$$a(\theta_n) = [e^{i2\pi f \tau_{1n}} e^{i2\pi f \tau_{2n}} \ldots e^{i2\pi f \tau_{mn}}]^T.$$

Where $\tau_{nm}(\theta)$ is the TDOA of wavefronts from the nth source between sensor-1 and sensor-m and f is the frequency of the wavefront, The TDOA can be expressed in terms of the speed of sound, the sensor positions $(x_m, y_m)$ and the source bearings as:—

$$\tau_{mn} = \frac{(x_1 - x_m)\cos(\theta_n) + (y_1 - y_m)\sin(\theta_n)}{c}$$

Using this model, the bearings can be calculated directly by Eigenvalue decomposition of the signal covariance matrix R (e.g. Singular Value Decomposition and PCA), assuming the covariance matrix can be decomposed into an orthogonal noise subspace U (i.e. of dimension M-N*M) and signal subspace S (i.e. of dimension N*M). By ranking the N Eigenvalues and corresponding Eigenvectors, the number of sources may be confirmed by Akaike's Information criteria (AIC). Signal Eigenvalues dominate the noise Eigenvalues which approach the variance of the noise $n(t)$. The columns of the array response matrix, $A(\theta)$, are spanned by the signal subspace. Hence they will project into the null space of the noise subspace. Estimate of the source location is found at the intersections of the signal subspace and the so called [6] array manifold $a(\theta)$ (i.e. steering vector). This may be achieved by scanning through $\theta$ and plotting the beam pattern $P^{music}(\theta)$:—

$$P^{MUSIC}(\theta) = \frac{1}{|a(\theta) \cdot U|}$$

where $a(\theta) = a(\theta_n) = [e^{i2\pi f \tau_1(\theta)} e^{i2\pi f \tau_2(\theta)} \ldots e^{i2\pi f \tau_m(\theta)}]^T$ Computation of the Time Difference of Arrival (TDOA) within the MUSIC algorithm is again achieved through the generalised cross-correlation algorithm. MUSIC assumes that the sources are narrowband. Consequently, wideband pre-processing that splits the wideband melting signal into a set of narrowband components of interest via the FFT and adaptive frequency selection may be employed (e.g. the IMUSIC algorithm). Another well known DOA algorithm that may be implemented for computationally efficient DOA estimation and spatially tracking the melt pool is the ESPRIT algorithm. However, a wide range of more sophisticated signal processing methods can also be employed for accurate and real-time direction of arrival (DOA) estimation within the reverberant build chamber environment. Less conventional DOA methods may also be applied within the gas-borne acoustic system. For example, Gradient flow based DOA estimation using a very closely spaced array of MEMS microphones with a wide bandwidth. Time Difference of Arrival TDOA based location methods can be applied to individual time-discrete event that can emanate from the powder bed such as surface penetrating micro-cracking, phase-twinning or serious delamination events. An advantage of locating the source of such high intensity transient events during a build is that the layer/build height of XY location of defects may provide useful location information regarding potential void or porosity locations that can be investigated during subsequent NDT inspection (e.g. with X ray or ultrasonic probes).

[6] This is a vector containing all direction vectors measurable by the array.

The build chamber within most AM machines is an enclosed reverberant acoustic environment with planar reflecting surfaces (i.e. internal walls) from which spurious acoustic echoes can be reflected. One method included within the invention for physically reducing such reverberation echoes within the build chamber would be to line the internal walls with a known acoustic anechoic cladding material that can absorb sound within the measurement band of interest. However, in situations where such anechoic chamber cladding is not a practical installation, further sophisticated signal processing methods may be employed. One such additional signal processing method for effectively separating the convolved gas-borne acoustic responses from one of more simultaneous lasers is known as blind source separation or Independent Component Analysis (e.g. the well known Fast ICA algorithm).

Figure 24:
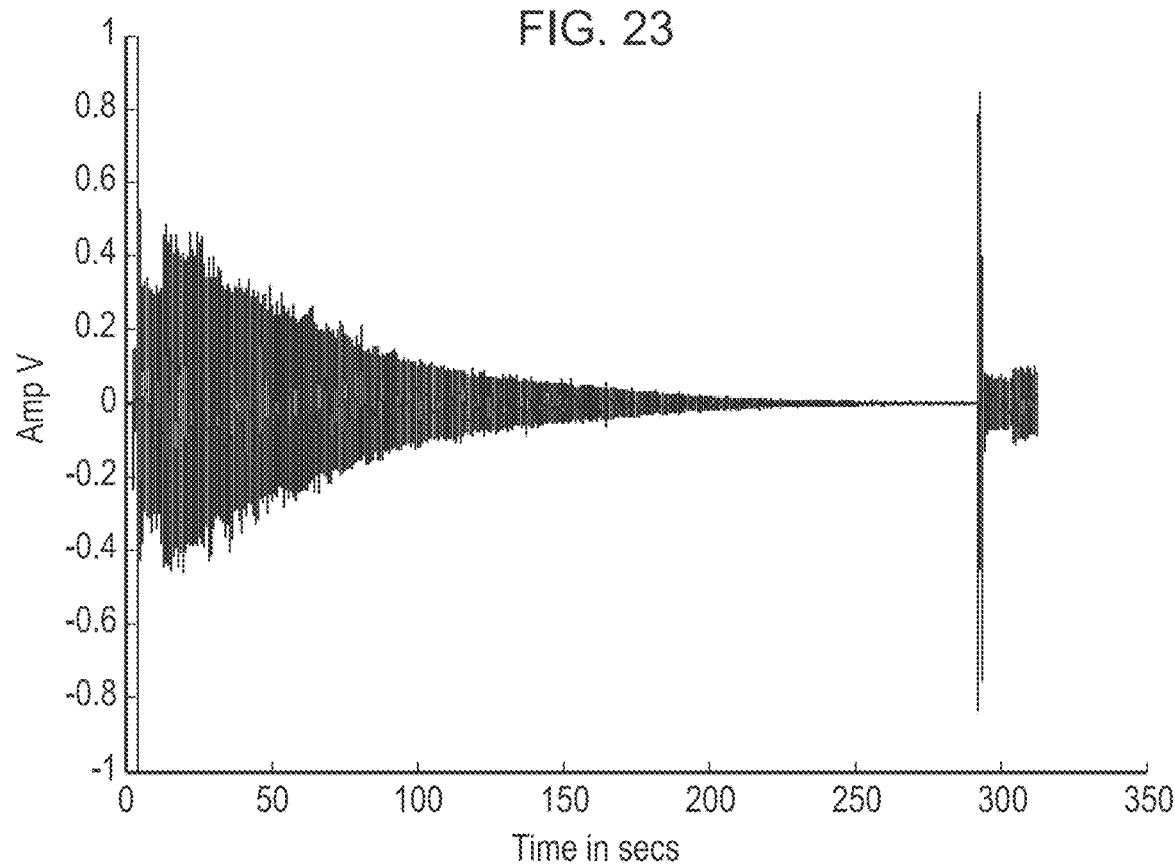
FIG. 24 shows the microphone response to the creation of the vacuum within the build chamber prior to starting the SLM build process.

A further benefit of the microphone apparatus within the invention is described that is not directly connected to the melting process, but to the inert atmosphere created above the powder bed within the chamber. It is found that the receding gas-borne acoustic response measured during the initial air/O2 extraction stage of operation can be exploited to directly monitor the atmosphere within the build chamber. More specifically, the acoustic sound pressure (i.e. measured as a dB level relative to a reference pressure) or sound intensity registered at any of the microphone channels reduce proportionally with the extraction of oxygen from the build chamber atmosphere and the creation of a sealed vacuum. FIG. 24 shows the acoustic response measured by a microphone within the build chamber as the vacuum is created, prior to the 02 atmosphere being replaced by an Argon atmosphere. As such, the sound pressure or sound intensity ($P^2$) measured by the microphones can be used directly to infer the quality of the vacuum and/or the % amount of oxygen within the build chamber via a suitable calibration. Several signal processing methods may be employed to calibrate the acoustic waveform in order to infer the vacuum condition within the build chamber.

AE Apparatus

The second structure-borne passive acoustic sensing modality is now described in more detail. This involves one or more acoustic emissions (AE) sensors mounted remotely at a convenient location below the substrate upon which the powder layers are built up. For example, one or more compact wideband and sensitive piezo PZT sensors (e.g. differential input WD sensors from MISTRAS) can be mounted directly against the AM elevator mechanism 102 or any convenient location beneath the build plate 110, as illustrated in FIG. 1.

AE sensors often incorporate a rigid wear plate coupled internally to the piezo-ceramic primary sensing element entirely encapsulated within a protective metallic casing. Such conventional sensitive AE sensors detect all manner of tiny transient elastic stress wave modes that may propagate through and across the surface of the AM system during its operation (e.g. elliptical surface Rayleigh waves, Lamb waves in plates, P and S wave modes) so as to be detectable at the AE sensor wear face. Although most commercially available AE sensors are PZT ceramic devices that linearly convert displacements in the wear plate into a proportional A.C. voltage signal (e.g. within a 50 kHz-2 MHz band), the invention encompasses other types of AE sensing device that measures structure—borne stress waves, guided waves or Acousto-ultrasonic waves generated within the AM machine. Alternative sensors include resonant high Q-factor PZTs matched to the AE activity of interest (e.g. R6 sensors from Mistras), differential and single-ended AE PZTs, PVDF devices, MEMS AE sensors, fiber-optic sensors (e.g. Bragg-gratings) and laser-based interferometric sensors.

In the case of conventional wideband PZT-based AE sensors (e.g. WD or Pico sensors from Mistras), the sensor wear face can be permanently attached to any suitable flat planar face of the AM machine using any known acoustic coupling method (i.e. ultrasonic gels, grease, rigid adhesives). An alternative coupling approach may involve the AE sensors being mechanically clamped into place against the build-plate substrate with an appropriate solid elastomer material couplant (e.g. Silicone) forming a solid compressed layer between the AE sensor wear plate and the substrate. In this case, the attached AE device could be moved by mechanical means in tandem with the build plate as the part is built up.

Figure 25:
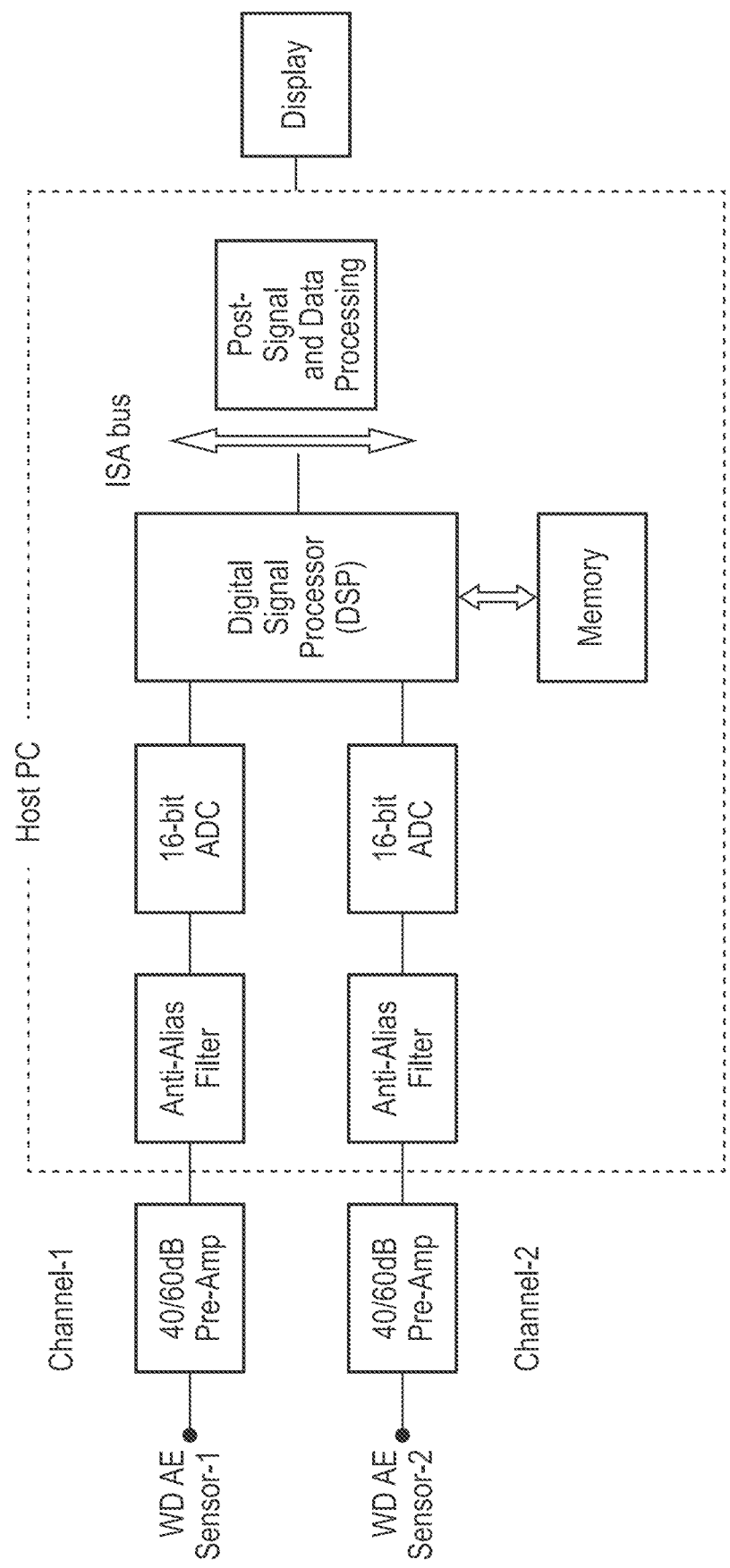
FIG. 25 is a schematic illustrating two channel acoustic emission (AE) acquisition hardware for digital recording of AE stress wave activity.

Due to the favourable signal-to-noise, AE sensors attached to all manner of dynamical machines with moving part (e.g. the AM machine has many moving parts), are usually sensitive within the low ultrasonic band (i.e. 50 kHz to 2 MHz) and this is the primary band of interest for the invention. Upon installation, the AE responses generated by the AE sensors attached to the AM machine may be calibrated using a known AE calibration source (e.g. Hsu-Nielsen). Again, it is likely that permanent installations of the AE system would require re-calibration from time to time. Retro-fitted installations of the invention may need to take account of the 10AE dB variability expected in the AE level due to differences in coupling against the AM machine. An example of the acquisition system required to digitally record A.C voltage waveforms from the AE sensors attached to the AM machine is shown in FIG. 25. As with any such AE hardware, a pre-amp is often required to amplify the tiny measured voltage from the AE sensor (i.e. microvolt signal) so it can be transmitted easily across a transmission cable to the acquisition systems for digital waveform recording and analysis. FIG. 25 show a dual-channel AE acquisition system schematic that could be employed within the AE system. The ADC for AE acquisition is required to accommodate the high dynamic range for AE waveforms (e.g. >85 dB for 16 bit resolution) and a sufficiently high sample rate (e.g. over-sampled at 10 MHz). The AE waveforms captured by the digital system is then processed using a DSP, FPGA or micro-processor. It is important to note that the AE system acquisition hardware may incorporate two normal modes of operation when monitoring the AM machine and the resulting AM parts. Firstly, when monitoring the in-process operations of laser melting across the bed and powder spreading, the acquisition system would need to acquire, digitise and store continuous streams of AE data over the period of each operation. As such, for complex AE builds, it may be necessary to stream quite long (e.g. several minutes) continuous waveforms to the attached storage device (e.g. solid state hard-drive/flash-memory). This AE data may be processed (i.e. data reduction) in-real time so as to avoid having to store large amounts of raw 'rf' AE data (i.e. the raw AE could be over-written on every new layer with only the essential extracted features (e.g. envelope) being stored. However, a second mode of operation may be incorporated within the AE system for much longer duration monitoring of the AM parts up to several hours after the build is completed. This threshold-trigger acquisition mode would involve the ADC continuously acquiring digital AE waveform data into a circular memory buffer but not storing it for further processing until an AE signal of interest is detected by means of a hard amplitude threshold (i.e. Vpeak>Vthreshold), thus triggering the system to process and record the waveforms. In this threshold trigger mode, the circular buffer is only long enough to acquire the duration of known burst AE waveforms of interest continuously i.e. it captures individual or trains of AE from time-discrete defects (e.g. cracks within the AM parts).

AE Waveform Processing

Figure 26:
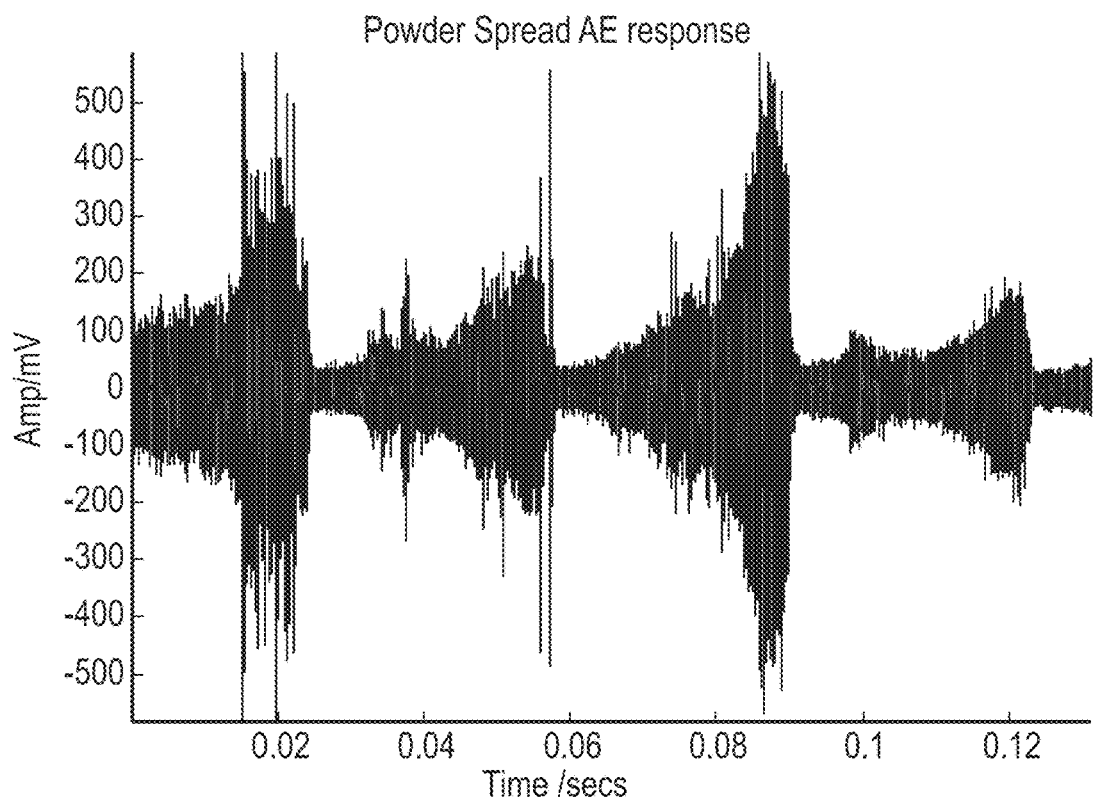
FIGS. 26 and 27 show intermittent transient events observed in the AE signal during powder spreading.
Figure 27:
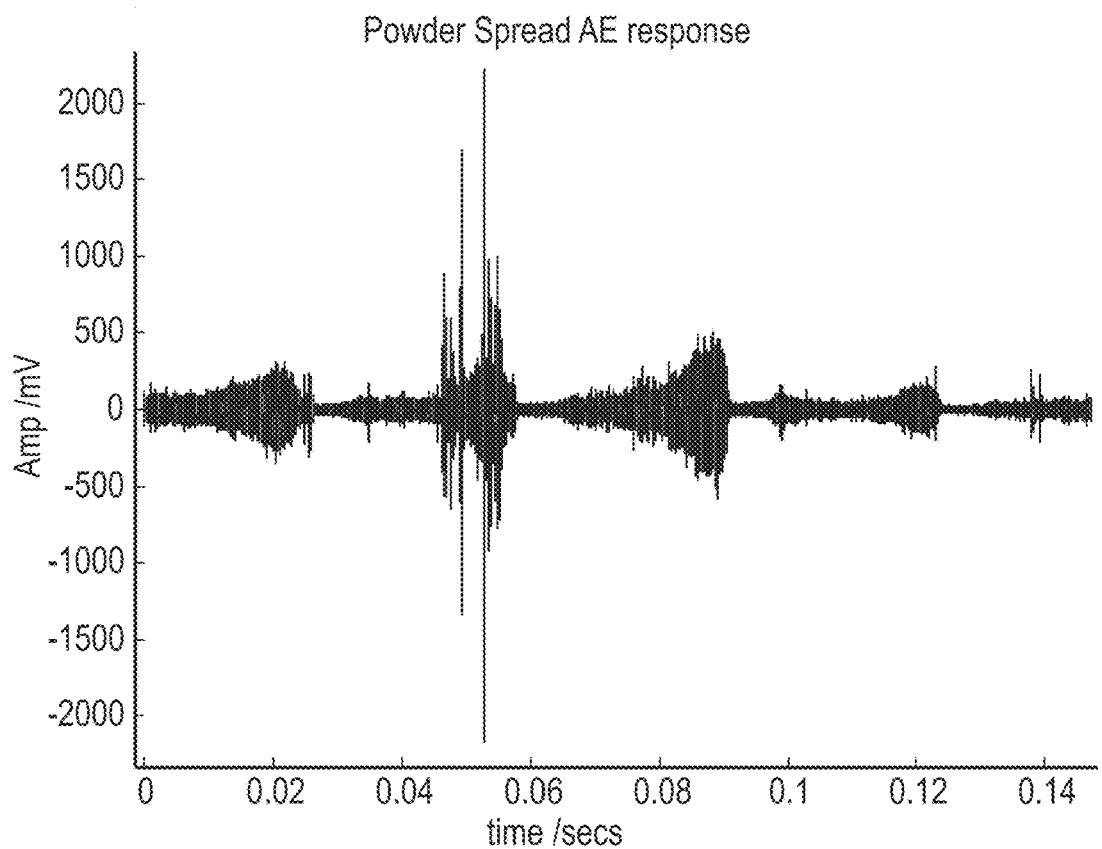

As with the gas-borne acoustic monitoring system, the AE system has more than one use beyond the in-process monitoring of the melting process. One application of the AE system is within-build measurement and automatic assessment of the metallic powder spreading process, as required within all SLM AM machines before a new layer is melted. It is identified by the invention that the powder spreading action causes an ensemble of metallic asperity contacts that induce significant AE activity across the powder bed that can readily propagate to the AE sensors mounted remotely below the substrate. FIGS. 26 and 27 shows two examples of the characteristic AE response waveform measured on a commercial SLM machine (i.e. Renishaw AM250) whilst Ti6Al4V powder (X micron in diameter) was spread between layers by a wiper 109. Two signal features observed within the measured AE waveforms during the wiper action are employed by the invention to automatically assess the powder spreading process and the subsequent powder deposition.

Firstly, the characteristic amplitude modulation that repeats several times periodically (repeat period of ~0.04 secs) within each wipe involving a gradual build up in AE activity followed by a rapid fall-off can be attributed directly to stable powder spreading (i.e. a snow-ploughing and powder compression/frictional dragging action under the wiper). That is to say, the characteristic AM shape may be extracted in any way within the system's signal processing (square-law summation, Hilbert transform, Integrated energy, RMS etc.), filtered (e.g. LPF, Wavelet Filter) and compared directly to known templates for that particular powder material and size. Secondly, the intermittent transient features with varying amplitude can be identified and related directly to sub-optimal powder spreading conditions (such as sub-optimal powder flow characteristics). Such undesirable transients may be detected and processed within the AE system using any know signal processing method for detecting and classifying acoustic transient signals in noise (e.g. a square-law threshold detector, Canny filter, wavelet decomposition, STFT, Prony's method). Various preliminary methods, including band pass filtering, may be employed to separate the transients from the AM trend for detailed analysis. One method for separating the transient information from the modulating trend is to apply a wavelet filter (e.g. hard or soft threshold filter with an appropriate mother function) over the enveloped AE response—so as to smooth the noise extract the normal powder trend but retain the shape and amplitude of the transient feature characterizing the undesirable spreading event.

However, equally, as the powder spreading waveforms measured by the invention are the results of a multitude of individual frictional asperity contact AE bursts induced by movement, purely statistical signal processing methods derived upon the amplitude distribution of the characteristic waveform can be used to classify the spreading process. Useful statistical descriptors for classifying such complex waveforms include kurtosis ($4^{th}$ moment) or the KS statistic, where the noise distribution is quantified with respect to one or more candidate distributions (e.g. Gaussian). Dimensionless Amplitude distribution and AM shape parameters have the advantage that they are not dependent upon absolute AE signal levels. If any absolute AE energy or amplitude related descriptors are employed for assessing powder spreading within an AM machine with remotely positioned AE sensors under the substrate, some form of physical or empirical attenuation model across the specific powder may be employed to calibrate the measured AE response.

It is further identified that the AM build layer at which strong transients occur within the powder spreading response (e.g. outliers in the distribution) or there are significant shifts in the amplitude distribution or shape of the characteristic spreading waveforms may be logged by the AE system for later spatial cross referencing with any part inspection system (e.g. Ultrasonic or X-ray) for detecting increased porosity or even the existence of larger voids/holes/pores. For an AE system with at least three AE sensors spatially positioned around the substrate, a very approximate XY location of unwanted spatially discrete powder spreading events (or unwanted tracks/grooves in the powder bed, or any uneven spreading event) may be estimated within the invention by a calibrated TDOA location estimation (e.g. TDOA Hyperbolic projection between sensor pairs, calibrated DeltaT location, zonal energy location).

It is further noted that the AE system installed within any AM machine can also be used for metering metallic powder flows into and out of the build chamber and volumetric powder level estimation within storage flasks within or out with the AM system (as in, the use of acoustic emission instrumentation to monitor powder flows). It may also be possible to measure powder size distribution with the invention. The absolute AE activity (in AE dB as 20 log (V/Vref)) may increase with increased wiper speed, mass of powder or density of the particles. AE activity tends to increase with particle size with a relatively greater increase in intensity at lower frequencies. As such, the automated detection of powder spreading fault conditions (including loading spurious powder types or sizes) and/or powder handling diagnosis requires the signal processing scheme to be optimized for the specific powder and wiper setup. A further benefit of the AE system that is also related directly to the monitoring of metallic powder within the AM machine is the automated detection of any low or over-dosing condition that can arise during an AM build and/or automatic detection that no powder had been loaded before a build is commenced.

Figure 28:
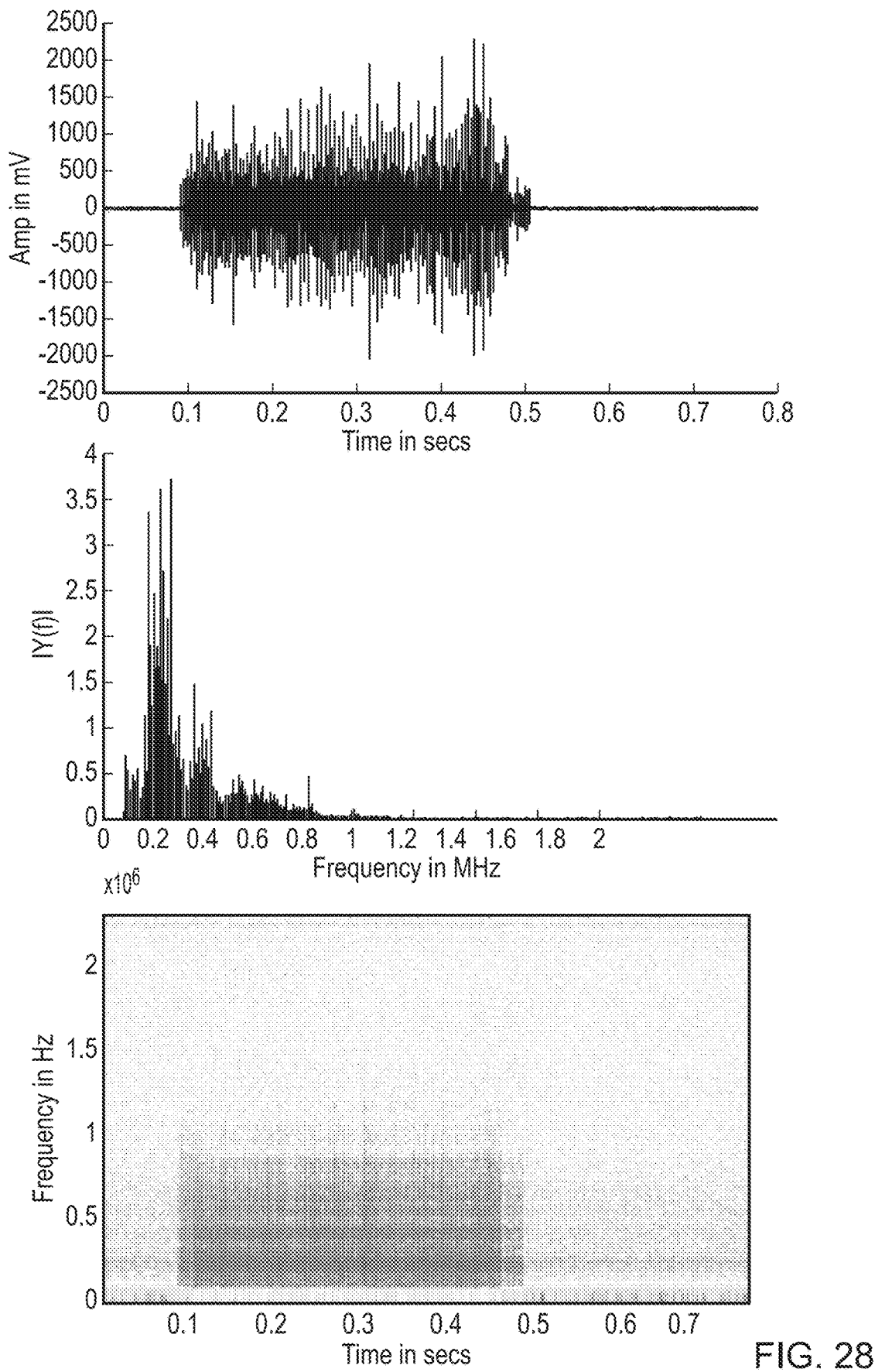
FIG. 28 shows time domain, STFT and FFT plots of the AE signal detected during formation of a layer of a 6 mm test cylinder.

Like the gas-borne system, the AE system is primarily used for direct monitoring of the powder melting process within any pulsed SLM AM machine. This is now described. The invention demonstrates that AE sensors sensitive in the low ultrasonic band can usefully detect the thermo-elastic stress waves induced by a combination of the powder melting and re-solidification processes at play within the dynamically moving melt pool. This ensemble of AE activity emitted during the melting and re-solidification is strong enough to propagate readily from the melt pool-solid part boundary through the part and substrate to be detected by one or more remotely mounted AE sensors. Moreover, it is noted that the AE response measured remotely provides complementary information to the gas-borne microphones described previously. Most notably, the resulting AE waveforms are dominated more by internal thermal agitation and the longer-term dynamics of re-solidification rather than by the AE activity induced more initially by the sudden powder to molten liquid transition. FIG. 28 shows an example raw AE response recorded by the AE system that was induced by a fiber laser melting titanium powder across a single layer of the 6 mm diameter test cylinder[7], as used in the gas-borne system.

[7] The cylinder provides hatch angle-aspect independent symmetry in the XY plane The time domain plot depicts the general form of the useable high SNR AE response measured over the full duration for a single layer of the test cylinder. The recorded raw AE response V in mV with a pre-amplifier used to amplify the measured signal could equally be displayed on an AE dB scale in accordance with the logarithmic relationship AE in dB=20*log 10(V/1 mV). The AE signal is complex incorporating structured transient features that constitute the important amplitude modulations that will be discussed further. Also, there is a clear distinction between the volumetric hatch waveform and the following contouring waveforms—as was the case for the gas-borne system. Again the inner and following outer contouring AE response can be clearly identified in FIG. 28. As shown by the spectrogram and FFT plots in FIG. 28, the frequency content of the raw AE response is primarily within the 100 kHz to ~0.9 MHz band, as low frequency noise from the AM machine and associated harmonics below 100 kHz are completely filtered out within the acquisition system (i.e. High pass digital filter at ADC). The spectral content measured by the wideband AE sensors within the invention can be used automatic classification of the melting response in some cases. For example, the FFT calculation performed across the raw AE response can provide some useful AE descriptors (e.g. FFT peaks) that can characterize the melting response AE waveforms (i.e. in terms of a basic data reduction process) and classify the melt conditions. However, FFT spectra from the raw AE waveforms from melting can contain complex harmonic peaks—primarily due to the effects of the strong amplitude modulation with a changing periodicity generally observed within the AE response to laser melting.

As with the gas-borne system, the characteristic Amplitude Modulation within the raw AE melting response waveform can be attributed to the ensuing scan pattern and laser parameters. During volumetric hatching operations of any AM build, the laser spot is raster scanned across the part cross-section with a constant velocity unit vector that reverses along each adjacent hatch row. As stated previously, the melt pool formed near the ends of hatch lines tends to often get hotter due both to the increased dwell time of the laser in the vicinity of the contour and less effective heat sinking through the part[8]. Therefore, as with the gas-borne response, the raw AE response to laser melting exhibits a strong Amplitude Modulation with peaks matching the periods where the laser spot reaches the ends of the hatch. This low frequency amplitude modulation of the raw AE is often the dominant feature within the AE response measured during the melting process—as indicated by the large peaks in the time domain plot of FIG. 28. The AE system extracts and measures the extent of the Amplitude Modulation in the raw 'carrier' AE response in order to assess or compare the ensuing melting condition. More specifically, the sequential physical processes of powder heating to form a melt pool, rapid cooling and metallic re-solidification[9] (i.e. fusing) generate a proportional ensemble of AE burst activity that can be measured by the AE sensors. It is highlighted that the structure-borne AE system provides complementary sensing capabilities to the gas-borne system. That is, the AE response is dominated more by stress wave activity generated by the re-solidification process (e.g. including any unwanted crack initiation) whereas the gas-borne system measures the direct response to melting (i.e. sparking, melt ejection and melt pool resonant excitation).

[8] Two reasons for an increase in melt pool temperature around the end of hatch lines are cited. Primarily, the moving laser spot will dwell longer in the vicinity of the hatch end due to its change in direction (i.e. spray-can affect). Secondly, the hatch end is more likely to coincide with an edge or spur within the AM part geometry and as such, there is less surrounding volume of the part for the heat to dissipate into.

[9] Such AE originates from changes in thermal gradients, void generation, crack formation and phase transformations. The larger the thermal gradient, the larger the AE activity.

Figure 29:
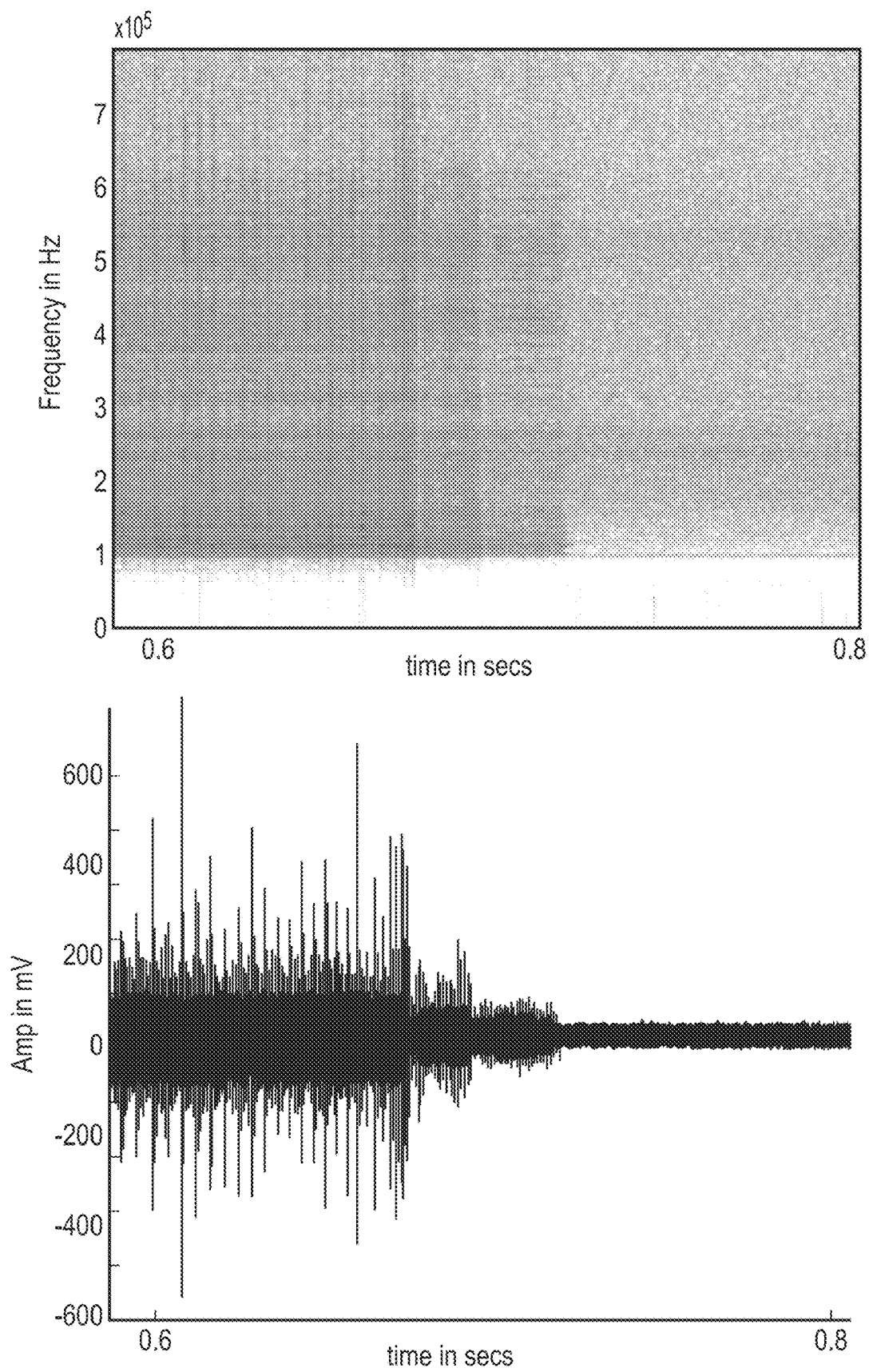
FIG. 29 shows STFT and time-domain plots of an AE signal detected during a build illustrating a difference in spectral and time components for hatch, inner and outer perimeter regimes within a layer of the test cylinder.

The hatch-end and potentially contour location induced amplitude modulation is highly characteristic of the temperature profile of the melt pool and is therefore important for monitoring the powder melt process within each layer of a build and/or the melt pool thermal profile across several layers or indeed the complete build. It can also be used to compare thermal profiles of contours across AM builds on different machines. However, as the hatch orientation is rotated on each new layer (e.g. by) ~67°, it is noted that no two successive layers will have the same hatch angle in the resulting AM part volume (i.e. it takes 42 layers before a 67° hatch angle returns to within 1°). Therefore, the exact Amplitude Modulation pattern exhibited on each layer will not generally repeat closely within most builds. Hatch angle rotation is usual practice in SLM machines and the AE system provides a further way to identify unique layers in the build and/or track changes from one layer to the next. The deterministic envelope information can be extracted from the raw 'rf' AE waveform in several ways. The spectrogram in FIG. 28 also clearly shows the distinct hatch pattern at the beginning of the signal with an increasing modulation periodicity that relates exactly to the increasing hatch line length at the start of the cylinder layer. The transition from hatch to contour at the end of the cylinder (with the inner and outer contouring with differing exposure times and/or point distance) is preceded by amplitude modulations that get increasingly closer together towards the end of the volumetric hatching across the cylinder. This is emphasised in FIG. 29 by the more detailed view of the end of this melting response. Here, the periodicity in the hatch lines is clearly seen within the spectrogram as vertical lines showing clear transient transitions.

Signal processing methods within the AE system that extract the lower frequency modulation information from the raw high frequency AE response are now described. Like the gas-borne response, the Amplitude Modulated (AM) information attributed to the melting response measured by the AE system can be processed via suitable waveform feature extraction for classification purposes—in order to relate the information directly to the melting process. However, unlike the gas-borne melting response, the high frequency raw AE response (i.e. above 100 kHz) that acts as the carrier wave for significant melt pool information is not directly dominated by the laser pulse frequency (~10-20 kHz). However, as it will be shown, it can still be routinely detected via an FFT of the enveloped or absolute square-law signal. Instead, the high frequency wideband AE response spreads much more widely across the AE measurement band of interest (i.e. towards 1 MHz). As such, the AE response is known to contain the ensemble high-frequency transient stress wave activity pertaining to the thermal consequences of the melting, which is potentially less directly colored by the laser frequency (but can be coloured by the AE sensor frequency response, especially for high Q-factor resonant AE sensors).

A method for extracting a smoothed useful version of the AE waveform envelope is to low pass filter the absolute waveform (i.e. a square-law) or to apply a known envelope method (e.g. Hilbert transform) or to devise some other filtering method (e.g. kurtosis filter). Any smoothing applied should ensure that the information of interest e.g. the amplitude modulation peaks are not corrupted (averaged) by the filtering. Several methods that exist for this demodulation can be applied within the AE system. Regardless of which one is selected, the smoothed representative of the amplitude modulation information needs to be classified or compared either by some shape metric (e.g. AR coefficients may represent the fine-scale shape) or statistical or correlation metric (e.g. compare the modulation with a known demodulated waveform for that layer). It is also postulated that an ideal heating scenario in AM may be to have a completely even distribution of acoustic energy over time during the hatch and contour operations with no such modulations occurring.

Figure 30:
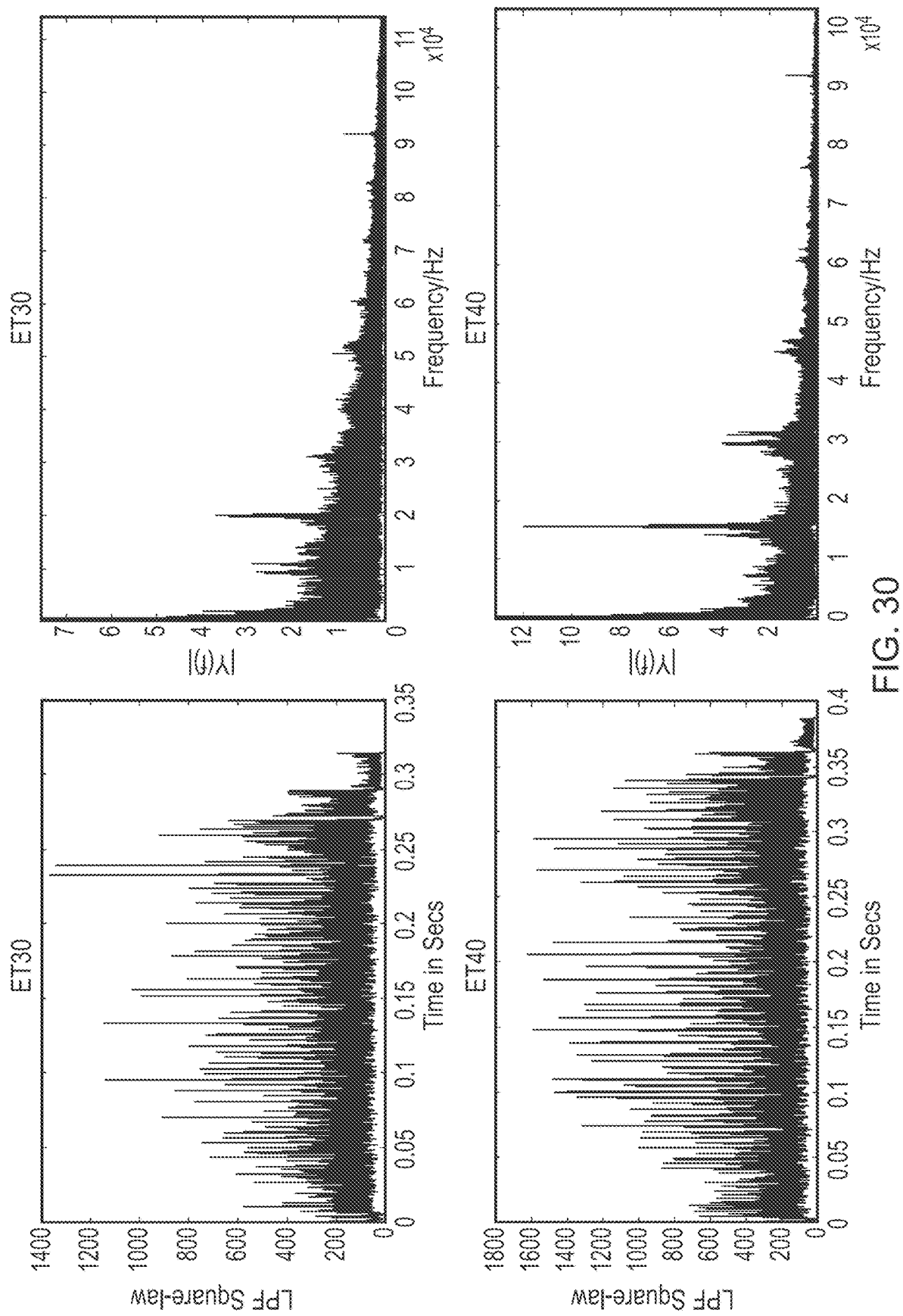
FIG. 30 shows a square-law energy (LP filtered) AE signal detected during formation of a test cylinder with exposure times (ET) of 30, 40 50, 60 and 70 microseconds.
Figure 30:
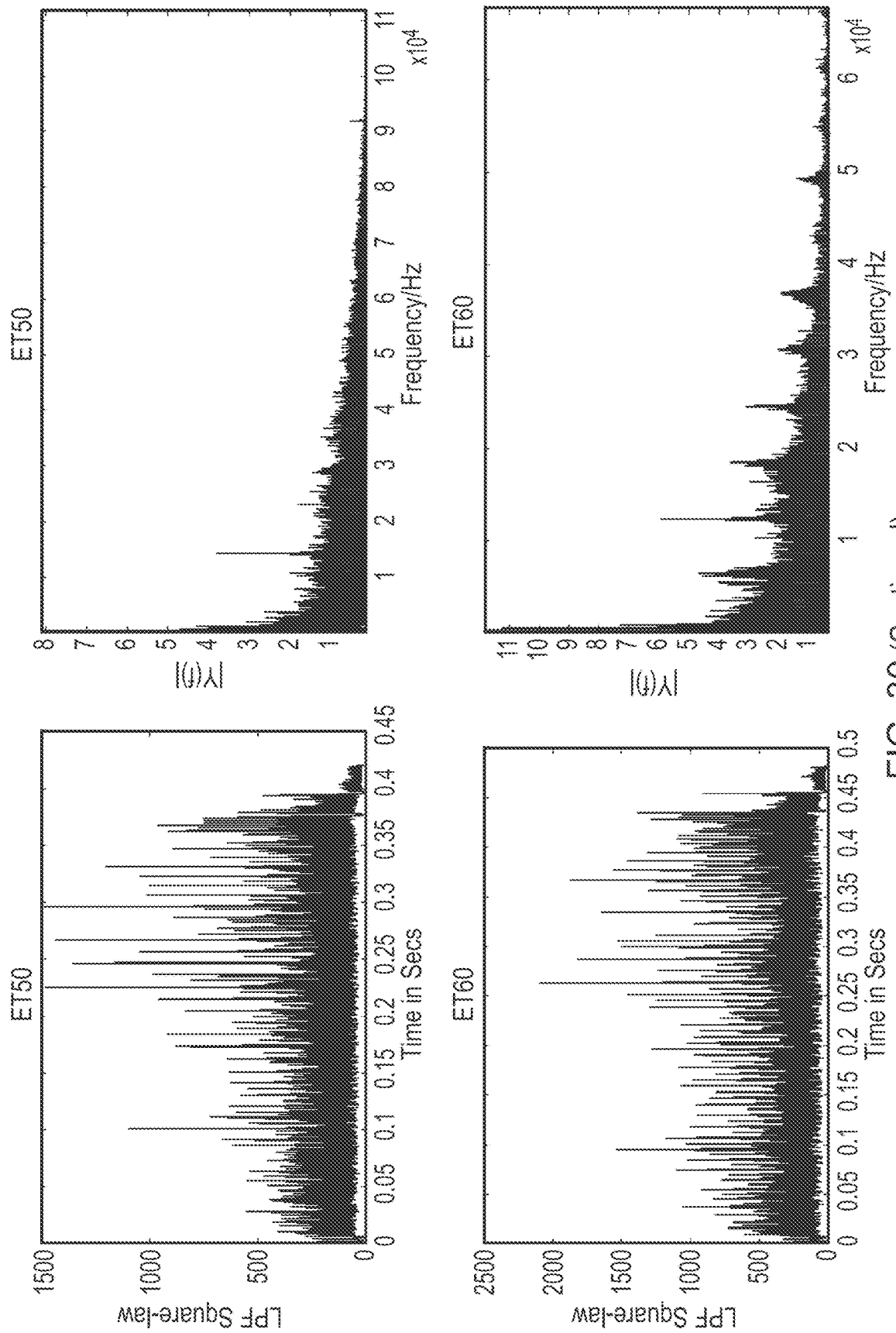
Figure 30:
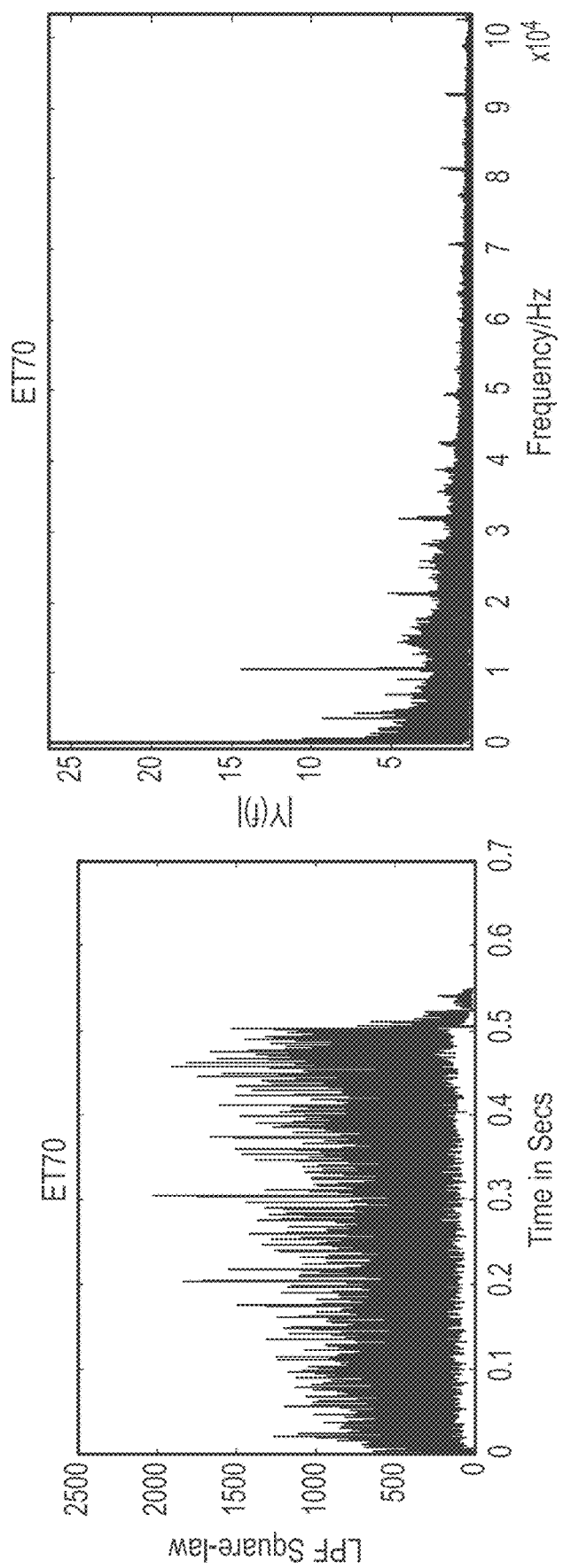
Figure 31:
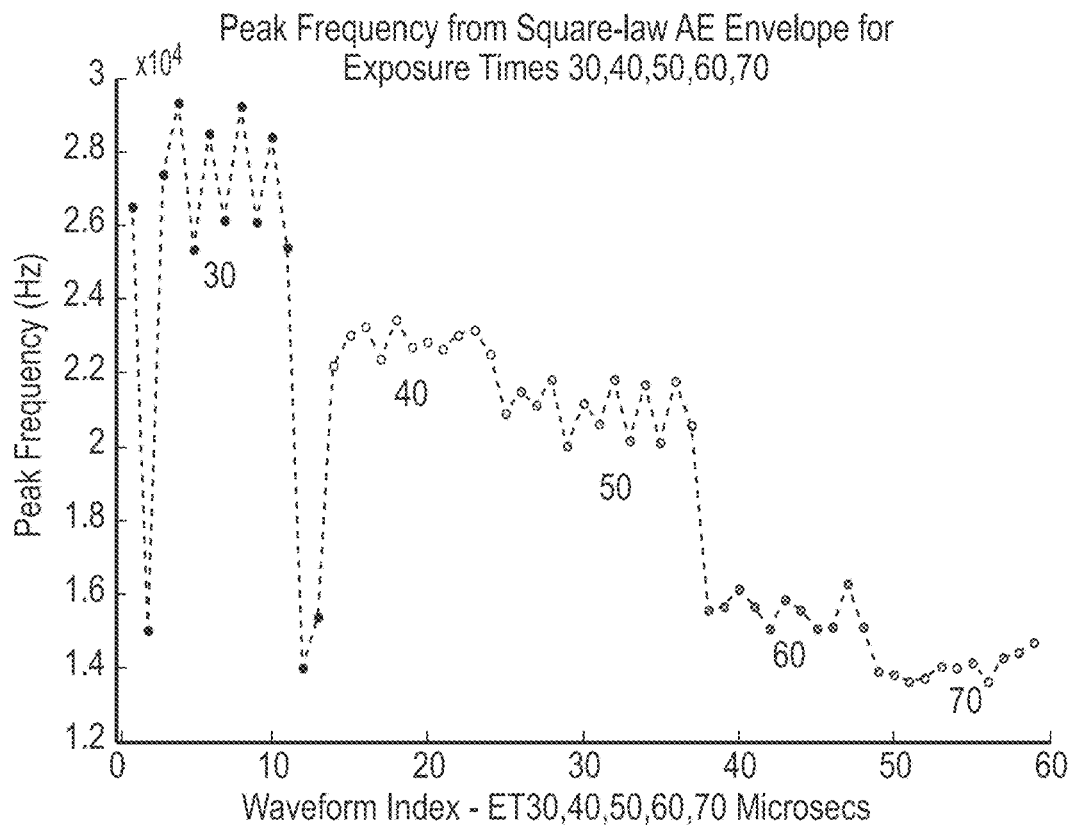
FIG. 31 shows a peak frequency of the AE signal from a square-law AE envelop for exposure times of 30, 40, 50, 60 and 70 microseconds.
Figure 32:
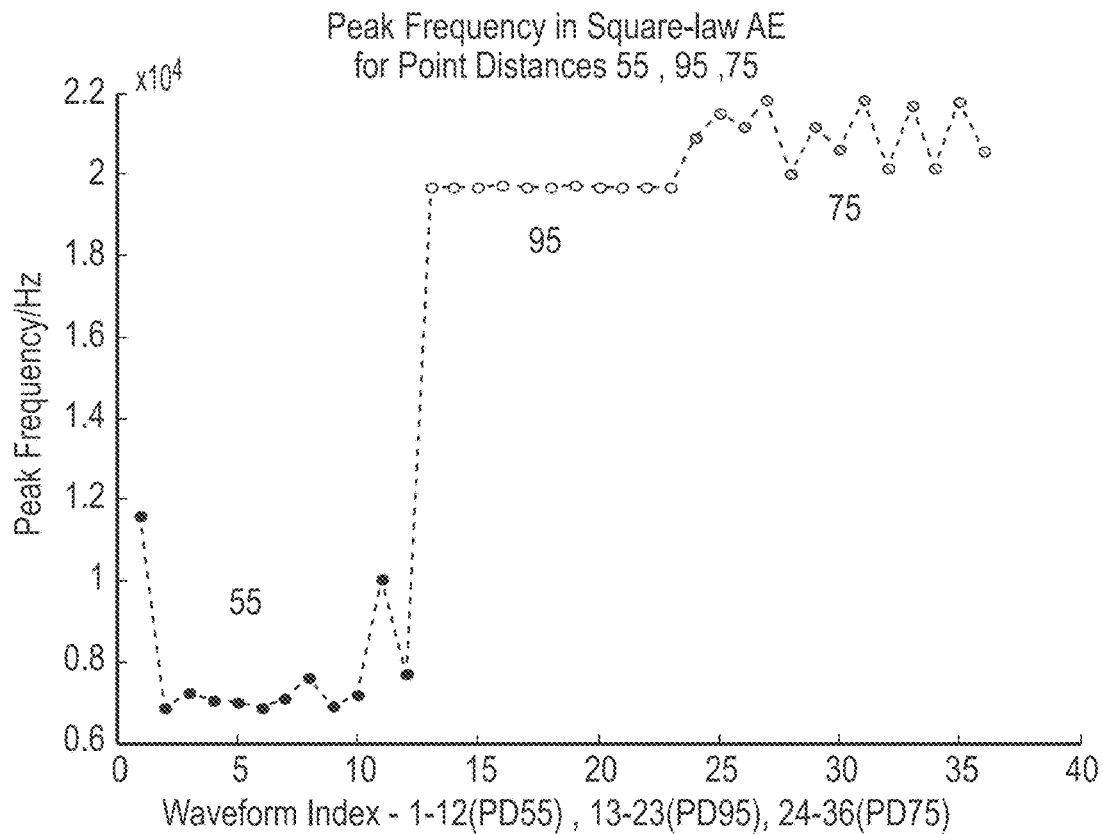
FIG. 32 shows a peak frequency of the AE signal from a square-law AE envelop for exposure times of 55, 95 and 75 microseconds.
Figure 33:
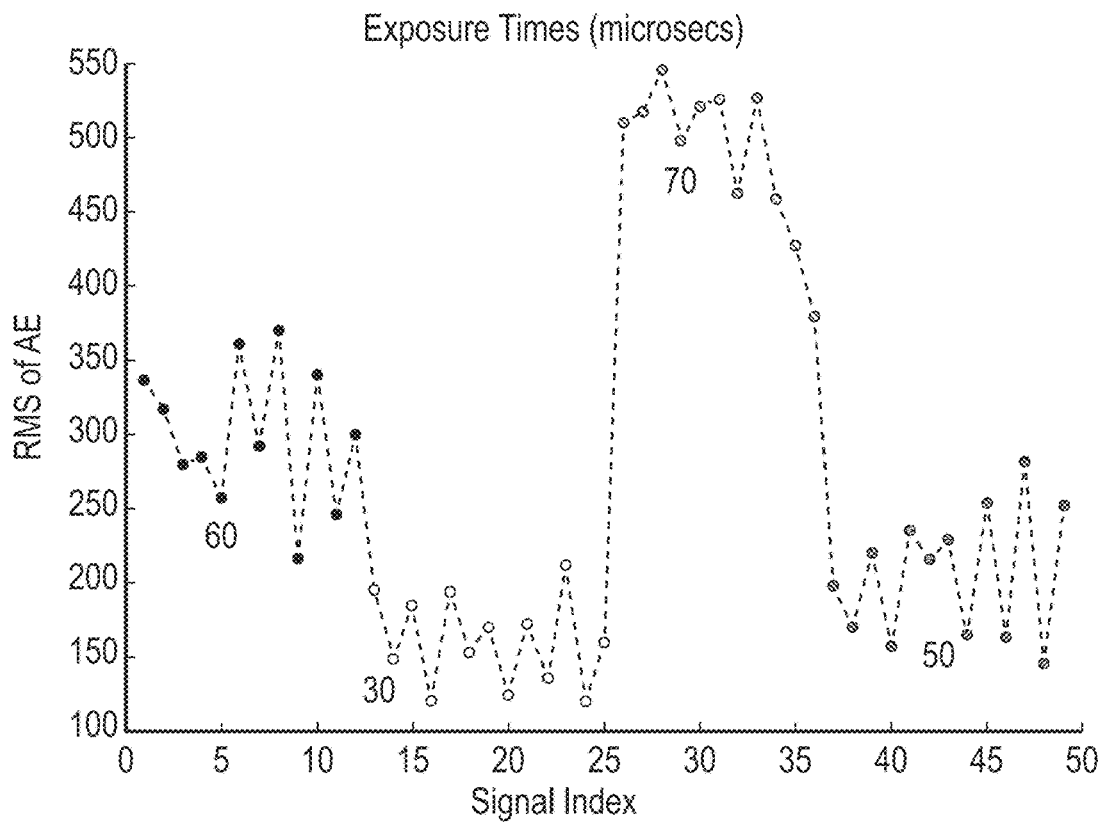
FIG. 33 shows the AE signal RMS for a Ti6Al4V test cylinder.
Figure 34:
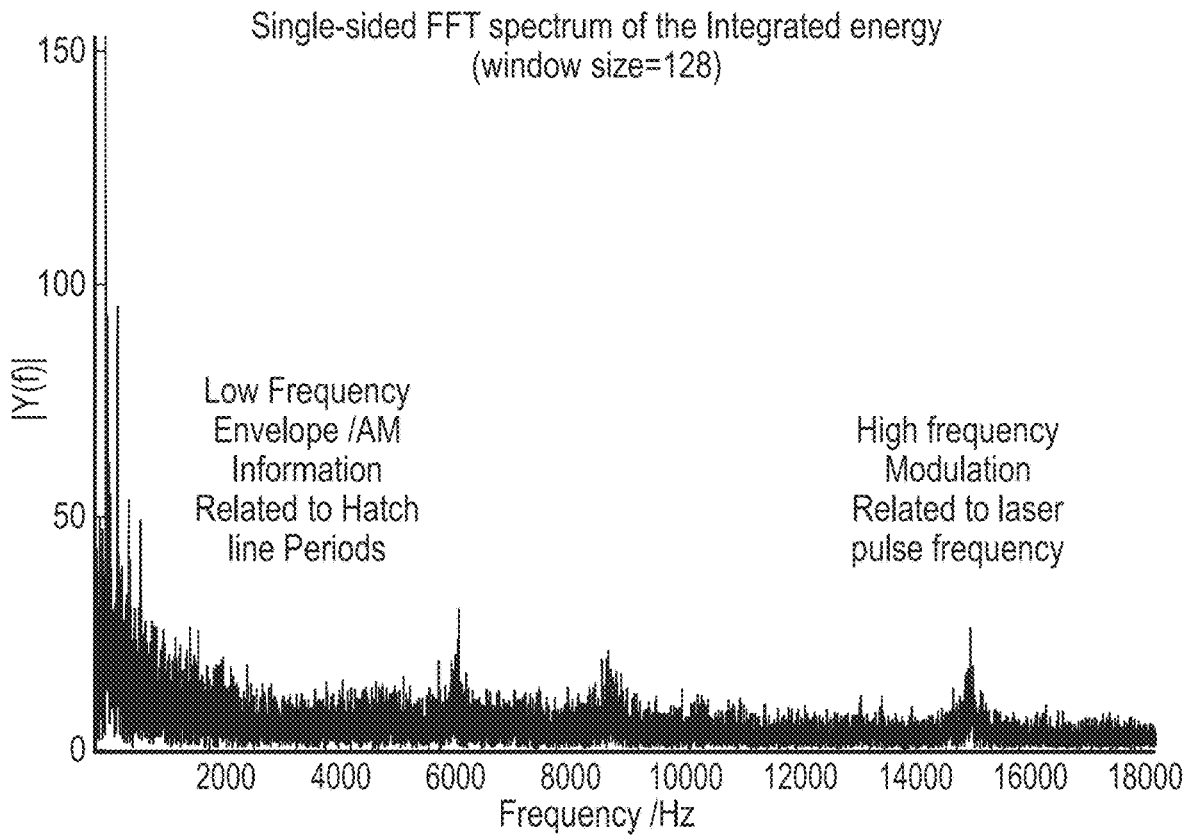
FIG. 34 shows a single-sided FFT spectrum of the integrated energy of an AE signal.

It is emphasised that further important information is encoded within the raw AE response. Most notably, the smoothed envelope waveform extracted from the raw AE signals contains the effective laser pulse frequency, which as for the gas-borne gas, can be defined as a linear function of the exposure time and the point distance for many SLM machines. FIG. 30 depicts the low-pass smoothed absolute (squared) version of AE response waveforms from five different exposure times—i.e. 30, 40, 50, 60, 70 microseconds. Also shown is the FFT plot of this smoothed envelope signal for each case. This indicates that the effective laser frequency can be extracted as the primary peak beyond the initial very low frequency peaks that can be attributed to the hatch modulation that changes on every layer. Again, like the gas-borne system, this extracted peak frequency (albeit from the envelope) can also be seen to reduce in accordance with an increase in exposure time, as confirmed by the FFTs in FIG. 30. This is further illustrated in FIG. 31 for several AE waveforms from the Ti6Al4V test cylinder at each exposure time. Again, it is highlighted that the oscillatory variability exhibited within the peak frequencies can be entirely attributed to known hardware settings for the test conducted herein and do not represent uncertainty in the acoustic measure. In a similar way to the exposure time tests with the AE data, three different point distances were set for further AE measurements across different layers of the test cylinder (i.e. 55, 95 and 75 microns). Again, as illustrated in FIG. 32, the demodulated AE response contains the deterministic spectral information that can exactly separate these point distance patterns. As such the AE system also provides real-time validation of the laser 'truth data'. As both passive acoustic modalities within the invention provide this continuous function of extracting the effective laser pulsing frequency across the powder bed, extra system flexibility and measurement reliability may be inferred. It is emphasised that the continuous extraction of this deterministic laser truth data through the spectral processing described occurs in parallel with further statistical extraction from the raw AE in order to infer the melt pool condition.

Like the gas-borne system, the AE system seeks to provide a level of useful information feedback with regards to specific input Laser heating parameters. The gas-borne system provides an approximate estimation of the laser power through the measured melting response signal energy (e.g. RMS) for a constant point distance and exposure time. This is possible because the power is invariant to the acoustic frequency and there is negligible variation in the propagation path from the melt pool source to the microphone. However, relating the laser input power to the measured AE response throughout a build is made considerably more complicated by the perturbations induced in the AE melting response waveform by the changing propagation path from the melt pool source to AE sensor, as each layer is added. It is difficult to classify input laser parameters or indeed the laser beam focal length from absolute energy related AE waveform descriptors directly (e.g. RMS, counts, rise time, ring-down, integrated energy), although some waveform descriptors that are significantly less affected by the complex evolving propagation path may be useful. However, it is further identified within the AE system that a calibration source of known and accurate repeatable AE dB level could be applied to the AM part at some specified intervals within the build to calibrate the induced variability. Various wideband AE calibration sources could, in theory, be applied to the top of the AM parts within the build such as a piezo, magneto-strictive actuator (e.g. terfenol-D) or even a mechanical snap-through buckling actuator. However, ideally, a very short duration laser pulse calibrated to generate an acoustic stress wave of known level at source would be applied within the melting process (e.g. at the end of the melt), so as not to slow the build process significantly.

Several methods can be used to represent AE activity within the measured melting response that are invariant to absolute amplitude levels. A powerful approach for classifying the AE melting response (i.e. relating the AE measurement to the physical condition of the melt pool) is Amplitude distribution shape modelling—as studies in other fields (e.g. tribological applications of AE for diagnosis of metallic frictional rubbing) suggest that amplitude distribution parameters are less affected by perturbations through complex inhomogeneous propagation paths than spectral or parametric model descriptors for AE waveforms. Any purely FFT-derived spectral descriptors of the AE waveforms from melting taken across longer integration times may not sufficiently represent the evolving non-stationary nature of AE response waveforms constituting an ensemble of transient AE bursts. Therefore, prior-art time-frequency transformation can prove more informative within the invention whilst also being practical for real-time computation (i.e. STFT Gabor spectrogram, Wavelet transform). Time-frequency transforms (e.g. STFT, wavelet) are useful within the invention. Primarily, transient time-discrete features within the AE response (e.g. burst features from micro-cracking within the re-solidification process) are key descriptors of the sintering process that need to be preserved and measured accurately to infer information about the melt pool condition. As such, these signals could be corrupted (averaged out or low pass filtered) by FFT processing thus removing important shape or amplitude content. A wavelet filter with an empirically derived basis function can be used within the invention to effectively extract time-discrete AE transients from defect condition within the build. Secondly, it is emphasized that AM builds are temporally evolving processes with a combination of hatching and contour point melting operations and potentially several heating regimes (defined by the input laser). As such, the corresponding AE response is complex and is equally time-evolving in a way that the different heating regimes can be resolved clearly within the time domain. As such, time-frequency methods such as the STFT provide an ideal method for robust automated discrimination between different melting conditions including identification of exposure times and/or point distance laser parameters through spectral peaks or the distributions in spectral peaks (e.g. acoustic waveform fingerprinting). A further method for automatic assessment of the AE response spectra from melting is [10]Cepstrum analysis, as used commonly in machine condition monitoring, seismology and speech analysis. It involves calculating the log spectrum of the AE waveform and treating this as a waveform that is subjected to further Fourier analysis. The method can detect complex periodicities and their frequency spacing in the raw AE melting response FFT spectra or, more often, in the FFT spectra of any envelope estimation of the AE response (e.g. time integrated RMS, H-transform), thus differentiating multiple modulation patterns otherwise difficult to interpret in the primary spectra (e.g. FFT, order, envelope, and enhanced spectra).

[10] A cepstrum is the forward Fourier transformation of the logarithm of a spectrum. It is therefore the spectrum of a spectrum, and has properties that make it useful in many types of signal analysis.

In addition to the time-specific applications of powder spreading monitoring and melting condition monitoring (i.e. that occur only at set times during the AM machines operation), the AE system can also be used for more general and prolonged passive AE monitoring of each AM part being built within the AM machine. More specifically, it is highlighted that the AE system is extremely sensitive to the detection of several types of unwanted structural defect events that can occur within each AM part under build at any time intermittently during and/or after the build is complete.

Figure 35:
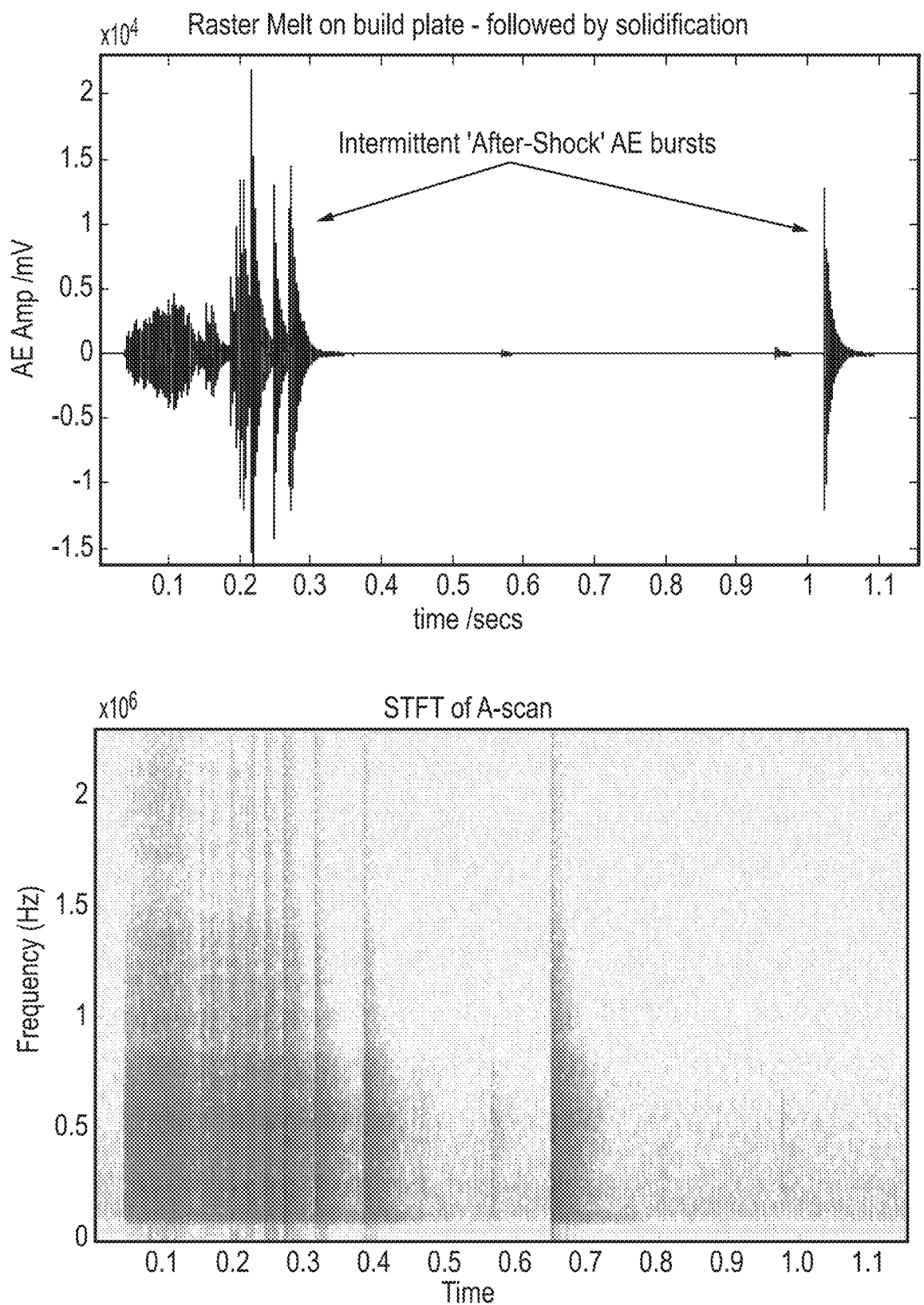
FIG. 35 is an example of bursts of AE signal detected after melting a build plate using a raster scan.

Structural defects that can occur during a build and can be detected by the AE system include volumetric or surface initiated cracks known to generate detectable burst AE waveforms. Any degree of Layer delamination between fused layers, often known to generate extremely large AE bursts, can also be reliably detected by the AE system. Structural Phase transformations e.g. Phase Twinning which is prevalent in Ti6Al4V metallic builds also generate extremely large amplitude AE bursts that can be detected and classified by the invention. An example of such a large amplitude defect that was intentionally induced within an AM build by using a higher power laser heating source is shown in FIG. 35. As indicated, the randomly occurring phase change bursts (i.e. tin cry) are actually significantly larger than the preceding laser melting process AE response. The AE system incorporates automatic-detection algorithms (e.g CFAR detector) and automatic classification algorithms (e.g. k-means non-hierarchical or hierarchical clustering algorithm) to detect and classify such individual one-off large AE burst events. However, it can equally accommodate accumulations or train sequences of many smaller AE burst events radiated randomly from the defect over much longer durations (for example, using Burst AE methods for long-term asset monitoring such as cumulated AE HITs Vs time, Energy, Counts, rise-time, ring-down etc. . . . ) to automatically monitor the condition of the AM parts.

Use of an array of time-synchronised AE sensors within the invention attached to the machine structure below the substrate can provide a further important function with respect to estimating the location of such AE burst generating defects that can occur during and/or after the build is complete. As such, it may be possible to determine the rough location or indeed identify which of the AM parts within a build originated the defect. For example, in any build whereby several identical AM parts are being built across the same XY substrate, with or without the use of support structures, a calibration source (e.g. Hsu-Nielsen) can be used before the build is commenced to determine TDOA estimations for the observed AE calibration signal to propagate from each of the locations across the substrate to each pair combination of AE sensors below the substrate. Increased calibration source events may be introduced around known locations upon which support structures or the actual AM parts are to be initiated on layer-1 (i.e. more AE calibration source averages or finer spatial granularity between calibration points). During the build, AE bursts detected on more than one AE sensor that can be associated with a single consistent defect event or a train of time-delayed repeated events would have a consistent TDOA across the sensors that may correspond to the locations at which the build emanates or the location of adjacent support-structures (i.e. the parts and build structures can act as repeater stations for the propagating defect stress wave from which the location of the defect may be estimated—as the AE fast extensional modes from the defect will travel much faster than). It is noted that associating any large concentration of time-delayed AE events for location can involve clustering. Several prior-art AE location methods can be adapted to make such location estimations within the AE system (e.g. first arrival TOA method, DeltaT localisation via grid-calibration of the build plate substrate or any type of Hyperbolic projection or Zonal AE location method).

As mentioned, such defects within the AM part can be detected during the build process. However, importantly, the AE system is also extremely useful for continuing to monitor the AM parts after the build is complete. Any such internal defects within the AM parts attached to the substrate will continue to generate significant AE activity for several hours—over which period the AE system can still monitor, potentially operating in the threshold-trigger mode previously described. It is noted that AM parts built via SLM are the product of millions of individual high-energy spot-welds within powder and as such, there is considerable accumulation of thermo-elastic residual stress within the resulting built parts that continues to emit AE activity for several minutes and even up to several hours after the build is complete. The AE system allows each of the AE events associated with the levels of residual stress stored within the AM part to be captured and analysed (e.g. using known AE burst automatic-detection and statistical AE methods for long-term monitoring of assets i.e. Cumulative AE Hits against Time, energy, clustering etc. . . . ) whilst still being attached to the build substrate.

For example, passively acquiring all burst activity, such as that shown in FIG. 35, generated over some constant time period during and after a build (e.g. 1 hour after the build has completed) allows the total distribution of AE bursts to be analyzed and compared to some acceptable background AE level. Such longer-term general monitoring can be conducted with the AE system to assess residual stress in individual AM parts attached (e.g. possibly using AE location)—so as to determine when and/or how the AM parts are to be treated (i.e. when they should be removed from the substrate for heat-treatment without warping). The cumulative count or amplitude distribution of AE bursts measured by the array of AE sensors can be used as an informative comparator for damage quantification within the AM parts under stress i.e. it can be used to compare the quality or residual stresses generated within one or more AM parts on the same or different substrates (i.e. using AE location or data association/clustering algorithm). Equally, it can be used to compare the residual stresses or defect part quality of many identical SLM AM parts built using the same machine. Moreover, the post-build passive AE monitoring provided by the invention can also be used within the realms of wider AM process control. Table-2 categorizes the combination of candidate input parameters, environmental conditions and geometries that may affect the quality of the resulting AM build part or process deterministically. As such, the AE system's longer-term passive monitoring function of AM parts may provide a useful method by which the quality of any build can be meaningfully characterised using a simple quality metric based upon measuring prolonged AE activity and that is derived entirely passively i.e. without the use of expensive and time-consuming inspection systems (e.g. X-ray or Active ultrasonic probing). As such, the long-term AE monitoring provides an insight, knowledge and evidence to improve AM build processes. Moreover, it may be possible to make a direct correlation/causal link between the prolonged AE activity measured using the invention and the resulting porosity confirmed by post-inspection using high-resolution X-ray radiography. At the very least, the long-term AE monitoring provides a cost-effective sanity check by which any new AM part build can be quantitatively compared within a prior knowledge from a 'golden' build part. This may be used for comparing the general build quality for any specific set of input parameters.

TABLE 2

AM Build parameters that affect AM parts and the AE activity measured by the AE system after the build.

| Material | Laser | Scan | Environment |
| --- | --- | --- | --- |
| Composition | Mode | Scan speed | Preheating |
| Powder density | Wave length | Hatching space | Pressure |
| Morphology | Power | Layer thickness | Gas type |
| Grain diameter | Frequency | Scan strategy | O2 level |
| Distribution | Pulse width or ET | Scan sectors | Argon Level |
| Thermal properties | Offset | Point distance | |
| Flow properties | Spot size | Scaling factors | |

Data Fusion

In addition to the signal and data processing methods described herein whereby the two sensing modalities monitor several aspects and operation of the SLM AM machine process separately, there are further processing methods used within the invention that formally and/or mathematically combine sensor data or extracted information at the system-level from each modality—potentially within a separate dedicated fusion hardware processor (e.g. FPGA, micro-processor etc.), although the centralized or distributed fusion hardware design is not prescribed for the invention. The invention includes any signal processing and/or informatic or probability theory methods by which temporal signals of extracted information may be combined to infer a more statistically confident or more accurate estimation of the AM machine or process (e.g. an improved detection and location of defects or sub-optimal melting condition), three sensor data fusion methods/concepts employed within the invention are described briefly:— (1) Historical/Temporal Data Fusion (2) Signal-level Data Fusion (3) Decision-Level Data Association/Fusion.

The primary data fusion concept that may be applied to both sensing modalities within the invention either individually or in combination is described herein as Temporal or historical data fusion. This relates to the development of stochastic time-series models that describe the inherent variability in AM machine/system or AM process that can be observed by the passive acoustic system, whilst it is installed on a single AM machine or across several AM machines. This takes the view that the Additive Manufacturing process is essentially a stochastic noise process as observed by the invention, rather than entirely deterministic (e.g chaotic). Important variability time-scale considered within the invention with respect to either improved immediate diagnosis (i.e. using historical models to robustly detect AM build faults in-process on one or several SLM AM machines) or wider AM process control (i.e. understanding process control) are defined as:—

Within Layer Variability (Very-short term VSTV):—As described, both acoustic sensing modalities primary function is to measure raw acoustic signal that is inherently noisy and this is the source of immediate information with regards to the laser melting and or powder spreading process quality—as described previously. Modelling variability within layers with respect to the melt points across the bed requires the hatch direction of rotation to be known in order to de-convolve the order in which melting occurs at grid point across the bed. A data association algorithm within the invention that attempts to match large unscheduled transients events in either acoustic time response within a layer (e.g. from a propagating crack in the AM part) should take account of the rotating/varying order in which melting points are heated within a layer. However, within layer variability modelling may also constitute the inherent stochastic components within the acoustic response between identical features across the same layer, although this may more typically be simple treated as a pattern recognition process within the invention, as described preciously.

Layer-to-layer variability (Short-term STV):—It is also highlighted that variability exhibited from one layer to the next layer, as portrayed by the passive acoustic system, can also be informative for diagnosis of faults or monitoring the build process. This STV is inherently easier to model for the gas-borne microphone data where the propagation path between source and receiver does not change from layer to layer. In this case, compilation of acoustic signal variability time-series from one layer to the next (e.g in laser melt response's peak Voltage, RMS, Kurtosis, time-integrated energy etc. . . . ) may allow fault diagnosis with improved accuracy and confidence. Variability exhibited via certain acoustic metrics from Layer-to-Layer STV may be modelled as an entirely uncorrelated random process (e.g. a white noise process). As such, modeling the amplitude distribution of the measured acoustic signal or derived feature/metric may suffice (e.g. to provide an improved/more qualified indication of faults that induce changes in amplitude distribution as indicated by changes in variance, kurtosis or any higher order moments).

However, in other cases, the variability in gas-borne acoustic data may be more accurately modelled as a correlated random process, where the acoustic noise measurement at one layer is linearly dependent upon one or more previous measurements e.g. a Gauss-Markov process (AR). In this case, any perturbation from the time-series model may infer a 'cause-effect' change in condition. Alternatively, the correlated noise model may follow a more complex two polynomial form incorporating both Autoregressive (AR) and Moving Average (MA) model components (or an integrated moving average ARIMA). It is highlighted that modelling layer-to-layer STV with respect to gas-borne acoustic measurement thus provides a powerful tool for understanding the AM build process—and even potentially for predicting future faults within the machine based entirely upon the empirically derived stochastic model. A STV model facilitates automatic detection of faults/prediction of faults when the stochastic variability exceeds some empirically-derived threshold (e.g. possibly defined using a CFAR Neyman-Pearson Criteria for pausing any AM build due to the acoustic variability model on the grounds that it would be operationally acceptable to pause it to investigate such a potential problem that turns out not to be (i.e. the diagnosis model would accommodate a set false-alarm rate).

It is further noted that developing useful stable and/or generic stochastic time-series models for interpreting acoustic variability in the structure-borne AE data across specific geometry AM parts that are, by their nature, continuously changing in geometry after each layer has been applied may require more complicated non-linear models. However, measuring and modeling temporal and/or energy related variability in the AE response could in itself provide a useful approach to estimating the build process quality for specific part geometries. For example, it may be useful to model the changes in AE propagation times through the part using an appropriate calibration source applied to the part on each new layer, so as to estimate the sound speed within the part and therefore estimate the porosity within the part (i.e. As there is a well known linear relationship between L-wave and S-wave sound speed through an AM structure, and this could be extended to include any non dispersive and dispersive Rayleigh or Lamb wave modes).

AM Build-to-Build variability (Medium-term MTV):— It may also be found that variability exhibited from one identical geometry AM build part to the next that can be usefully measured by and is manifested within the acoustic data from the passive acoustic system when attached to any production machine may also be considered. Compilation of such part to part or build to build acoustic data may provide a useful and informative method to quantify and/or compare part or build qualities within an AM machine (i.e. compare with Reliability and Reproducibility (R&R) concepts). Build to build variability is a critical issue for the AM industry, especially when building safety-critical parts (e.g. aerospace) and as such, the acoustic monitoring system is inherently useful in assessing/quantifying such AM build to build or part to part variability for a specific AM machine. It is further noted that such time-series variability need not be confined to considering variability over a single acoustic metric or acoustic parameter extracted from the acoustic data measured by the invention. Instead, several potentially dependent or independent metrics may be extracted from each sensing modality (together or separately) and modelled in order to improve the monitoring diagnosis or improve the process understanding. As such, multivariate modelling methods may be employed across any time-scale within the invention generating possibly a large number of acoustic variables in parallel. Mathematical data reduction methods for adequately representing correlated variability may be employed to optimise the important acoustic variables that (e.g. Principle component Analysis (PCA)).

AM Machine-to-Machine (Long-term Variability LTV):—It is also noted that stochastic variability that is observed within the acoustic data may occur inherently between different AM machine hardware. Compiling acoustic data for the same build across machines and modelling variability can also be useful for assessing the AM build process control. It is noted for such machine-to-machine variability that observing the acoustic data for a build on the same machine over a long constant time base period (e.g. six months to a year) is equivalent to modelling variability from one AM machine to another, with the same AM build. With reference to the acoustic data measured by either sensing system, it is highlighted that such historical time-series data that may be treated separately or combined together (i.e. a Multivariate estimation) is potentially informative and can provide a robust method of diagnosing and potentially even predicting defects or sub-optimal melting conditions within individual Builds and/or provides a useful quality control tool for the SLM industry.

The second type of Sensor Data Fusion is now addressed. SLM AM machines are typically open-loop systems in which any new AM part design defined within a CAD package requires some level of further analysis using specialize AM part program software so that a set of laser heating parameters and other build parameters (i.e. refer to table-2) can be calculated before the build is commenced and the AM machine implements these parameters deterministically without any provision to adapt the parameters during the build. A more controllable and flexible system would involve appropriate monitoring sensing systems providing low noise sensor information on the heating/melting process state in real-time that is fed back to the system input so that the heating source can be adapted in response to the measurements—thus facilitating a closed-loop system. The passive acoustic monitoring system described provides a practical method of achieving such closed-loop control. Both imaging and Spectroscopy methods have been employed to monitor and understand the melt pool dynamics within research/development SLM AM machines including thermal imaging camera and high speed solid state visual band cameras. Such approaches have limitations in terms of the required image processing time to compute useful real-time feedback into a closed loop AM system and the sensitivity required for high resolution information to be provided (e.g. TI saturation of the melt pool). Although the current passive acoustic system has provision for temporal and visual data fusion methods whereby acoustic responses are automatically correlated in time to visual evidence or cues, only sensor data fusion between the two acoustic sensing modalities is described herein.

Figure 36:
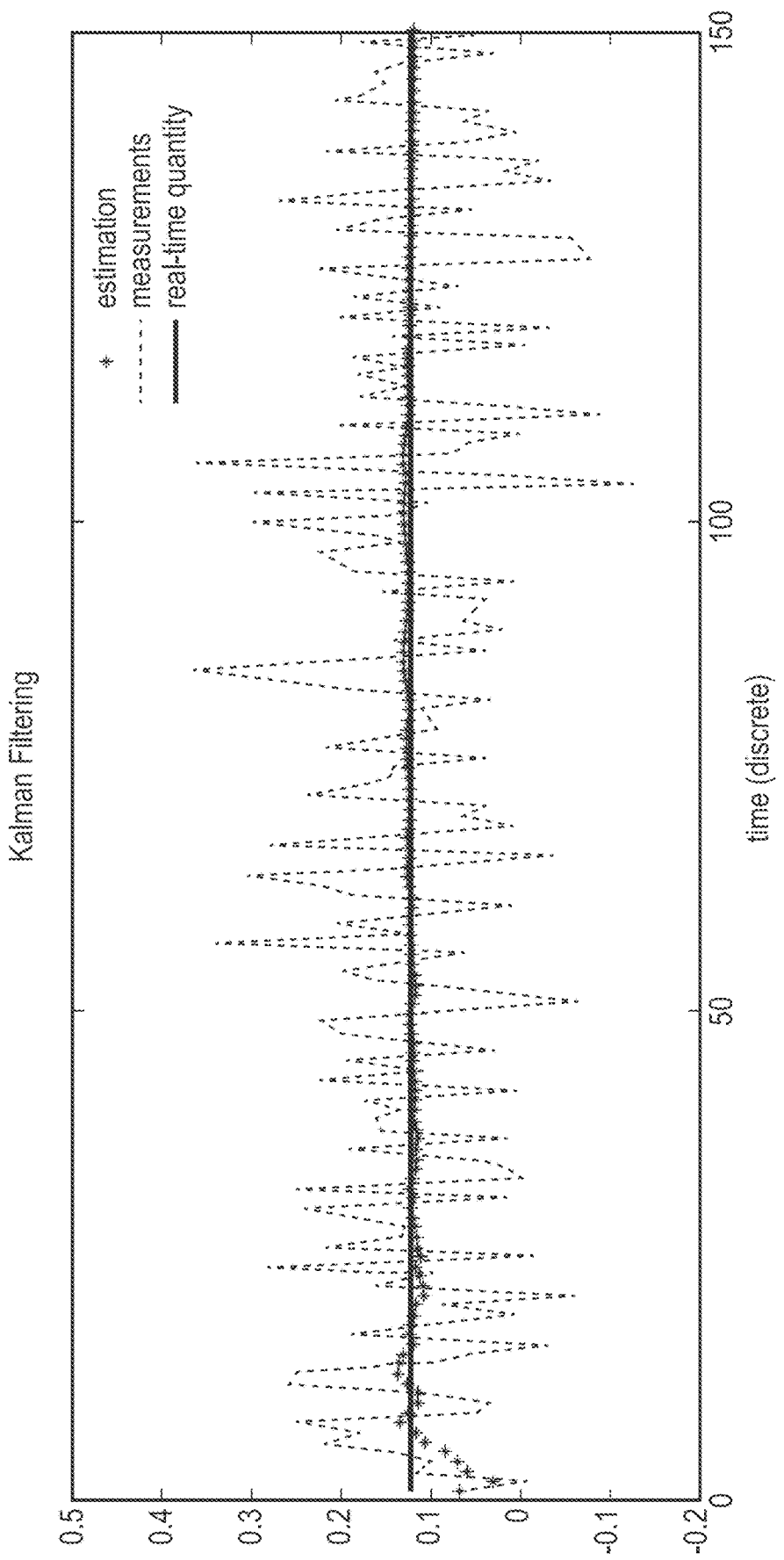
FIG. 36 is a schematic of the fusion of gas-borne acoustic data and AE data based on a Kalman filter.
Figure 36:
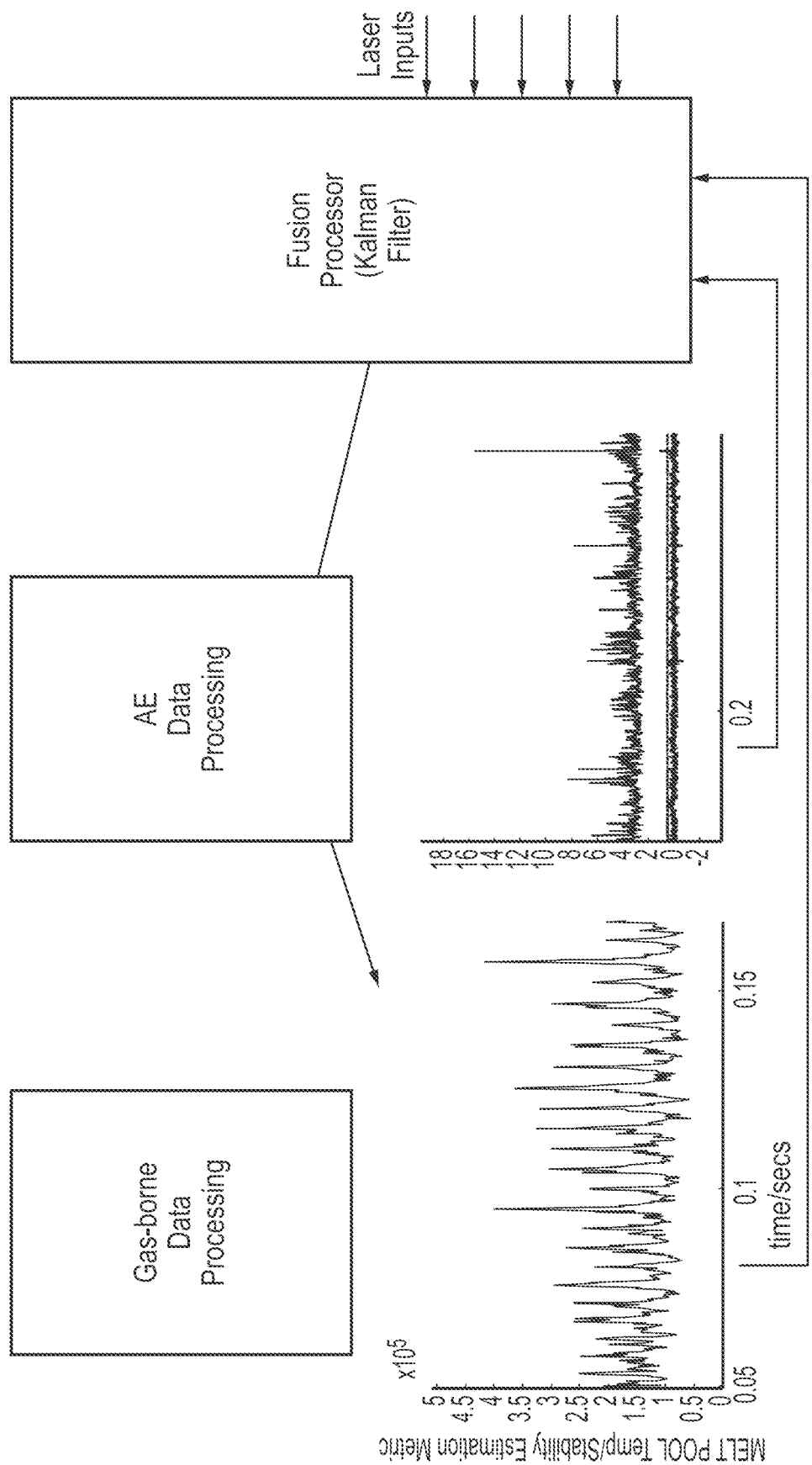

Referring to FIG. 36, the evolving AM build condition or more specifically the state within the melt pool may be most effectively monitored for use within a practical real-time closed-loop on-line system by continually estimating and updating the state of the melt pool based upon raw or feature extracted measurements from both sensor modalities that can be combined within a Linear or Unscented Kalman filter, providing real-time unbiased melt pool state estimation. The measurement signals from either modality could be the raw waveform (one or more) with appropriate filtering to promote the information contained within it with respect to variability in the melt pool condition (e.g. the amplitude modulation). The gas-borne system information input may be conveyed through either the band-limited spectral information signal (e.g. around the effective laser excitation frequency) or simply the Amplitude modulation within the raw data or the statistical feature vector signals extracted from the broadband acoustic response noise quantifying the sparking/melt pool ejection (e.g. a filtered Kurtosis measure as shown in FIG. 10). The AE melting response waveform used for input to the Kalman filter is more likely to constitute the smoothed (i.e. low pass filtered) envelope (e.g. H-transform or square-law), also pertaining to the variability in the melt pool condition. However, the raw AE response to melting can also be processed statistically so that the input information signal constitutes some windowed estimate of amplitude distribution (e.g. a kurtosis or KS filter). For both modalities, the Amplitude Modulations observed, as described herein, may be related to the temperature profile and the thermal stability within the melt pool as it moves across the powder bed. Importantly, for both sensors, the rolling real-time sensor measurements made and/or derived feature vector inputs characterizing melt pool state information to the Kalman filter state estimator is assumed to invariably incur a level of measurement noise. The Kalman filter serves as an adaptive filter (e.g. based upon a LMS FIR filter structure) that can be used for optimized state estimation of the stochastic system model describing the melt pool state with one or more noisy sensor measurement inputs. As such, the Kalman structure constitutes a sensor data fusion engine in which the noisy feature vector data from each acoustic sensing modality may be optimally combined to retain the predicted state to a known/required variability. It involves execution of a sequence of recursive operations involving sensor measurement updates to the state estimation model (the update equations) and feed-forward state predictions updates within the Kalman filter structure involve the acoustic sensor inputs (the noisy measurement data). One method for the invention would have the adaptive combination of linear filter weighting coefficients (i.e. FIR coefficients) within the adaptive Kalman filter structure constituting the entirely controllable and variable Laser input parameters that can be adapted within the Kalman framework to retain the state estimation at a set level given the noisy acoustic measurement data.

Useful sensor data from each modality can also be combined at the track/location or decision level in order to improve confidence in defect or fault condition detection, recognition or location decisions. At a system level, it is further noted that for each of the within-build monitoring tasks conducted in which both acoustic sensing modalities offer some level of useful time synchronized sensing data or inferred information independently, High-merit sensor data fusions may be conducted directly at the acoustic waveform or signal level within the monitoring system. For example, transient waveform features from time discrete events (e.g. a loud delamination event) may be reported by sensors across each modality—increasing the confidence in the diagnosis.

More reliable (i.e. in terms of statistical confidence PoD, PFA) fault or defect detection decisions may equally be made using formal mathematical sensor data fusion at the decision level (i.e. combining probabilities). Baysian inference may be used to combine sensor data for the two modalities at the decision level.

The term "data carrier" as used herein includes a non-transient data carrier, such as volatile memory, eg RAM, non-volatile memory, eg ROM, flash memory and data storage devices, such as hard discs, optical discs, or a transient data carrier, such as an electronic or optical signal.

The invention claimed is:

1. An additive manufacturing apparatus for building an object by layerwise consolidation of powder, the apparatus comprising a build enclosure containing a build support for supporting the object and a powder bed during the build, a material source for forming layers of the powder bed, a radiation device for generating and directing radiation to selected locations on the powder bed to consolidate the powder at the selected locations and a passive acoustic sensing system arranged to detect acoustic signals generated in the build enclosure that are indicative of at least one condition of the building process and/or the object.

2. The additive manufacturing apparatus according to claim 1, wherein the passive acoustic sensing system comprises an acoustic sensor array.

3. The additive manufacturing apparatus according to claim 1, wherein the passive acoustic sensing system comprises an acoustic sensor arranged for detecting gas-borne acoustic waves.

4. The additive manufacturing apparatus according to claim 2, wherein the acoustic sensor for detecting gas-borne acoustic waves is positioned to be located above the powder bed within the build enclosure.

5. The additive manufacturing apparatus according to claim 1, wherein the passive acoustic sensing system comprises an acoustic emission sensor arranged for detecting structure-borne stress waves.

6. The additive manufacturing apparatus according to claim 1, wherein the acoustic sensing system comprises a signal processing module for determining characteristics of the detected acoustic signals that are indicative of the at least one condition of the building process and/or the object.

7. The additive manufacturing apparatus according to claim 6, wherein the signal processing module is arranged to determine characteristics of the acoustic signals indicative of a condition of a melt pool generated during consolidation of the powder.

8. The additive manufacturing apparatus according to claim 7, wherein the passive acoustic sensing system comprises an acoustic sensor arranged for detecting gas-borne acoustic waves.

9. The additive manufacturing apparatus according to claim 6, wherein the signal processing module is arranged to determine delamination of layers of consolidated material and/or cracks in the consolidated material.

10. The additive manufacturing apparatus according to claim 9, wherein the acoustic sensing system comprises at least two acoustic sensors and the signal processing module is arranged to determine a location of the delamination and/or crack from acoustic signals generated by the at least two acoustic sensors.

11. The additive manufacturing apparatus according to claim 9, wherein the passive acoustic sensing system comprises an acoustic emission sensor arranged for detecting structure-borne stress waves.

12. The additive manufacturing apparatus according to claim 1 comprising a controller arranged to control the radiation device in response to the acoustic signals.

13. The additive manufacturing apparatus according to claim 12, wherein the radiation device is arranged to scan a radiation beam across selected areas of each layer to consolidate the material, the controller arranged to control the radiation device to alter scanning parameters in response to the acoustic signals.

14. The additive manufacturing apparatus according to claim 13, wherein the scanning parameters that can be altered by the controller are one or more of power of a radiation beam, distance between exposure points of the scan, exposure time for each point, scan speed, spot size and/or a focal position of the radiation beam.

15. The additive manufacturing apparatus according to claim 1, wherein the passive acoustic sensing system comprises an acoustic sensor, a circular memory buffer arranged to store acoustic signals generated by the acoustic sensor and a longer-term memory for storing acoustic signals stored in the circular memory buffer for further processing if the acoustic signals meet a threshold criterion.

16. An additive manufacturing apparatus for building an object by layerwise consolidation of material, the apparatus comprising a build enclosure containing a build support for supporting the object and a powder bed during the build, a material source for forming layers of the powder bed, a radiation device for generating and directing radiation to selected locations on the powder bed and an acoustic sensing system arranged to detect acoustic signals generated in the build enclosure by acoustic signals induced by an interaction of a radiation beam with an upper working surface of the object or a working surface of the powder bed during the build.

17. The additive manufacturing apparatus according to claim 16, wherein the radiation beam is a radiation beam generated by the radiation source to consolidate material.

18. The additive manufacturing apparatus according to claim 16, wherein the radiation beam is a separate beam to the radiation beam generated by the radiation source to consolidate material.

19. The additive manufacturing apparatus according to claim 16 comprising a controller arranged to control at least one aspect of the additive manufacturing process in response to the acoustic wave signals.

20. The additive manufacturing apparatus according to claim 16, comprising a signal processor arranged to compare the acoustic signals to a baseline acoustic profile.

21. The additive manufacturing apparatus according to claim 20, wherein the baseline acoustic profile is based on previous additive manufacturing builds.

22. The additive manufacturing apparatus according to claim 19, wherein the controller is arranged to control at least one aspect of the additive manufacturing process based upon a comparison of the detected acoustic wave to a baseline acoustic profile.

23. The additive manufacturing apparatus according to claim 22, wherein the baseline acoustic profile is based on previous additive manufacturing builds.

24. The additive manufacturing apparatus according to claim 16 comprising a signal processor arranged to determine a position of the melt pool associated with the acoustic signals.

25. The additive manufacturing apparatus according to claim 24, comprising two or more acoustic sensors determining a position of the melt pool from two or more acoustic sensors.

26. An additive manufacturing apparatus comprising:—
 a radiation source for generating a radiation beam to create a melt pool at an exposed working surface of a powder bed to selectively fuse powder of the powder bed to form an object in a layer-by-layer manner,
 an acoustic sensor arranged to detect an acoustic wave generated in the object when the radiation source directs a radiation beam to a build surface of the object, and
 a signal processor arranged to determine a property of the object by analyzing the detected acoustic wave.

27. The additive manufacturing apparatus according to claim 26, comprising a controller arranged to control the radiation source, wherein the controller controls at least one scanning parameter of the radiation beam in response to the detected acoustic wave.

28. The additive manufacturing apparatus according to claim 26, comprising a controller arranged to control the radiation source to generate the radiation beam such that the acoustic wave is generated and the acoustic wave detected subsequent to completion of a layer through fusing of the powder during the additive manufacturing process.

\* \* \* \* \*